(12) United States Patent
Nishiyama et al.

(10) Patent No.: US 10,121,440 B2
(45) Date of Patent: Nov. 6, 2018

(54) DISPLAY DEVICE

(71) Applicant: Sharp Kabushiki Kaisha, Sakai, Osaka (JP)

(72) Inventors: Takayuki Nishiyama, Sakai (JP); Kohhei Tanaka, Sakai (JP); Takeshi Noma, Sakai (JP); Ryo Yonebayashi, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/307,049

(22) PCT Filed: Apr. 27, 2015

(86) PCT No.: PCT/JP2015/062715
§ 371 (c)(1),
(2) Date: Oct. 27, 2016

(87) PCT Pub. No.: WO2015/166920
PCT Pub. Date: Nov. 5, 2015

(65) Prior Publication Data
US 2017/0047034 A1    Feb. 16, 2017

(30) Foreign Application Priority Data

Apr. 28, 2014 (JP) ................. 2014-093174

(51) Int. Cl.
*G09G 3/36* (2006.01)
*G02F 1/1362* (2006.01)
(Continued)

(52) U.S. Cl.
CPC ......... *G09G 3/3677* (2013.01); *G02F 1/1368* (2013.01); *G02F 1/134309* (2013.01);
(Continued)

(58) Field of Classification Search
CPC .......... G09G 3/20; G09G 3/36; G09G 3/3611; G09G 3/3648; G09G 3/3674–3/3696;
(Continued)

(56) References Cited

U.S. PATENT DOCUMENTS

2003/0030606 A1    2/2003 Hector et al.
2008/0088568 A1    4/2008 Haga et al.
(Continued)

FOREIGN PATENT DOCUMENTS

| JP | 11-184406 A | 7/1999 |
|----|----|----|
| JP | 2004-538511 A | 12/2004 |
| JP | 5299730 B2 | 9/2013 |

*Primary Examiner* — Nathan Danielsen
(74) *Attorney, Agent, or Firm* — Keating & Bennett, LLP

(57) ABSTRACT

Provided is a display device causing less noise on a signal. A display device (10) includes a plurality of signal lines (SL), a plurality of gate lines (GL), and a driving unit. The plurality of gate lines crosses the plurality of signal lines. The driving unit is connected to the plurality of gate lines and controls a potential of each of the gate lines. The driving unit includes a plurality of gate drivers (11) and a plurality of lines. The gate drivers are disposed in a display region, and at least one of the gate drivers is connected to each of the gate lines. The lines are each provided with a potential for operation of one of the gate drivers. Each of the lines crosses one of the signal lines. The plurality of lines includes a first line (17A) and a second line (17B). The driving unit switches a potential of the first line at predetermined timing. The driving unit switches a potential of the second line into a direction opposite to a direction of the switched potential of the first line upon switching the potential of the first line.

12 Claims, 51 Drawing Sheets

(51) Int. Cl.
  *G02F 1/1368* (2006.01)
  *G09G 3/20* (2006.01)
  *G02F 1/1343* (2006.01)

(52) U.S. Cl.
  CPC ......... *G02F 1/136286* (2013.01); *G09G 3/20* (2013.01); *G09G 3/36* (2013.01); *G09G 3/3688* (2013.01); *G02F 2001/136295* (2013.01); *G02F 2201/121* (2013.01); *G02F 2201/123* (2013.01); *G09G 2300/0426* (2013.01); *G09G 2300/0809* (2013.01); *G09G 2310/08* (2013.01); *G09G 2320/0209* (2013.01); *G09G 2330/021* (2013.01)

(58) Field of Classification Search
  CPC ... G09G 2300/0404; G09G 2300/0408; G09G 2300/0426; G09G 2310/0202; G09G 2310/0213; G09G 2310/0216; G09G 2310/0281; G09G 2310/0289; G09G 2310/0291; G09G 2310/08; G02F 1/133345; G02F 1/133512; G02F 1/133514; G02F 1/134336; G02F 1/136286; G02F 1/1368; G02F 2201/123; G02F 2201/13629; G02F 2201/136295; G09F 9/30; G09F 9/35
  See application file for complete search history.

(56) References Cited

U.S. PATENT DOCUMENTS

| | | | |
|---|---|---|---|
| 2009/0046085 A1* | 2/2009 | Ino | G09G 3/3648 345/208 |
| 2012/0182050 A1* | 7/2012 | Yang | G09G 3/3674 327/109 |
| 2014/0267968 A1* | 9/2014 | Haga | G09G 3/3648 349/43 |

* cited by examiner

Potential image

Potential image

DISPLAY DEVICE

TECHNICAL FIELD

The present invention relates to a display device, and more particularly to a measure against noise of a signal contributory to image display.

BACKGROUND ART

A display device having a display region in a shape other than a rectangular shape has recently been proposed in order for design improvement. Examples of such a display device include a planar display device disclosed in JP 5299730 B1.

The planar display device includes display device elements disposed linearly and continuously on a display device substrate. The display device elements include a unit circuit and a pixel circuit. The unit circuit configures a scanning circuit. The pixel circuit is connected to an output node of the unit circuit.

DISCLOSURE OF INVENTION

The planar display device has a large number of nodes between lines for transmission of a clock signal driving the scanning circuit and lines for transmission of a data signal indicating a pixel tone. A parasitic capacitance is provided at each of the nodes. The parasitic capacitance affects a data signal. Specifically, the planar display device is likely to cause noise superimposition on a data signal.

It is an object of the present invention to provide a display device causing less noise superimposition on a signal contributory to image display.

A display device according to an embodiment of the present invention includes a plurality of signal lines, a plurality of gate lines, and a driving unit. The signal lines are each provided with a potential contributory to image display. The plurality of gate lines is provided separately from the plurality of signal lines. The driving unit is connected to the plurality of gate lines and controls a potential of each of the gate lines. The driving unit includes a plurality of gate drivers and a plurality of lines. The gate drivers are disposed in a display region, and at least one of the gate drivers is connected to each of the gate lines. The lines are each provided with a potential for operation of one of the gate drivers. The lines each cross one of the signal lines. The plurality of lines includes at least one first line and at least one second line. The second line crosses the signal line crossing the first line, at a position different from a node with the first line. The driving unit switches a potential of the first line at predetermined timing. The driving unit switches a potential of the second line into a direction opposite to a direction of the switched potential of the first line upon switching the potential of the first line.

The display device according to an embodiment of the present invention causes less noise superimposition on a signal contributory to image display.

DESCRIPTION OF EMBODIMENTS

Figure 1:
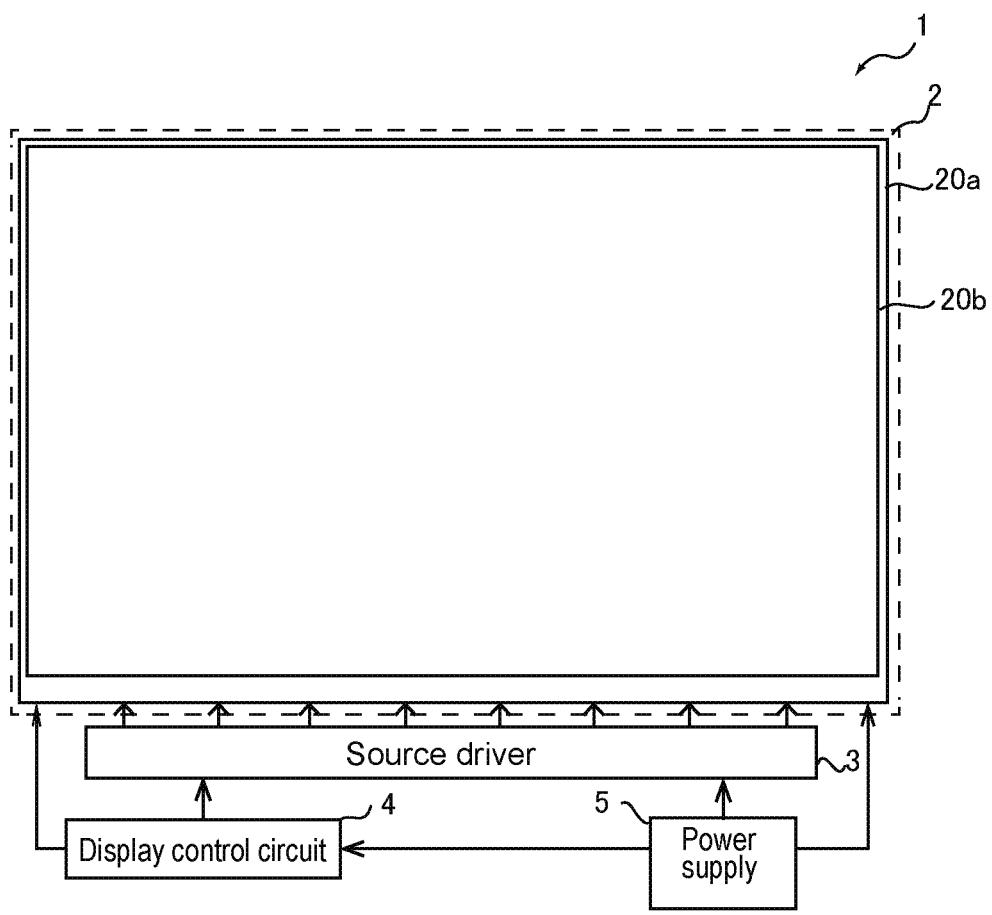
FIG. 1 is a schematic diagram depicting an outline configuration of a liquid crystal display device according to a first embodiment.

A display device according to an embodiment of the present invention includes a plurality of signal lines, a plurality of gate lines, and a driving unit. The signal lines are each provided with a potential contributory to image display. The plurality of gate lines is provided separately from the plurality of signal lines. The driving unit is connected to the plurality of gate lines and controls a potential of each of the gate lines. The driving unit includes a plurality of gate drivers and a plurality of lines. The gate drivers are disposed in a display region, and at least one of the gate drivers is connected to each of the gate lines. The lines are each provided with a potential for operation of one of the gate drivers. The lines each cross one of the signal lines. The plurality of lines includes at least one first line and at least one second line. The second line crosses the signal line crossing the first line, at a position different from a node with the first line. The driving unit switches a potential of the first line at predetermined timing. The driving unit switches a potential of the second line into a direction opposite to a direction of the switched potential of the first line upon switching the potential of the first line.

In the display device, a parasitic capacitance is provided at each of a node between the first line and the signal line and a node between the second line and the signal line. The parasitic capacitance affects the potential provided to the signal line. This will be described in detail below.

The potential contributory to image display can indicate a pixel tone, or can be provided for keeping the pixel tone. Such a potential is outputted as a signal contributory to image display or the like. Specifically, a signal contributory to image display is defined by the potential provided to the signal line, for example. The parasitic capacitance varies the potential provided to the signal line. In other words, noise is superimposed on the signal. In the case where the potential contributory to image display indicates a pixel tone, variation of the potential causes the pixel tone to be different from an intended level. This will cause luminance unevenness.

In the display device, the second line crosses the signal line crossing the first line. The potential of the first line and the potential of the second line are switched simultaneously. The potential of the first line and the potential of the second line are switched into opposite directions. In a case where the potential of the first line increases, the potential of the second line decreases. In another case where the potential of the first line decreases, the potential of the second line increases. Noise of a signal caused by the parasitic capacitance provided at the node between the first line and the signal line and noise of a signal caused by the parasitic capacitance provided at the node between the second line and the signal line thus cancel each other. In other words, noise is unlikely to be superimposed on a signal.

Examples of the signal line crossing the first line and the second line include a data line for transmission of a data signal used for image display.

The display device according to an embodiment of the present invention can further include a plurality of pixels, thin film transistors, pixel electrodes, and auxiliary capacitance lines. The plurality of pixels is provided in the display region. The thin film transistors are disposed in the plurality of pixels, respectively. The pixel electrodes are each connected to corresponding one of the thin film transistors. An auxiliary capacitance is provided between each of the auxiliary capacitance lines and corresponding one of the pixel electrodes. Examples of the signal line crossing the first line and the second line include the auxiliary capacitance line in this case.

The display device according to an embodiment of the present invention can further include a plurality of pixels, thin film transistors, pixel electrodes, and common lines. The plurality of pixels is provided in the display region. The thin film transistors are disposed in the plurality of pixels, respectively. The pixel electrodes are each connected to corresponding one of the thin film transistors. The common lines are provided on a substrate having the pixel electrodes, and a pixel capacitance is provided between each of the common lines and corresponding one of the pixel electrodes. Examples of the signal line crossing the first line and the second line include the common line in this case.

The common line according to the above aspect preferably includes a transparent conductive layer and a plurality of metal lines. The plurality of metal lines is provided on the transparent conductive layer. The plurality of metal lines extends along the common line. The plurality of metal lines is aligned in a width direction of the common line at predetermined intervals.

The common line thus configured more effectively reduces noise having opposite phases in comparison to a common line including only the transparent conductive layer. Described below is a reason therefor.

A common line including only the transparent conductive layer has a high sheet resistance and causes potentials to vary merely locally. Such a common line may fail to reduce noise having opposite phases.

In contrast, the above aspect achieves decrease of the sheet resistance of the common line. The common line thus prevents the potentials from varying only locally. The common line can thus reduce noise having opposite phases.

The display device according to an embodiment of the present invention can be provided with a first parasitic capacitance and a second parasitic capacitance. The first parasitic capacitance is provided at a node between the first line and the data line. The second parasitic capacitance is provided at a node between the second line and the data line crossing the first line. An absolute value of a sum of a product of the first parasitic capacitance and a potential variation amount of the first line and a product of the second parasitic capacitance and a potential variation amount of the second line is preferably less than an absolute value of the product of the first parasitic capacitance and the potential variation amount of the first line or an absolute value of the product of the second parasitic capacitance and the potential variation amount of the second line.

Noise caused by the parasitic capacitances can be reduced in this case. The sum is preferred to be zero or substantially zero.

In the display device according to an embodiment of the present invention, the plurality of lines preferably includes the at least one second line equal in number to the at least one first line. In this case, the number of parasitic capacitances provided at the nodes between the first lines and the signal lines can be equalized to the number of parasitic capacitances provided at the nodes between the second lines and the signal lines. This reduces noise caused by the parasitic capacitances.

In the display device according to an embodiment of the present invention, the driving unit can further include a signal supplier, a plurality of first clock signal lines, and a plurality of second clock signal lines. The signal supplier supplies each of the gate drivers with a first clock signal and a second clock signal having a phase opposite to that of the first clock signal. Each of the first clock signal lines transmits the first clock signal. Each of the second clock signal lines transmits the second clock signal. The first clock signal line connected to one of the gate drivers includes a first line portion crossing one of the signal lines. The second clock signal line connected to one of the gate drivers includes a second line portion that crosses the signal line crossing the first line portion, at a position different from a node with the first line portion. The first line portion corresponds to the first line. The second line portion corresponds to the second line.

The signal supplier according to the above aspect preferably includes a generator, a first signal supply line, a first switch, a second signal supply line, a second switch, a connecting line, a resistance, a third switch, and a controller. The generator generates the first and second clock signals. The first signal supply line connects one of the first clock signal lines and the generator, and transmits the first clock signal. The first switch is provided on the first signal supply line and switches between a state where the first clock signal line and the generator are electrically connected and a state where the first clock signal line and the generator are not electrically connected. The second signal supply line connects one of the second clock signal lines and the generator, and transmits the second clock signal. The second switch is provided on the second signal supply line and switches between a state where the second clock signal line and the generator are electrically connected and a state where the second clock signal line and the generator are not electrically connected. The connecting line connects the first signal supply line with the second signal supply line. The resistance is provided on the connecting line. The third switch is provided on the connecting line and switches between a state where the first and second signal supply lines are electrically connected and a state where the first and second signal supply lines are not electrically connected. The controller controls to operate the first, second, and third switches. When the first and second clock signals are switched in phase, the first and second clock signal lines are not electrically connected with the generator and the first signal supply line is electrically connected with the second signal supply line. While the first and second clock signals are not switched in phase, the first and second clock signal lines are electrically connected with the generator and the first signal supply line is not electrically connected with the second signal supply line.

In this case, charge transfer between the first and second signal supply lines assists switching in phase of the first and second clock signals. This saves electric power consumption.

In the display device according to an embodiment of the present invention, the plurality of lines can further include a third line. The third line crosses the signal line crossing the first and second lines, at a position different from nodes with the first and second lines. The display device can be provided with a first parasitic capacitance, a second parasitic capacitance, and a third parasitic capacitance. The first parasitic capacitance is provided at the node between the first line and the signal line. The second parasitic capacitance is provided at the node between the second line and the signal line crossing the first line. The third parasitic capacitance is provided at the node between the third line and the signal line crossing the first line. The plurality of gate drivers includes a first gate driver, a second gate driver, and a third gate driver. The first gate driver is connected to one the gate lines, and includes the first line. The second gate driver is connected to one of the gate lines except the gate line connected with the first gate driver, and includes the second line. The third gate driver is connected to one of the gate lines except the gate line connected with the first gate driver and the gate line connected with the second gate driver, and includes the third line. The driving unit decreases the potential of the first line. The driving unit increases the potential of the second line upon decreasing the potential of the first line. The driving unit increases a potential of the third line upon decreasing the potential of the first line. An absolute value of a sum of a product of the first parasitic capacitance and a potential variation amount of the first line, a product of the second parasitic capacitance and a potential variation amount of the second line, and a product of the third parasitic capacitance and a potential variation amount of the third line is preferably less than one of an absolute value of the product of the first parasitic capacitance and the potential variation amount of the first line, an absolute value of the product of the second parasitic capacitance and the potential variation amount of the second line, and an absolute value of the product of the third parasitic capacitance and the potential variation amount of the third line.

Noise caused by the parasitic capacitances can be reduced in this case. The sum is preferred to be zero or substantially zero.

In the display device according to an embodiment of the present invention, the plurality of lines can include a line group. The line group includes N of the first lines and (N−1) of the second lines. The driving unit is preferred not to switch a potential of one of the N first lines upon switching the potentials of the remaining first lines and the second lines.

Noise caused by the parasitic capacitances can be reduced in this case.

The driving unit can include a signal supplier and a plurality of clock signal lines. The signal supplier supplies each of the gate drivers with a clock signal. Each of the clock signal lines transmits the clock signal. The plurality of data lines is aligned in a predetermined direction. The clock signal lines each include a signal line portion. The signal line portion is provided between adjacent two of the signal lines in the predetermined direction. The signal line portion is preferred to be equally distant from a first one of the two adjacent signal lines and a second one of the two adjacent signal lines in the predetermined direction.

In this case, a parasitic capacitance provided between the first one of the two adjacent signal lines and the signal line portion can be equalized to a parasitic capacitance provided between the second one of the two adjacent signal lines and the signal line portion. Noise is thus unlikely to be superimposed on a signal.

Embodiments of the present invention will be described in detail below with reference to the drawings. Identical or corresponding portions in the drawings will be denoted by identical reference signs and will not be described repeatedly.

First Embodiment

<Liquid Crystal Display Device>

A liquid crystal display device 1 will now be described with reference to FIG. 1 as a display device according to the first embodiment of the present invention. FIG. 1 is a diagram depicting an outline configuration of the liquid crystal display device 1.

The liquid crystal display device 1 includes a display panel 2, a source driver 3, a display control circuit 4, and a power supply 5. The display panel 2 includes an active-matrix substrate 20a, a counter substrate 20b, and a liquid crystal layer (not depicted) enclosed between these substrates.

The active-matrix substrate 20a is electrically connected to the source driver 3. The source driver 3 is provided on a flexible substrate or the like. The display control circuit 4 is electrically connected to the display panel 2, the source driver 3, and the power supply 5. The display control circuit 4 transmits a control signal to the source driver 3 and gate drivers 11 (see FIG. 3). The gate drivers 11 are provided on the active-matrix substrate 20a. Examples of the control signal include a reset signal (CLR), clock signals (CKA and CKB), and a data signal. The power supply 5 is electrically connected to the display panel 2, the source driver 3, and the display control circuit 4. The power supply 5 supplies the display panel 2, the source driver 3, and the display control circuit 4, with power supply voltage (VSS).

<Active-Matrix Substrate>

Figure 2:
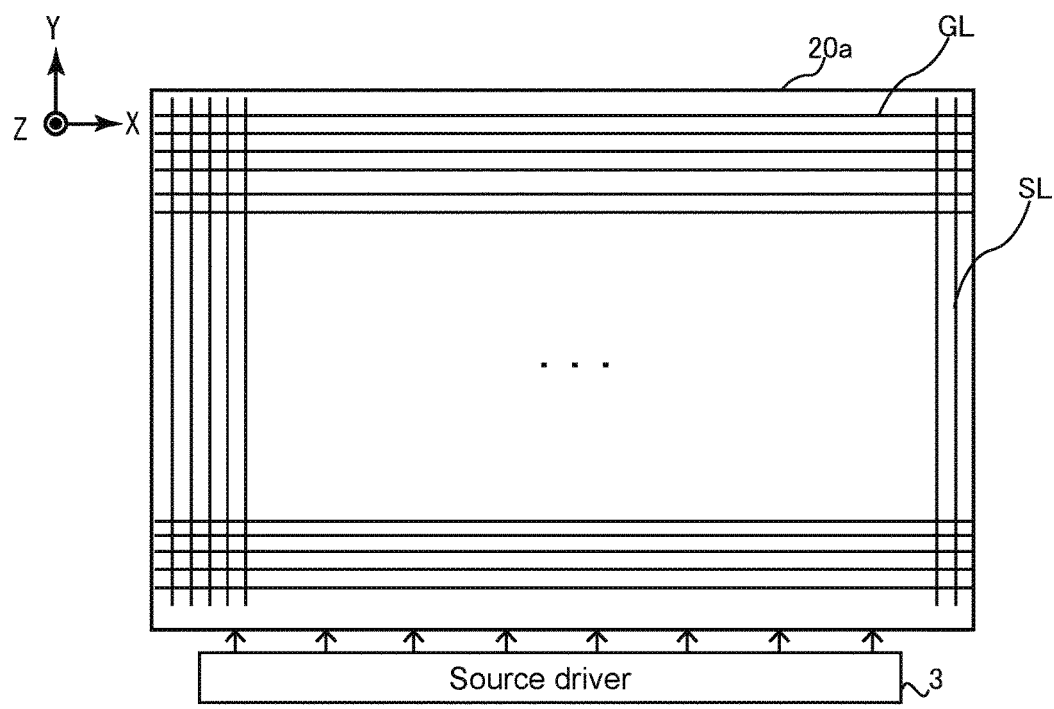
FIG. 2 is a schematic diagram depicting an outline configuration of an active-matrix substrate in FIG. 1.
Figure 3:
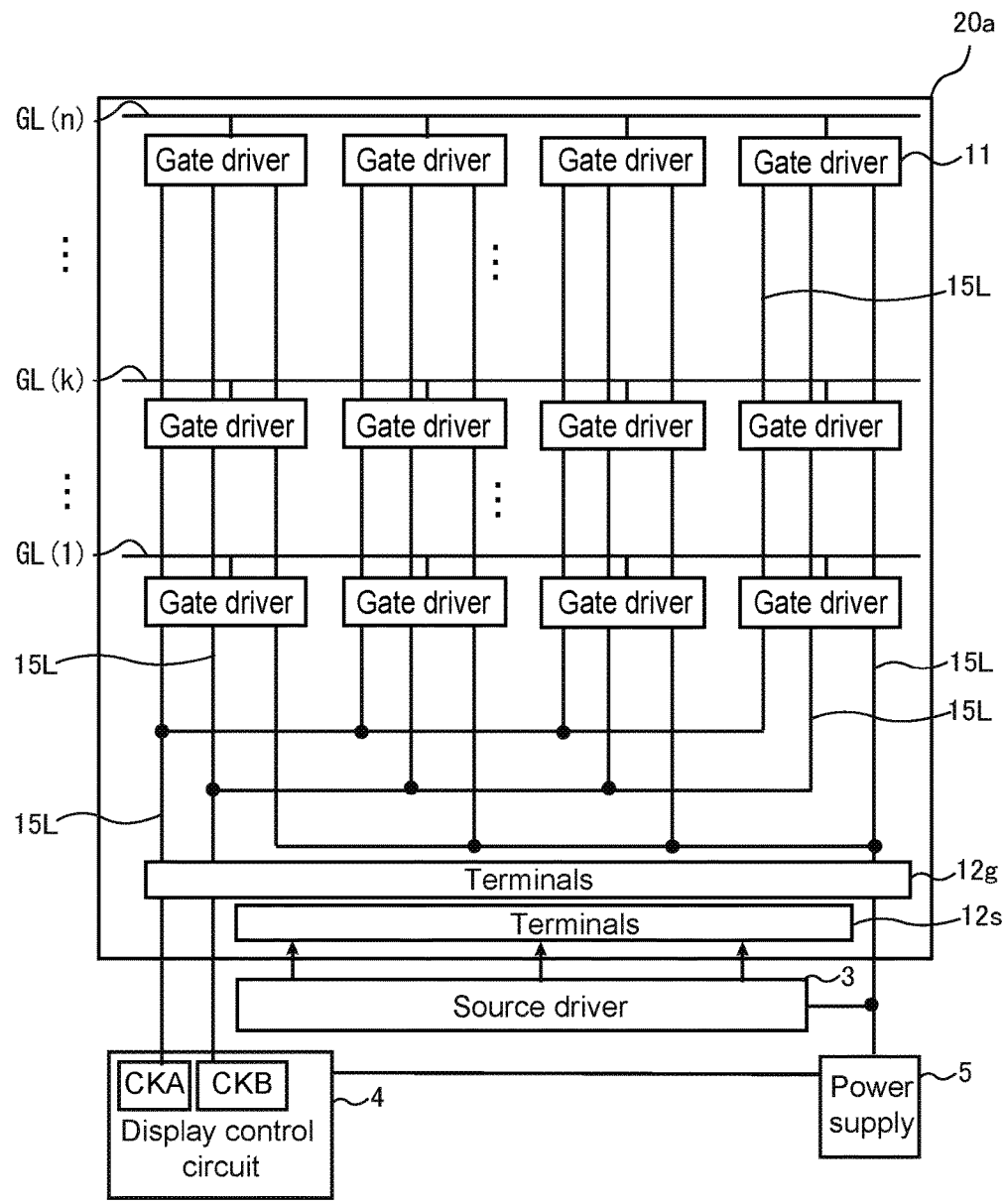
FIG. 3 is a schematic diagram depicting an outline configuration of the active-matrix substrate in FIG. 1.

The active-matrix substrate 20a will be described with reference to FIGS. 2 and 3. FIG. 2 is a diagram depicting an outline configuration of the active-matrix substrate 20a. FIG. 3 is a diagram depicting the active-matrix substrate 20a with no source line SL, and outline configurations of components connected to the active-matrix substrate 20a.

As depicted in FIG. 2, the active-matrix substrate 20a is provided with a plurality of (n according to the present embodiment) gate lines GL at substantially equal intervals in a Y direction. The active-matrix substrate 20a is further provided with a plurality of source lines SL at substantially equal intervals in an X direction. The source lines SL each serve as a data line. The plurality of source lines SL crosses the plurality of gate lines GL. A region surrounded with adjacent two of the gate lines GL in the Y direction and adjacent two of the source lines SL in the X direction corresponds to a single pixel. In a case where the counter substrate 20b includes three color filters in red (R), green (G), and blue (B), each pixel is disposed correspondingly to one of the colors of the color filters. Specifically, the gate lines GL and the source lines SL define a display region.

As depicted in FIG. 3, the gate drivers 11 are each provided between adjacent two of the gate lines GL in the Y direction. The gate lines GL are each connected with four of the gate drivers 11. The four gate drivers 11 are disposed at substantially equal intervals.

The active-matrix substrate 20a has a frame region provided with a terminal portion 12g. The terminal portion 12g is connected with the display control circuit 4 and the power supply 5. The terminal portion 12g receives a control signal from the display control circuit 4 and power supply voltage from the power supply 5. The control signal and the power supply voltage received by the terminal portion 12g are supplied to each of the gate drivers 11 via lines 15L.

The gate drivers 11 each transmit a state signal to the connected gate line GL in accordance with the received control signal. The state signal indicates whether or not the gate line GL connected to the gate driver 11 is in a selected state. The gate drivers 11 each transmit the state signal to the gate line GL in the subsequent row. The four gate drivers 11 connected to one of the gate lines GL operate in synchronization.

The frame region of the active-matrix substrate 20a is further provided with a terminal portion 12s connecting the source driver 3 and the source lines SL. The source driver 3 transmits a data signal to each of the source lines SL in accordance with a control signal transmitted from the display control circuit 4.

<Configuration of Gate Driver>

Figure 4:
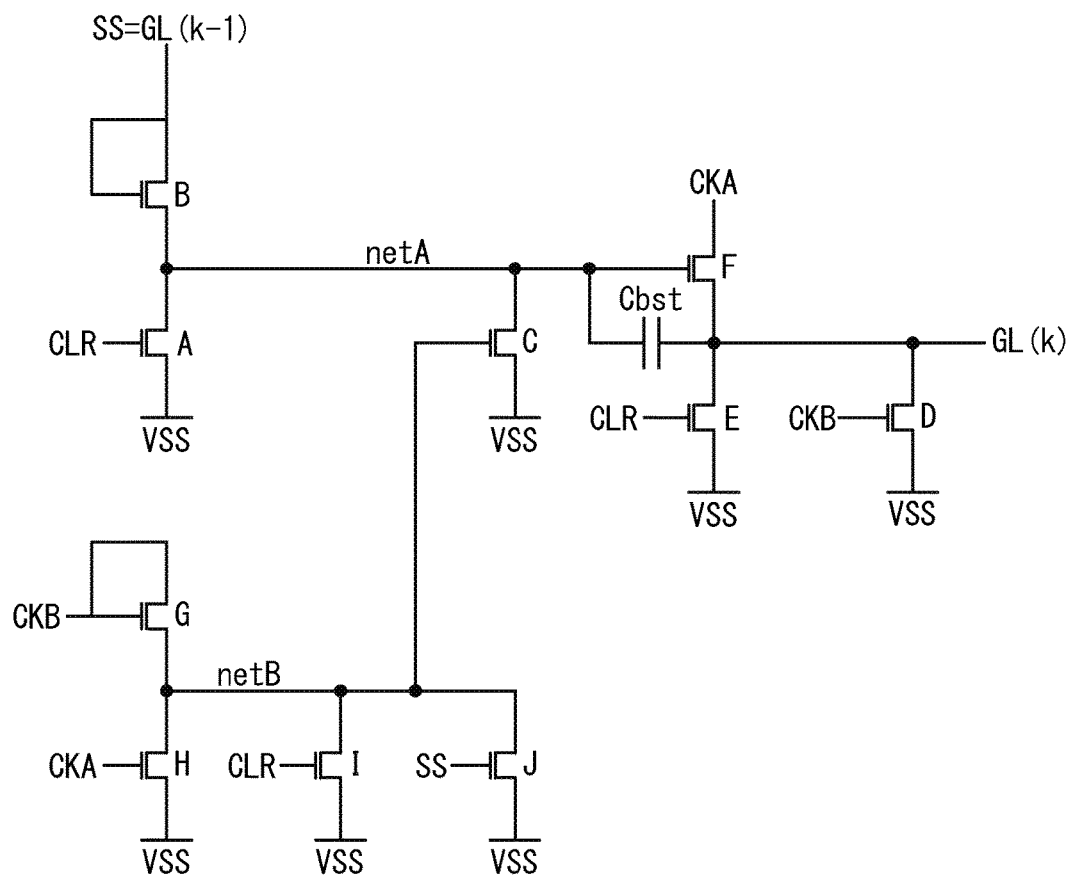
FIG. 4 is a diagram of an exemplary equivalent circuit of a gate driver.

The gate drivers 11 will be described in terms of their configuration with reference to FIG. 4. FIG. 4 is diagram depicting an exemplary equivalent circuit of the gate driver 11 (hereinafter, referred to as a gate driver 11(k)) which is disposed between a gate line GL(k) and a gate line GL(k−1) and is connected to the gate line GL(k). Reference sign k denotes any one of integers from one to n.

The gate driver 11 includes thin film transistors (hereinafter, referred to as a TFT-A to a TFT-J) denoted by alphabets A to J in the figure and each serving as a switching element. The gate driver 11 further includes a capacitor Cbst, as well as a netA and a netB each serving as an internal line. The netA connects a drain terminal of the TFT-A, a drain terminal of the TFT-B, a drain terminal of the TFT-C, a first one of electrodes the capacitor Cbst, and a gate terminal of the TFT-F. The netB connects a gate terminal of the TFT-C, a drain terminal of the TFT-G, a drain terminal of the TFT-H, a drain terminal of the TFT-I, and a drain terminal of the TFT-J.

A gate terminal of the TFT-A receives the reset signal CLR. The drain terminal of the TFT-A is connected with the netA. A source terminal of the TFT-A receives the power supply voltage VSS.

A gate terminal and a source terminal of the TFT-B are connected with the gate line GL(k−1) in the preceding row. The gate terminal and the source terminal thus receive a set signal SS. The TFT-B of the gate driver 11 configured to drive a gate line GL(1) receives a gate start pulse signal from the display control circuit 4, which serves as the set signal SS. The drain terminal of the TFT-B is connected with the netA.

The gate terminal of the TFT-C is connected with the netB. The drain terminal of the TFT-C is connected with the netA. A source terminal of the TFT-C receives the power supply voltage VSS.

A gate terminal of the TFT-D receives the clock signal CKB. A drain terminal of the TFT-D is connected with the gate line GL(k). A source terminal of the TFT-D receives the power supply voltage VSS.

A gate terminal of the TFT-E receives the reset signal CLR. A drain terminal of the TFT-E is connected with the gate line GL(k). A source terminal of the TFT-E receives the power supply voltage VSS.

The gate terminal of the TFT-F is connected with the netA. A drain terminal of the TFT-F is connected with the gate line GL(k). A source terminal of the TFT-F receives the clock signal CKA.

A gate terminal and a source terminal of the TFT-G each receive the clock signal CKB. The drain terminal of the TFT-G is connected with the netB.

A gate terminal of the TFT-H receives the clock signal CKA. The drain terminal of the TFT-H is connected with the netB. A source terminal of the TFT-H receives the power supply voltage VSS.

A gate terminal of the TFT-I receives the reset signal CLR. The drain terminal of the TFT-I is connected with the netB. A source terminal of the TFT-I receives the power supply voltage VSS.

A gate terminal of the TFT-J is connected with the gate line GL(k−1) in the preceding row. The gate terminal thus receives the set signal SS. The drain terminal of the TFT-J is connected with the netB. A source terminal of the TFT-J receives the power supply voltage VSS.

The TFT-J is set to be higher in capability than the TFT-G. This setting is exemplified in one of the following cases (1) to (3).
(1) The TFT-J is larger in channel width than the TFT-G.
(2) The TFT-J is shorter in channel length than the TFT-G.
(3) The TFT-J is larger in channel width than the TFT-G and is shorter in channel length than the TFT-G.

The first one of the electrodes of the capacitor Cbst is connected with the netA. A second one of the electrodes of the capacitor Cbst is connected with the gate line GL(k).

Figure 6:
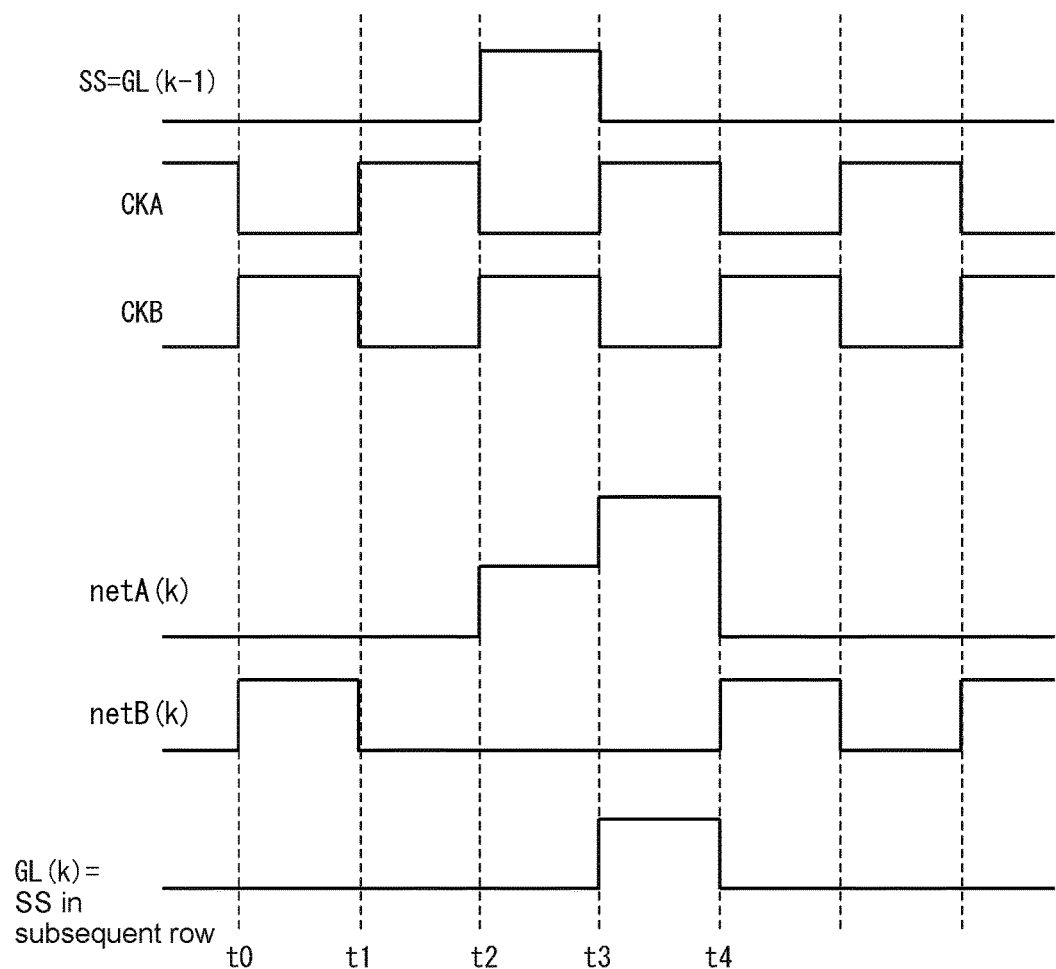
FIG. 6 is a timing chart upon control of a potential of a gate line by the gate driver in FIG. 4.

The clock signal CKA and the clock signal CKB are two-phase clock signals each having a phase reversed in every horizontal scan period (see FIG. 6). FIG. 4 depicts the gate driver 11(k). The gate terminal of the TFT-D in each of a gate driver 11(k+1) in the subsequent row and a gate driver 11(k−1) in the preceding row receives the clock signal CKA. The source terminal of the TFT-F receives the clock signal CKB. The gate terminal and the source terminal of the TFT-G each receive the clock signal CKA. The gate terminal of the TFT-H receives the clock signal CKB.

<Disposition of Gate Drivers>

Figure 5:
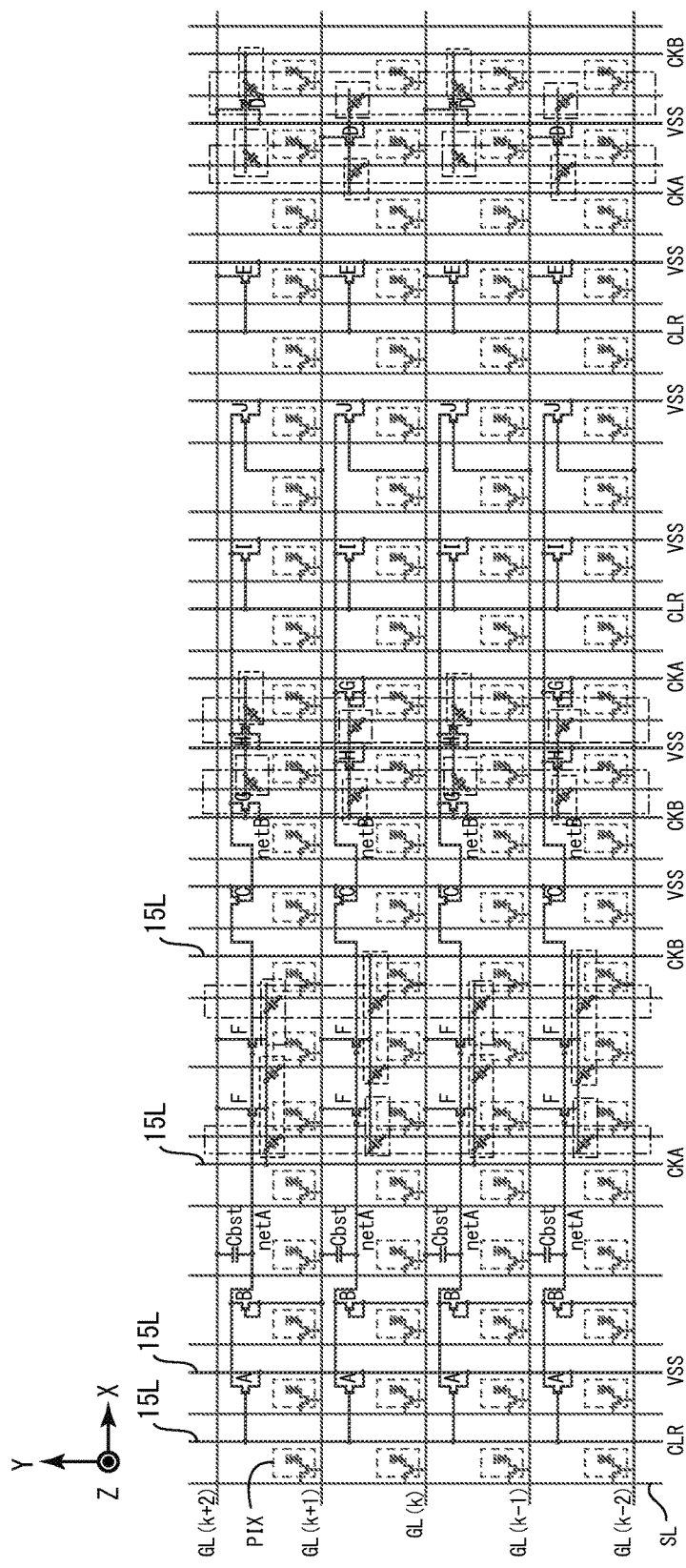
FIG. 5 is a schematic diagram depicting disposition in a display region of the gate driver in FIG. 4.

The gate drivers 11 will be described in terms of their disposition in the display region with reference to FIG. 5. FIG. 5 is a schematic diagram depicting disposition of the gate drivers 11 in the display region. FIG. 5 includes alphabets A to J corresponding to the TFT-A to the TFT-J depicted in FIG. 4.

Elements of the gate drivers 11 disperse between adjacent two of the gate lines GL. FIG. 5 exemplifies a case where elements of the gate driver 11(k−1), elements of the gate driver 11(k), elements of the gate driver 11(k+1), and elements of a gate driver 11(k+2) are disposed in pixels PIX in a same column. The TFT-A to the TFT-J of the gate driver 11(k−1) are connected, via the lines 15L, with the TFT-A to the TFT-J of the gate driver 11(k), the TFT-A to the TFT-J of the gate driver 11(k+1), and the TFT-A to the TFT-J of the gate driver 11(k+2). Lines L, the netAs, and the netBs are provided on a layer having the source lines SL and on a layer different from the layer having the source lines SL with an interlayer contact or the like being interposed therebetween. This configuration prevents an electric short circuit fault between the source lines SL and the lines L, the netAs, and the netBs.

<Operation of Gate Driver>

The gate driver 11 will be described in terms of its operation with reference to FIGS. 4 and 6. FIG. 6 is a timing chart upon control of a potential of the gate line GL(k) by the gate driver 11(k).

The gate driver 11(k) receives the clock signals CKA and CKB supplied from the display control circuit 4 and reversed in phase in every horizontal scan period (1H). Although not indicated in FIG. 6, the gate driver 11(k) receives the reset signal CLR supplied from the display control circuit 4 and reaching a high (H) level for a constant period in every vertical scan period. The reset signal CLR thus received causes the potentials of the netA, the netB, and the gate line GL(k) to reach a low (L) level.

The source terminal of the TFT-F and the gate terminal of the TFT-H receive the clock signal CKA at the L level from time t0 to time t1 in FIG. 6. The gate terminal of the TFT-D as well as the gate terminal and the source terminal of the TFT-G receive the clock signal CKB at the H level. This turns on the TFT-G and turns off the TFT-H. The potential of the netB then reaches the H level. The TFT-C is turned on to cause the potential of the netA to reach the L level. Furthermore, the TFT-D is turned on and the TFT-F is turned off to cause the potential of the gate line GL(k) to reach the L level. In other words, the gate line GL(k) comes into an unselected state.

At the time t1 in FIG. 6, the clock signal CKA reaches the H level whereas the clock signal CKB reaches the L level. This turns off the TFT-G and turns on the TFT-H. The potential of the netB then reaches the L level. The TFT-C is turned off to keep the potential of the netA at the L level. Furthermore, the TFT-D is turned off to keep the potential of the gate line GL(k) at the L level.

At time t2 in FIG. 6, the clock signal CKA reaches the L level whereas the clock signal CKB reaches the H level. Simultaneously, the gate terminal and the source terminal of the TFT-B and the gate terminal of the TFT-J receive the set signal SS via the gate line GL(k-1). The TFT-B is then turned on and the potential of the netA reaches a level obtained by subtracting threshold voltage Vth of the TFT-B from the H level. The TFT-J and the TFT-G are turned on whereas the TFT-H is turned off. The TFT-J is higher in capability than the TFT-G in this case. The potential of the netB is thus kept at the L level. The TFT-C and the TFT-F are turned off. This keeps the potential of the netA. The TFT-D is kept on in this case. This keeps the potential of the gate line GL(k) at the L level.

At time t3 in FIG. 6, the clock signal CKA reaches the H level whereas the clock signal CKB reaches the L level. This turns on the TFT-F and turns off the TFT-D. The capacitor Cbst is provided between the netA and the gate line GL(k). The potential of the netA thus increases to exceed the H level of the clock signal CKA as the potential of the drain terminal of the TFT-F increases. In this case, the TFT-G and the TFT-J are turned off whereas the TFT-H is turned on. The potential of the netB is thus kept at the L level. The TFT-C is kept off in this case. The potential of the gate line GL(k) thus reaches the H level. In other words, the gate line GL(k) comes into the selected state.

At time t4 in FIG. 6, the clock signal CKA reaches the L level whereas the clock signal CKB reaches the H level. This turns on the TFT-G and turns off the TFT-H. The potential of the netB then reaches the H level. When the potential of the netB reaches the H level, the TFT-C is turned on and the potential of the netA reaches the L level. The TFT-D is turned on and the TFT-F is turned off in this case. The potential of the gate line GL(k) thus reaches the L level. In other words, the gate line GL(k) comes into the unselected state.

In this manner, transmission of the set signal SS from the gate driver 11(k) to the gate line GL(k) brings the gate line GL(k) into the selected state. In the liquid crystal display device 1, the plurality of gate drivers 11 sequentially scans the plurality of gate lines GL and the source driver 3 supplies each of the source lines SL with a data signal to cause the display panel 2 to display images.

<Measure Against Data Signal Noise>

Figure 5A:
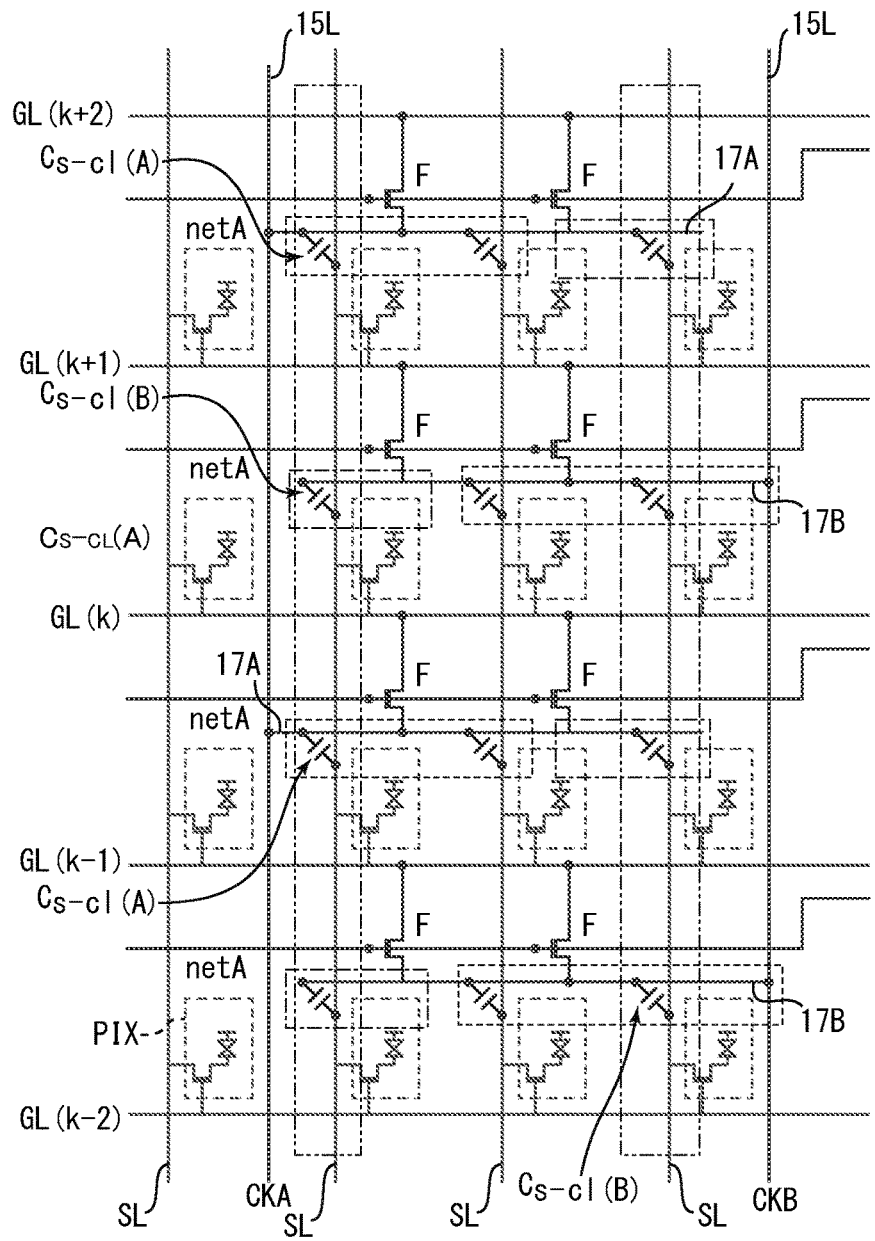
FIG. 5A is an enlarged schematic diagram of a first portion in FIG. 5.
Figure 5B:
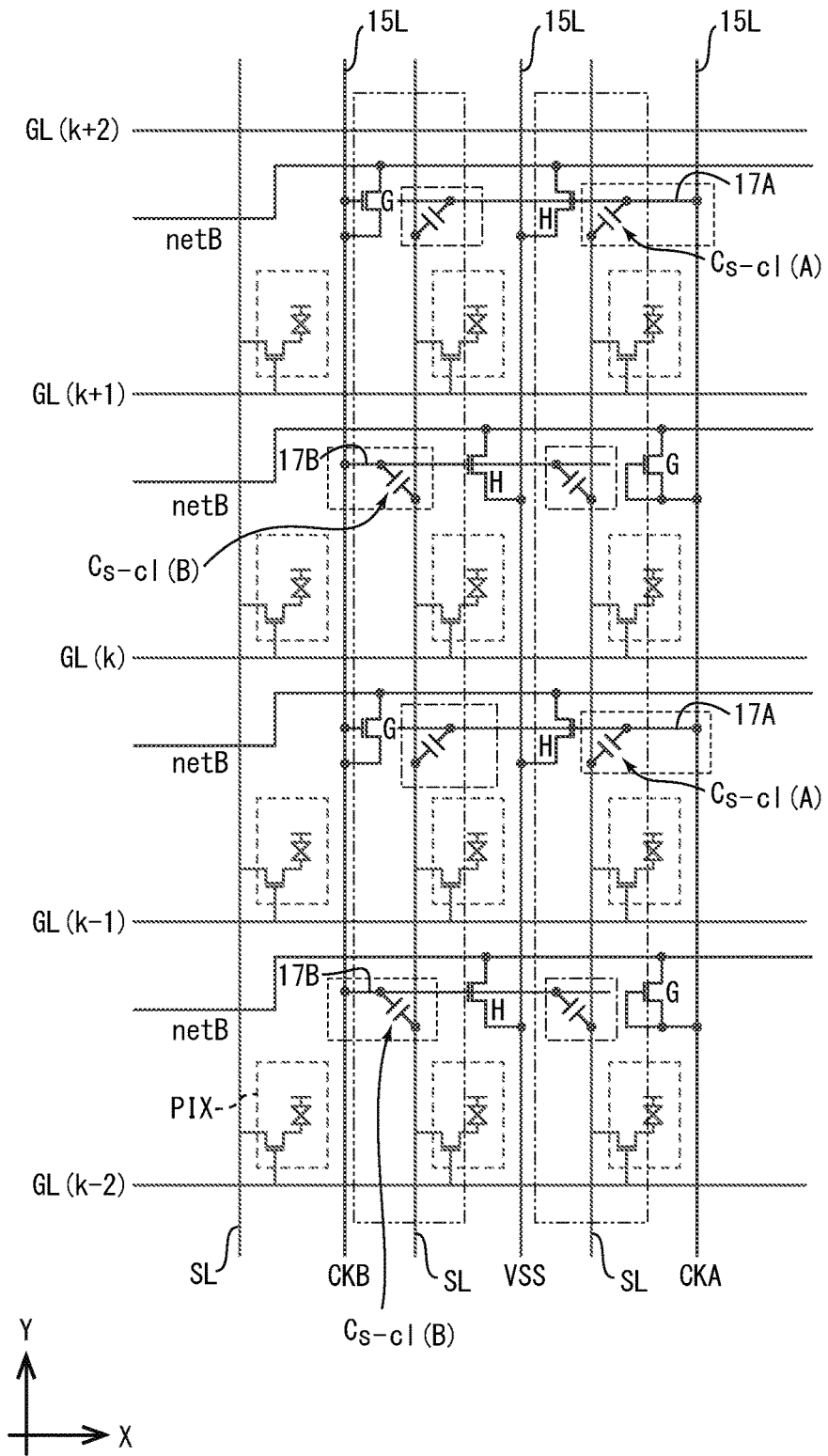
FIG. 5B is an enlarged schematic diagram of a second portion in FIG. 5 different from the first portion in FIG. 5A.
Figure 5C:
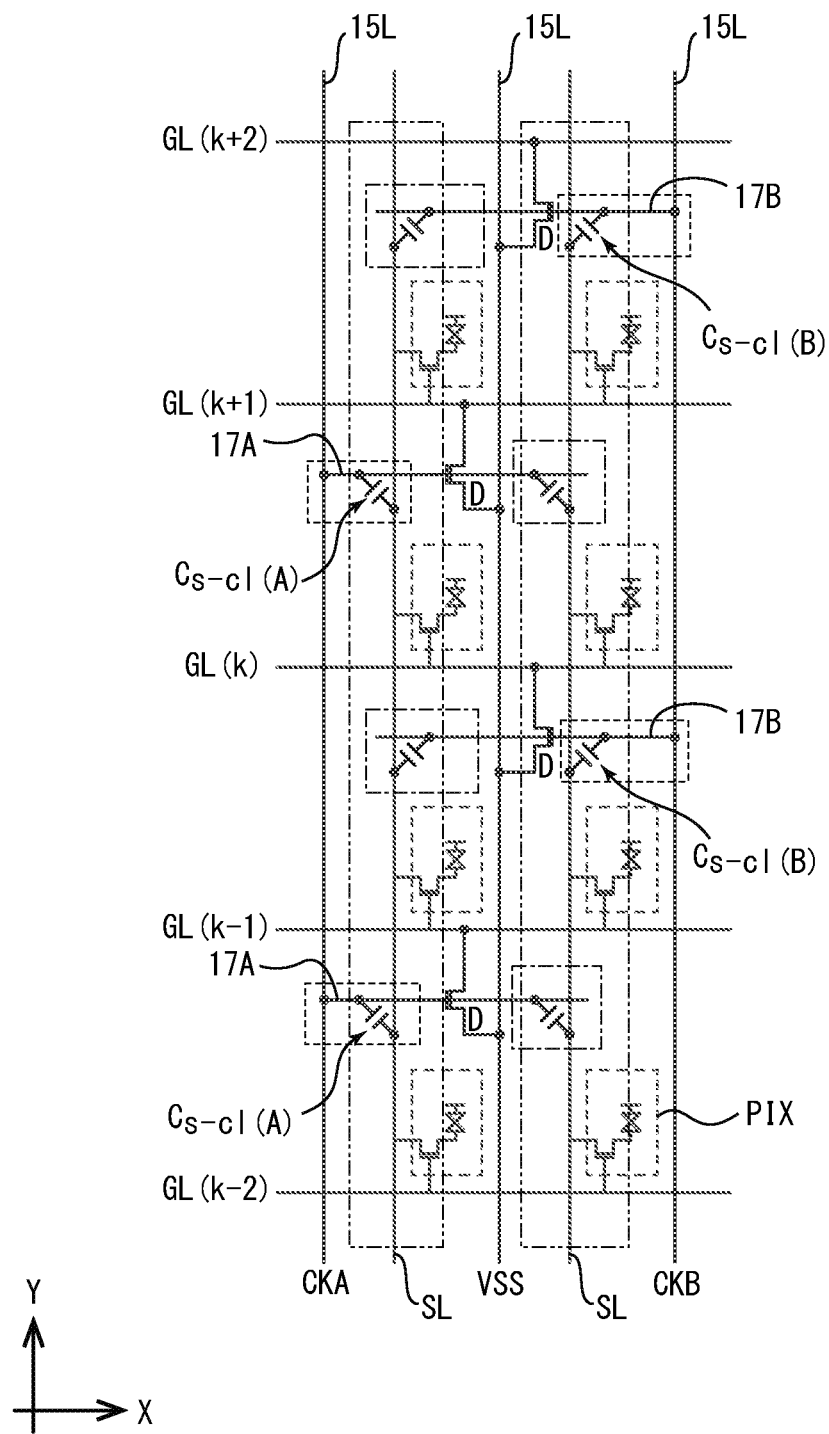
FIG. 5C is an enlarged schematic diagram of a third portion in FIG. 5 different from the first portion in FIG. 5A and the second portion in FIG. 5B.

FIG. 5A is an enlarged schematic diagram of a first portion in FIG. 5. FIG. 5B is an enlarged schematic diagram of a second portion in FIG. 5 different from the first portion in FIG. 5A. FIG. 5C is an enlarged schematic diagram of a third portion in FIG. 5 different from the first portion in FIG. 5A and the second portion in FIG. 5B.

When the gate drivers 11 are disposed in the display region, lines 17A for transmission of the clock signal CKA and lines 17B for transmission of the clock signal CKB cross the source lines SL as depicted in portions surrounded with broken lines in FIGS. 5A, 5B, and 5C. The lines 17A extend in the X direction from the line 15L for transmission of the clock signal CKA. The lines 17B extend in the X direction from the line 15L for transmission of the clock signal CKB. A parasitic capacitance $C_{s\text{-}cl(A)}$ is provided at each of nodes between the lines 17A and the source lines SL. A parasitic capacitance $C_{s\text{-}cl(B)}$ is provided at each of nodes between the lines 17B and the source lines SL.

According to the present embodiment, amplitude of the clock signal CKA, i.e. a potential variation amount $\Delta V_{(A)}$ of the lines 17A, amplitude of the clock signal CKB, i.e. a potential variation amount $\Delta V_{(B)}$ of the lines 17B, the parasitic capacitance $C_{s\text{-}cl(A)}$, and the parasitic capacitance $C_{s\text{-}cl(B)}$ are set for each of the source lines SL to satisfy the following formula (1).

[Formula 1]

$$\Sigma C_{c\text{-}cl(A)} \Delta V_{(A)} + \Sigma C_{c\text{-}cl(B)} \Delta V_{(B)} = 0 \tag{1}$$

The amount $\Delta V_{(A)}$ is equal to the amount $\Delta V_{(B)}$ in the present embodiment. Furthermore, the parasitic capacitance $C_{s\text{-}cl(A)}$ is equal to the parasitic capacitance $C_{s\text{-}cl(B)}$. Equalizing the number of the parasitic capacitances $C_{s\text{-}cl(A)}$ and the number of the parasitic capacitances $C_{s\text{-}cl(B)}$, in other words, the number of nodes on one of the source lines SL with the lines 17A and the number of nodes on the source line SL with the lines 17B, thus allows noise caused by the parasitic capacitances $C_{s\text{-}cl(A)}$ and noise caused by the parasitic capacitances $C_{s\text{-}cl(B)}$ to cancel each other. Noise is then unlikely to be superimposed on a data signal transmitted on one of the source lines SL crossing the lines 17A and the lines 17B. A reason therefor will be described below.

Figure 7:
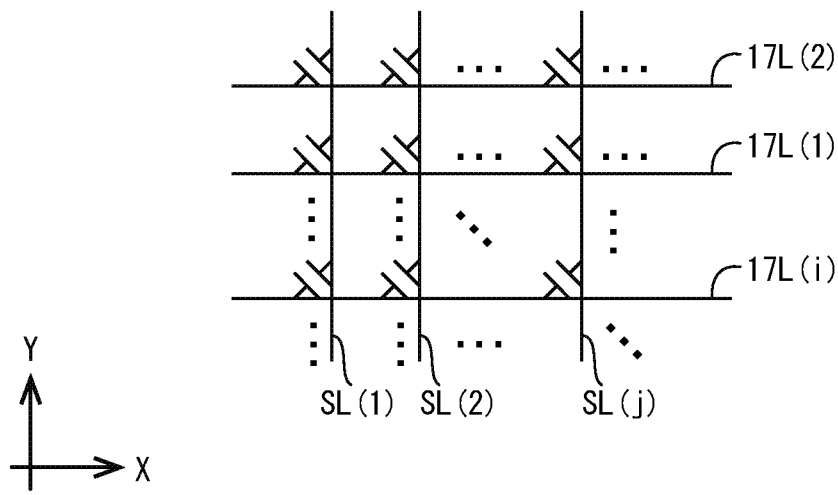
FIG. 7 is a schematic diagram in a state where a plurality of source lines crosses a plurality of lines.
Figure 8:
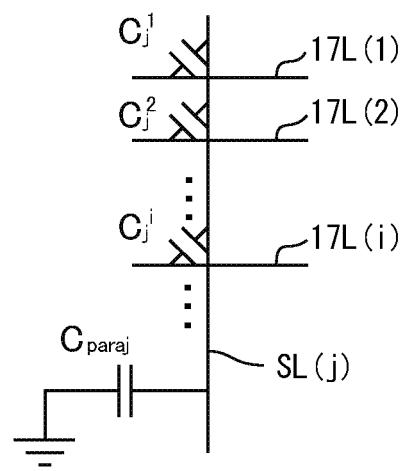
FIG. 8 is a schematic diagram in a state where a j-th one of the source lines depicted in FIG. 7 crosses the plurality of lines.

FIG. 7 is a schematic diagram in a state where the plurality of source lines SL crosses a plurality of lines 17L. FIG. 8 is a schematic diagram in a state where a j-th one of the source lines SL (hereinafter, referred to as a source line SL(j)) depicted in FIG. 7 crosses the plurality of lines 17L. The lines 17L each have a potential switched at predetermined timing. Specific examples of the lines 17L include the lines 17A the lines 17B.

As depicted in FIG. 8, a parasitic capacitance $C_j^i$ is provided at each of nodes between the source line SL and the lines 17L. A parasitic capacitance $C_{para_j}$ is provided between the source line SL(j) and a common electrode provided on the counter substrate 20b. The parasitic capacitances on the source line SL(j), except the parasitic capacitance provided at the node with an i-th one of the lines 17L (hereinafter, referred to as a line 17L(i)), are expressed by the following formula (2).

[Formula 2]

$$C_{para_j}^i = C_{para,j} + \sum_{k \neq i} C_j^k \tag{2}$$

Noise on the source line SL(j) caused by the line 17L(i) is expressed by the following formula (3).

[Formula 3]

$$\Delta V_j^i = \frac{C_j^i}{C_{para_j}^i} \Delta V^i \tag{3}$$

Noise on the source line SL(j) caused by the plurality of lines 17L is expressed by the following formula (4).

[Formula 4]

$$\Delta V_j = \sum_i \Delta V_j^i = \sum_i \frac{C_j^i \Delta V^i}{\tilde{C}_{para_j}} = 0 \quad (4)$$

In a case where there are a large number of the lines 17L or where a large parasitic capacitance is provided between the common electrode and the source line SL(j), the following formula (5) is established for an appropriate value i.

[Formula 5]

$$C_{para_j}^i \gg C_j^i \quad (5)$$

Approximation can be made in this case to cause the parasitic capacitances to be independent from the value i. The following formula (6) is thus established.

[Formula 6]

$$C_{para_j}^i = \tilde{C}_{para,j} \quad (6)$$

Noise on the source line SL(j) caused by the plurality of lines 17L is expressed by the following formula (7) in this case.

[Formula 7]

$$\Delta V_j = \sum_i \Delta V_j^i = \frac{1}{\tilde{C}_{para,j}} \sum_i C_j^i \Delta V^i = 0 \quad (7)$$

Noise is reduced by establishing the following formula (8).

[Formula 8]

$$\sum_i C_j^i \Delta V^i = 0 \quad (8)$$

In a case where equal parasitic capacitances are provided at the nodes between the source line SL and the lines 17L regardless of the value i, the following formula (9) is established.

[Formula 9]

$$C_j^i = C_j \quad (9)$$

Noise on the source line SL(j) caused by the plurality of lines 17L is expressed by the following formula (10) in this case.

[Formula 10]

$$\Delta V_j = \sum_i \Delta V_j^i = \frac{C_j}{\tilde{C}_{para,j}} \sum_i \Delta V^i = 0 \quad (10)$$

Noise is reduced by establishing the following formula (11).

[Formula 11]

$$\sum_i \Delta V^i = 0 \quad (11)$$

Figure 9:
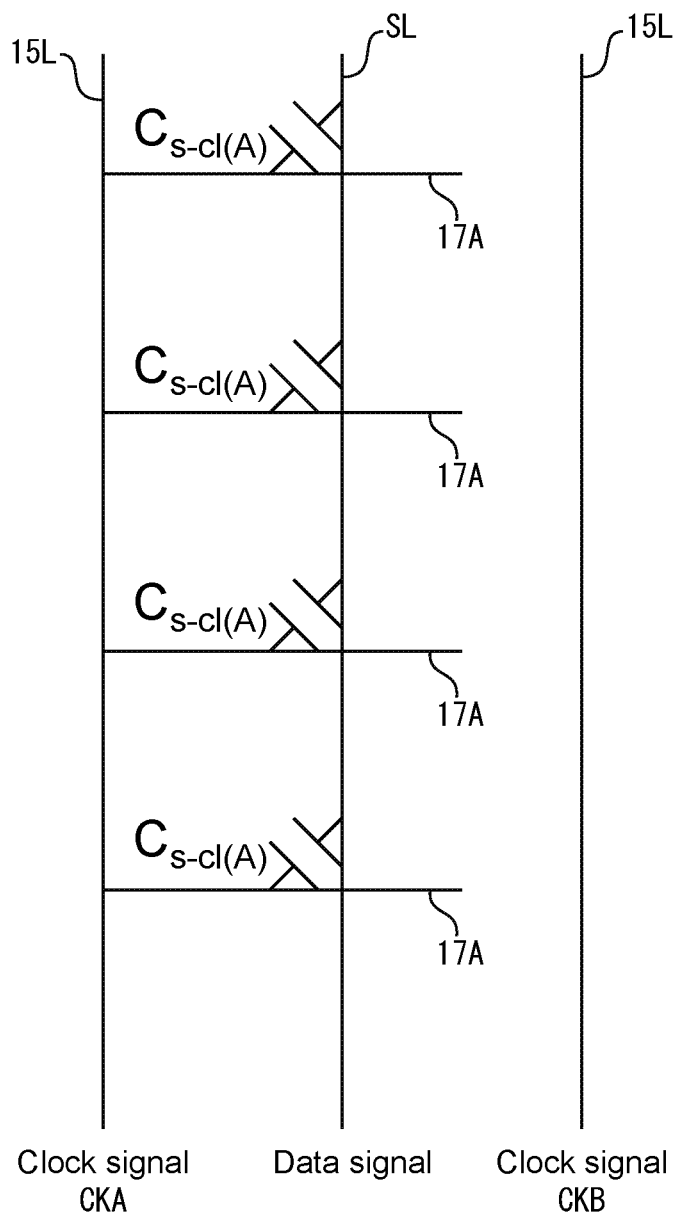
FIG. 9 is a schematic diagram in a state where only lines extending from a line for transmission of a clock signal CKA cross the source line.
Figure 10:
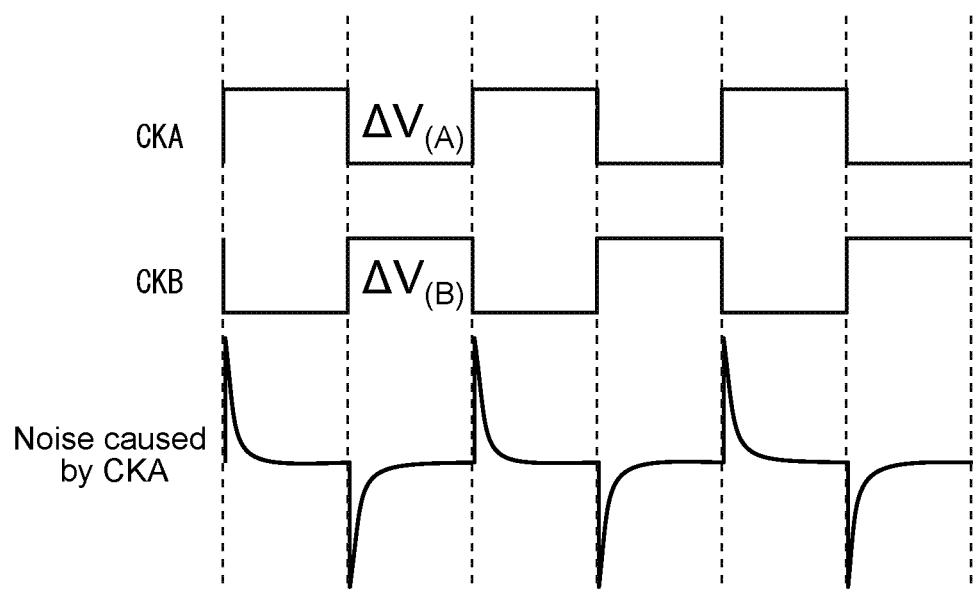
FIG. 10 is a timing chart indicating a relationship among the clock signal CKA, a clock signal CKB, and noise in the state depicted in FIG. 9.
Figure 11:
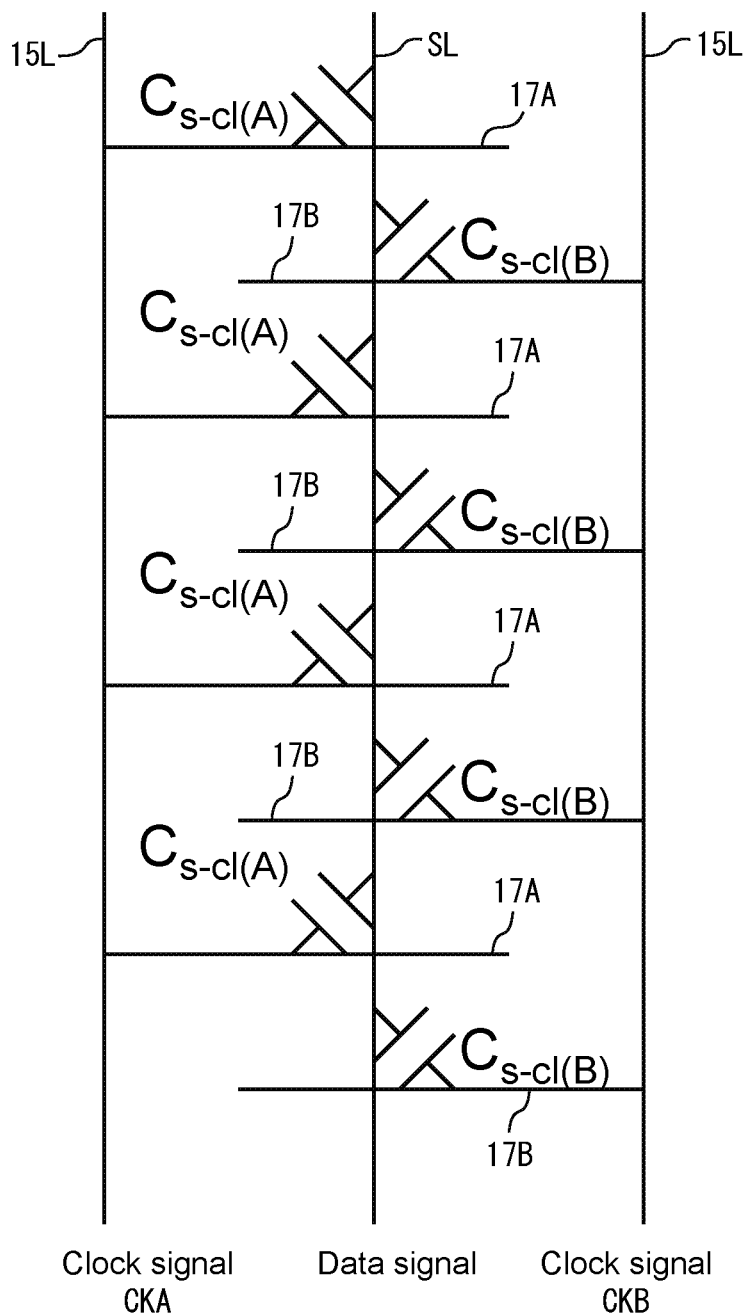
FIG. 11 is a schematic diagram in a state where the lines extending from the line for transmission of the clock signal CKA and lines extending from a line for transmission of the clock signal CKB cross the source line.
Figure 12:
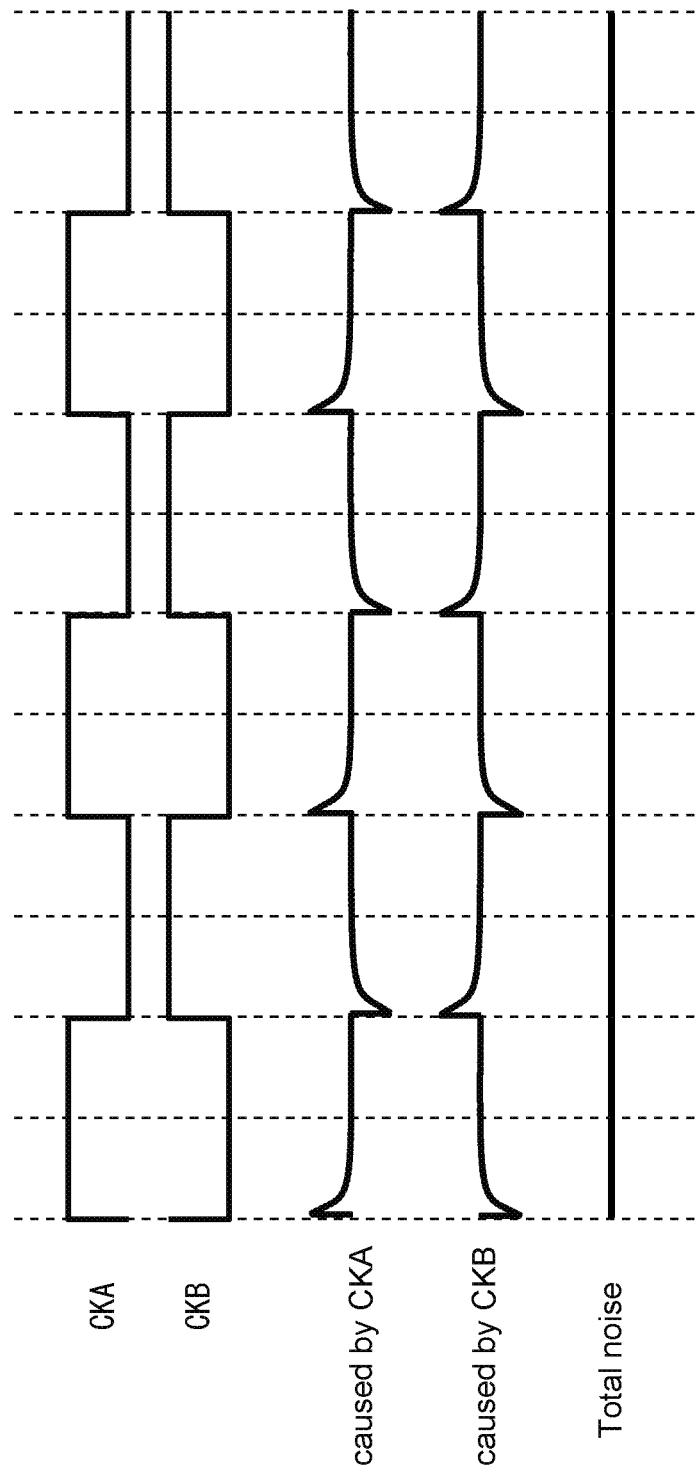
FIG. 12 is a timing chart indicating a relationship among the clock signals CKA and CKB and noise in the state depicted in FIG. 11.

FIG. 9 is a schematic diagram in a state where only the lines 17A cross the source line SL. FIG. 10 is a timing chart indicating a relationship among the clock signals CKA and CKB and noise in the state depicted in FIG. 9. FIG. 11 is a schematic diagram in a state where the lines 17A and the lines 17B cross the source line SL. FIG. 12 is a timing chart indicating a relationship among the clock signals CKA and CKB and noise in the state depicted in FIG. 11.

As depicted in FIG. 9, assume that only the lines 17A cross the source line SL. As indicated in FIG. 10, only noise caused by the parasitic capacitances $C_{s\text{-}cl(A)}$ is superimposed on a data signal transmitted on the source line SL in this case. This noise is generated when the clock signal CKA is switched in phase.

As depicted in FIG. 11, subsequently assume that the lines 17A and the lines 17B cross the source line SL. As indicated in FIG. 12, noise caused by the parasitic capacitances $C_{s\text{-}cl(A)}$ and noise caused by the parasitic capacitances $C_{s\text{-}cl(B)}$ are superimposed on a data signal transmitted on the source line SL in this case.

The potential of the clock signal CKB decreases when the potential of the clock signal CKA increases. In contrast, the potential of the clock signal CKB increases when the potential of the clock signal CKA decreases. Noise caused by the parasitic capacitances $C_{s\text{-}cl(A)}$ is generated when the clock signal CKA is switched in phase. Noise caused by the parasitic capacitances $C_{s\text{-}cl(B)}$ is generated when the clock signal CKB is switched in phase. The noise caused by the parasitic capacitances $C_{s\text{-}cl(A)}$ and the noise caused by the parasitic capacitances $C_{s\text{-}cl(B)}$ are thus generated simultaneously to cancel each other.

As described above, the amplitude $\Delta V_{(A)}$ of the clock signal CKA is equal to the amplitude $\Delta V_{(B)}$ of the clock signal CKB in the present embodiment. The parasitic capacitance $C_{s\text{-}cl(A)}$ is equal to the parasitic capacitance $C_{s\text{-}cl(B)}$. The number of the parasitic capacitances $C_{s\text{-}cl(A)}$ is equal to the number of the parasitic capacitances $C_{s\text{-}cl(B)}$. A sum of the noise caused by the parasitic capacitances $C_{s\text{-}cl(A)}$ and the noise caused by the parasitic capacitances $C_{s\text{-}cl(B)}$ is thus zero as indicated in FIG. 12.

As depicted in portions surrounded with dashed lines in FIGS. 5A, 5B, and 5C, the lines 17A are extended to cross the source lines SL and the lines 17B are extended to cross the source lines SL in the present embodiment. As depicted in portions surrounded with two-dot chain lines in FIGS. 5A, 5B, and 5C, the number of nodes on one of the source lines SL with the lines 17A can thus be equalized to the number of nodes on the source line SL with the lines 17B. In other words, the number of the parasitic capacitances $C_{s\text{-}cl(A)}$ can be equalized to the number of the parasitic capacitances $C_{s\text{-}cl(B)}$ on the single source line SL.

Application Example 1 of First Embodiment

Figure 13:
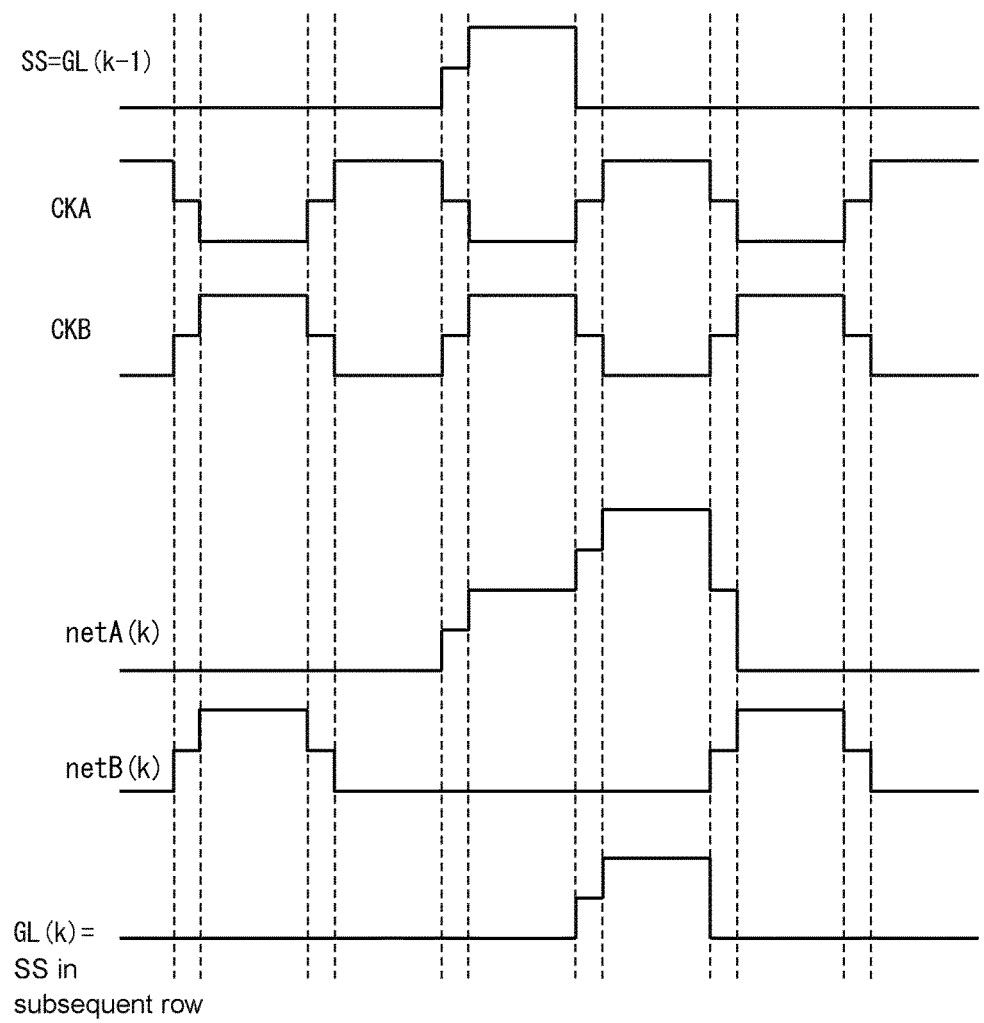
FIG. 13 is a timing chart upon control of the potential of the gate line by the gate driver in FIG. 4, the gate driver controlling in a different manner from the control in FIG. 6.

The potentials of the clock signals CKA and CKB according to the first embodiment have only the H and L levels. As exemplarily indicated in FIG. 13, the potentials can have an intermediate level between the H and L levels in addition to the H and L levels.

Application Example 2 of First Embodiment

The first embodiment refers to the case where the gate drivers 11 are supplied with the two-phase clock signals CKA and CKB. The gate drivers 11 can alternatively be provided with four-phase clock signals CKA, CKB, CKC, and CKD.

Figure 14:
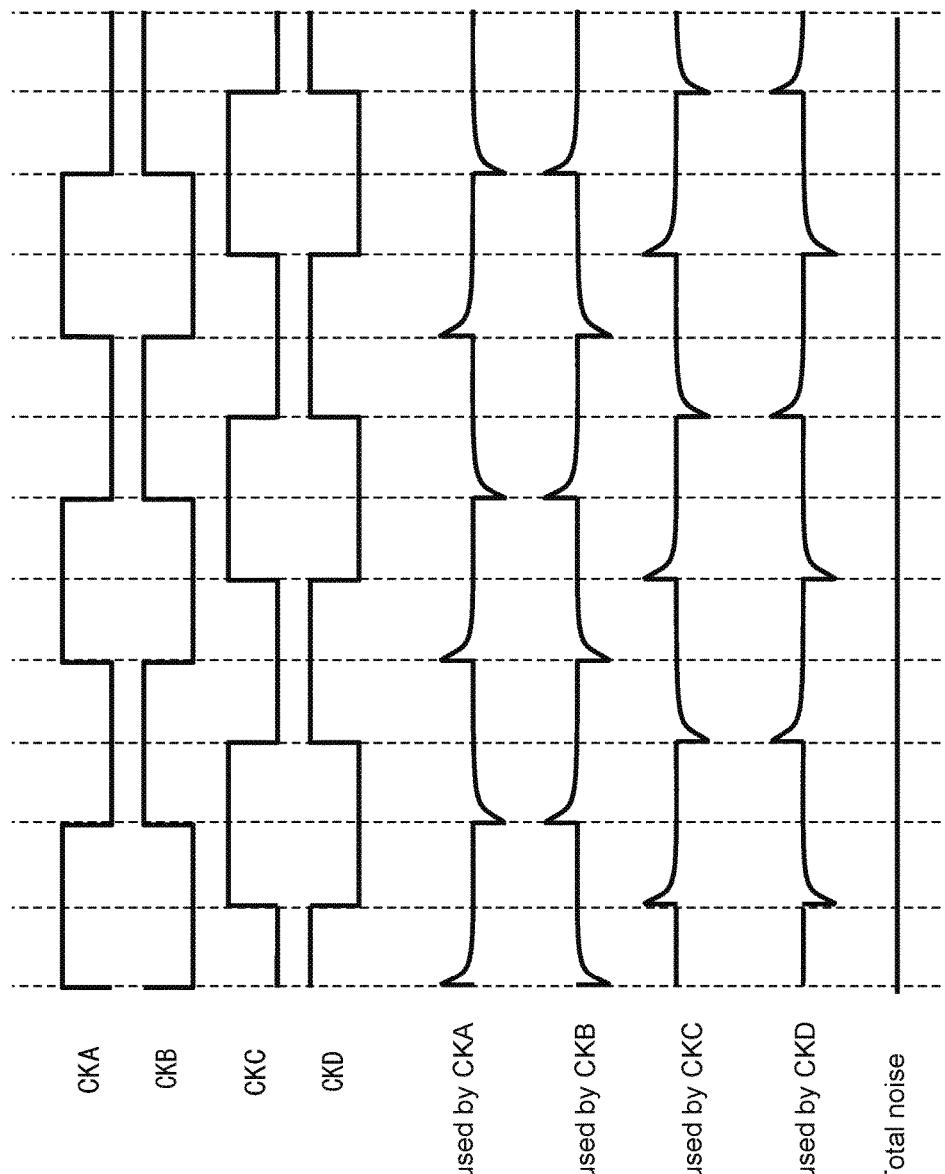
FIG. 14 is a timing chart indicating a relationship among four-phase clock signals CKA, CKB, CKC, and CKD, and noise.

As indicated in FIG. 14, the clock signals CKA, CKB, CKC, and CKD repeatedly reach the H and L levels in every two horizontal periods (2H) in this case. The clock signal CKA and the clock signal CKB are opposite in phase. The clock signal CKC and the clock signal CKD are opposite in phase. The clock signal CKA and the clock signal CKC are shifted in phase by a quarter cycle. The clock signal CKB and the clock signal CKD are shifted in phase by a quarter cycle.

Figure 15:
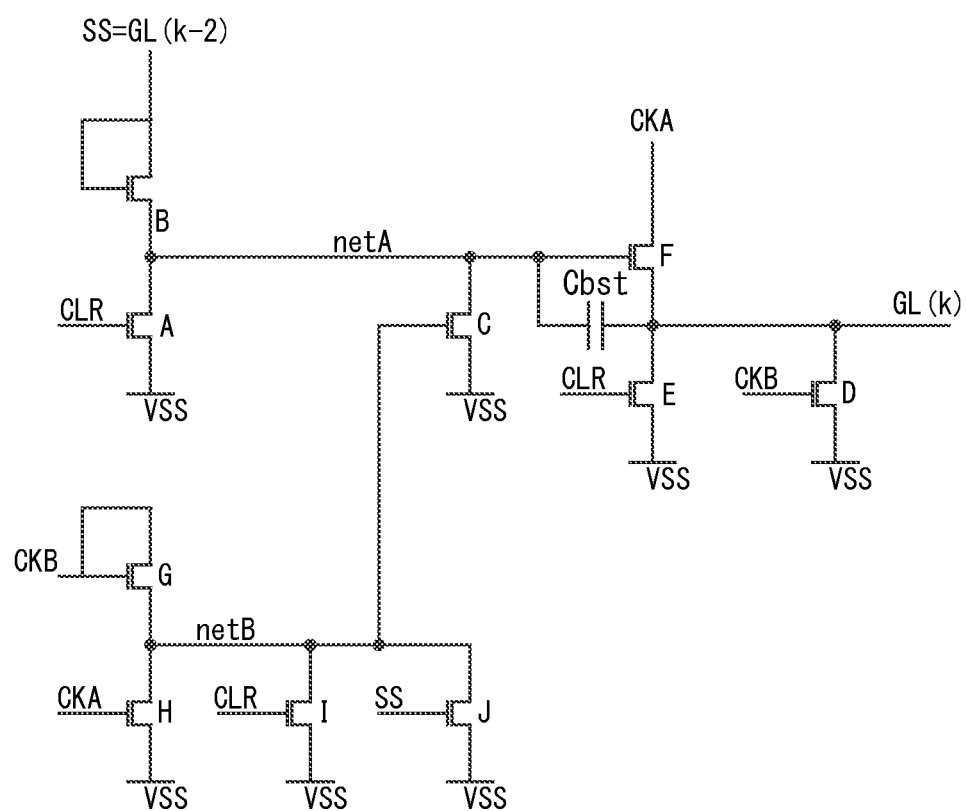
FIG. 15 is a diagram of an exemplary equivalent circuit of a gate driver 11(*k*) configured to be driven by the inputted clock signals CKA and CKB and control a potential of a gate line GL(k).

FIG. 15 depicts the gate driver 11(k) configured to be driven by the inputted clock signals CKA and CKB and control the potential of the gate line GL(k). Unlike the gate driver depicted in FIG. 4, the gate driver 11(k) in FIG. 15 receives the set signal SS from a gate line GL(k−2). Specifically, the gate driver to be driven by the inputted clock signals CKA and CKB receives the set signal SS from the gate line GL in the second preceding row.

Figure 16:
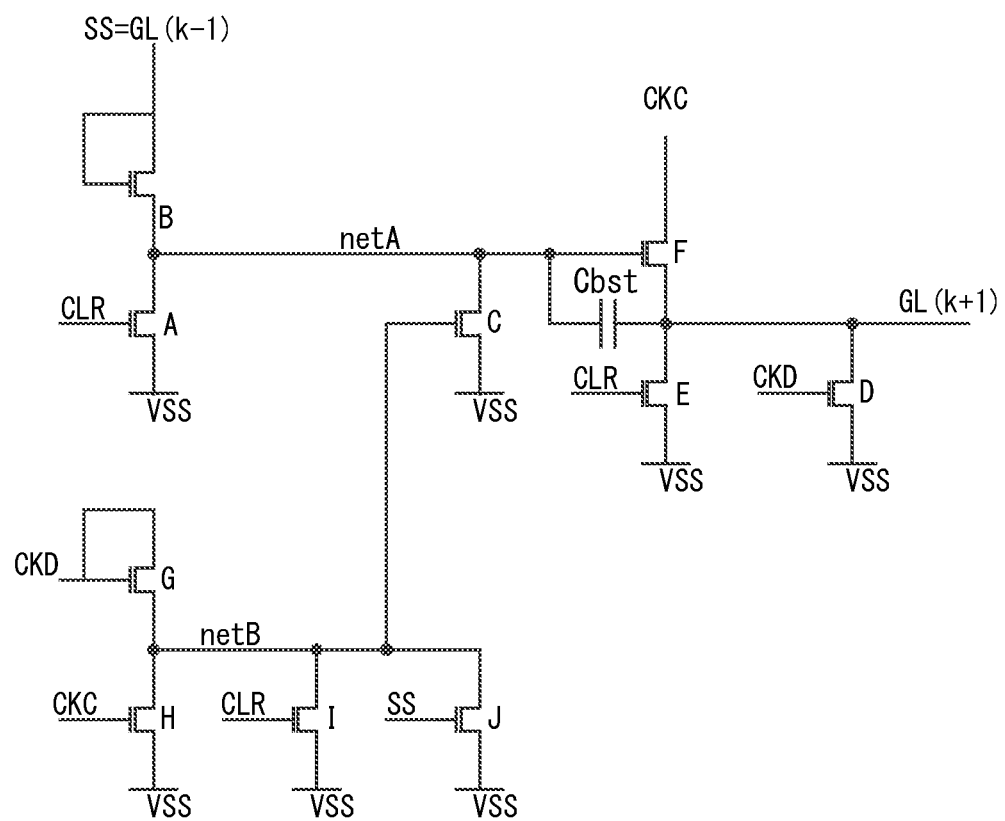
FIG. 16 is a diagram of an exemplary equivalent circuit of a gate driver 11(*k*+1) configured to be driven by the inputted clock signals CKC and CKD and control a potential of a gate line GL(k+1).

FIG. 16 depicts the gate driver 11(k+1) configured to be driven by the inputted clock signals CKC and CKD and control a potential of a gate line GL(k+1). Unlike the gate driver depicted in FIG. 4, the gate driver 11(k+1) in FIG. 16 receives the clock signal CKC instead of the clock signal CKA. The gate driver 11(k+1) receives the clock signal CKD instead of the clock signal CKB. The gate driver 11(k+1) receives the set signal SS from the gate line GL(k−1). Specifically, the gate driver to be driven by the inputted clock signals CKC and CKC receives the set signal SS from the gate line GL in the second preceding row.

Figure 17A:
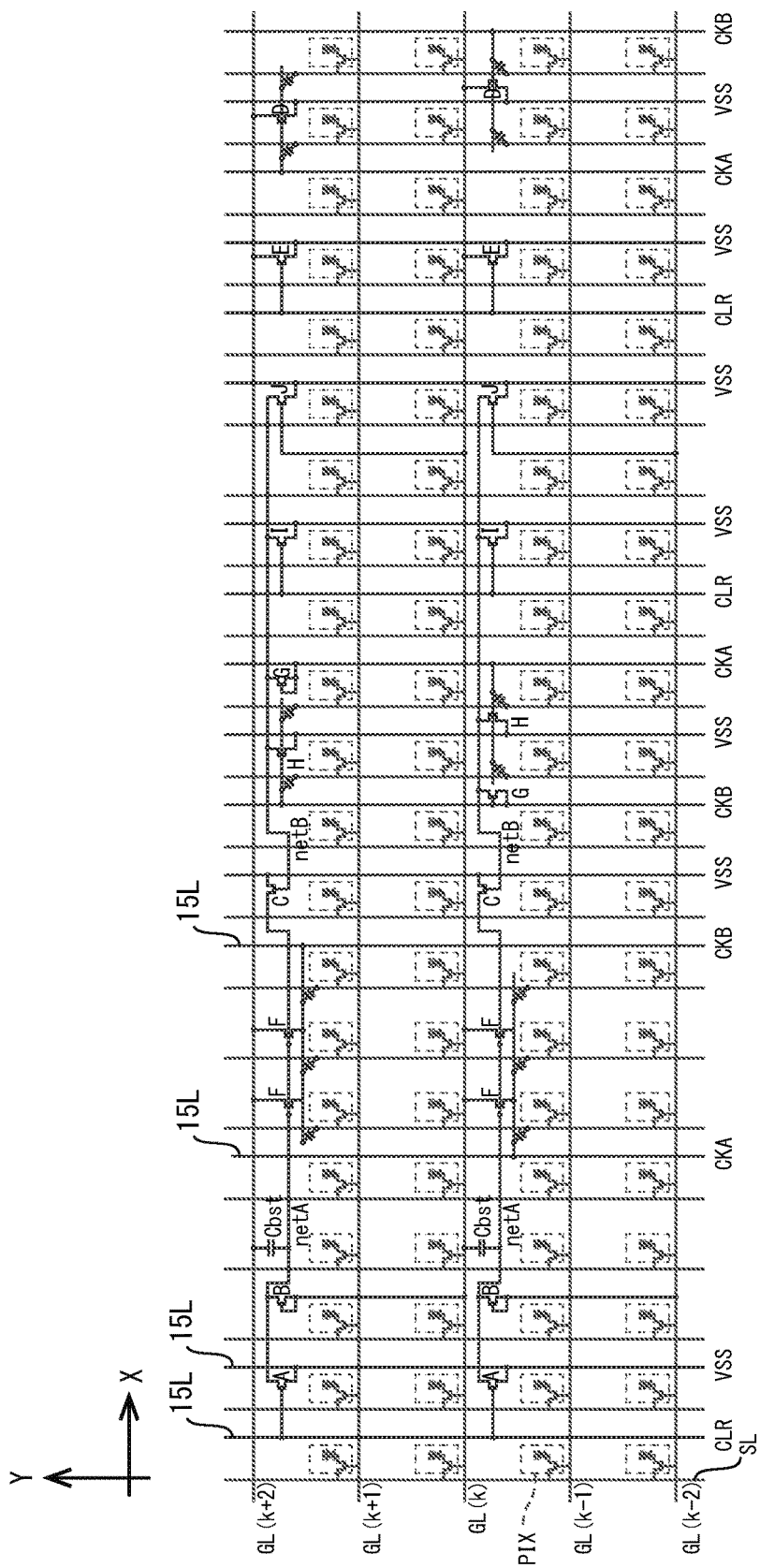
FIG. 17A is a schematic diagram depicting disposition in the display region of the gate driver in FIG. 15.

FIG. 17A depicts disposition in the display region of the gate drivers 11(k) and 11(k+2) to be driven by the inputted clock signals CKA and CKB. FIG. 17A includes alphabets A to J corresponding to the TFT-A to the TFT-J depicted in FIG. 15.

The gate driver 11(k) controls the potential of the gate line GL(k). The gate driver 11(k+2) controls a potential of a gate line GL(k+2). The elements of the gate driver 11(k) disperse between the two adjacent gate lines GL(k) and GL(k−1). The elements of the gate driver 11(k+2) disperse between the two adjacent gate lines GL(k+2) and GL(k+1). The elements of the gate driver 11(k) and the elements of the gate driver 11(k+2) are disposed in the pixels PIX in a same column. The TFT-A to the TFT-J of the gate driver 11(k) are connected, via the lines 15L, with the TFT-A to the TFT-J of the gate driver 11(k+2).

Figure 17B:
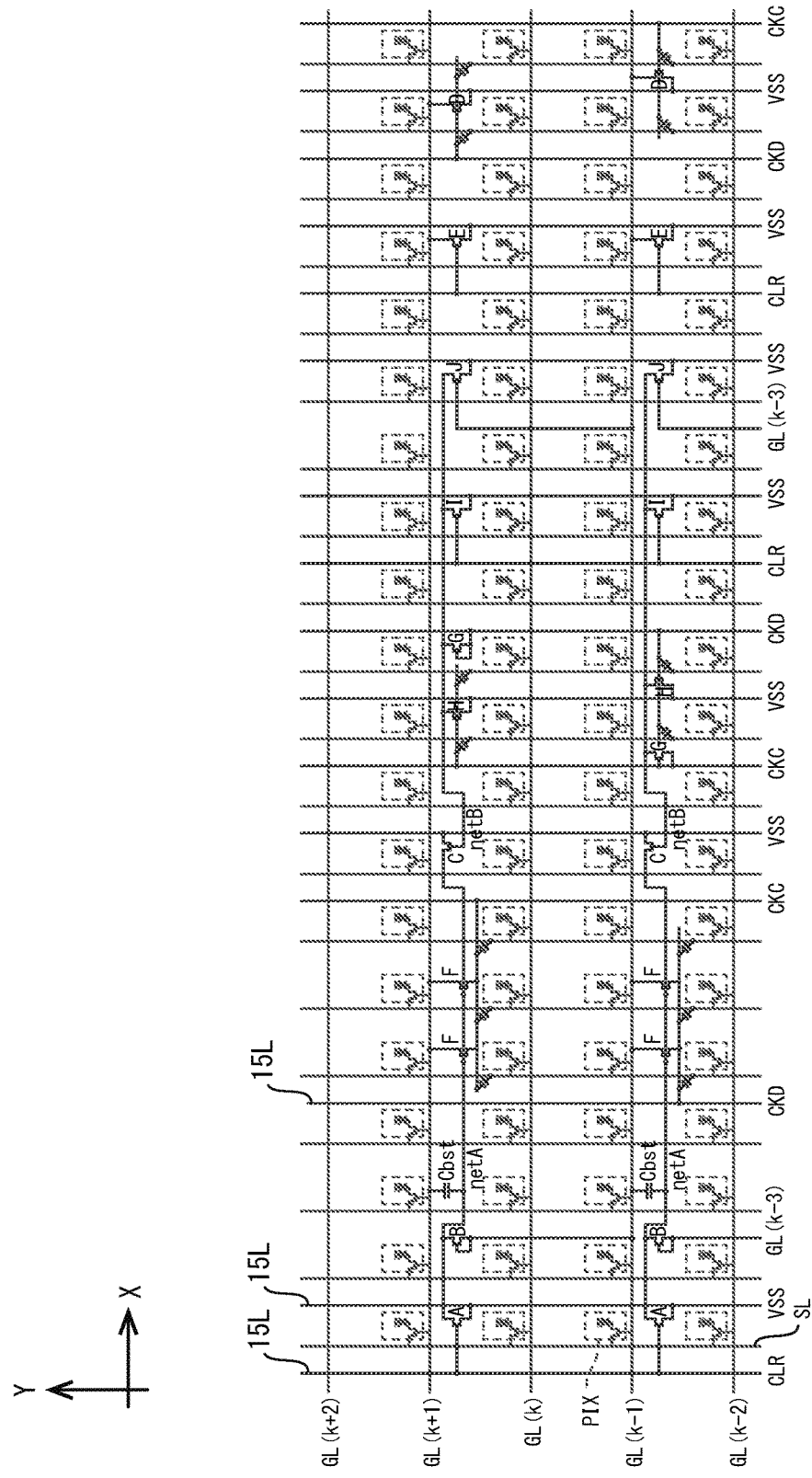
FIG. 17B is a schematic diagram depicting disposition in the display region of the gate driver in FIG. 16.

FIG. 17B depicts disposition in the display region of the gate drivers 11(k−1) and 11(k+1) to be driven by the inputted clock signals CKC and CKD. FIG. 17B includes alphabets A to J corresponding to the TFT-A to the TFT-J depicted in FIG. 16.

The gate driver 11(k−1) controls a potential of the gate line GL(k−1). The gate driver 11(k+1) controls the potential of the gate line GL(k+1). The elements of the gate driver 11(k−1) disperse between the two adjacent gate lines GL(k−1) and GL(k−2). The elements of the gate driver 11(k+1) disperse between the two adjacent gate lines GL(k+1) and GL(k). The elements of the gate driver 11(k−1) and the elements of the gate driver 11(k+1) are disposed in the pixels PIX in a same column. The TFT-A to the TFT-J of the gate driver 11(k−1) are connected, via the lines 15L, with the TFT-A to the TFT-J of the gate driver 11(k+1).

As depicted in FIGS. 17A and 17B, the elements of the gate drivers 11 to be driven by the inputted clock signals CKA and CKB are disposed in the pixels PIX in a first column whereas the elements of the gate drivers 11 to be driven by the inputted clock signals CKC and CKD are disposed in the pixels PIX in a second column different from the first column.

Figure 18A:
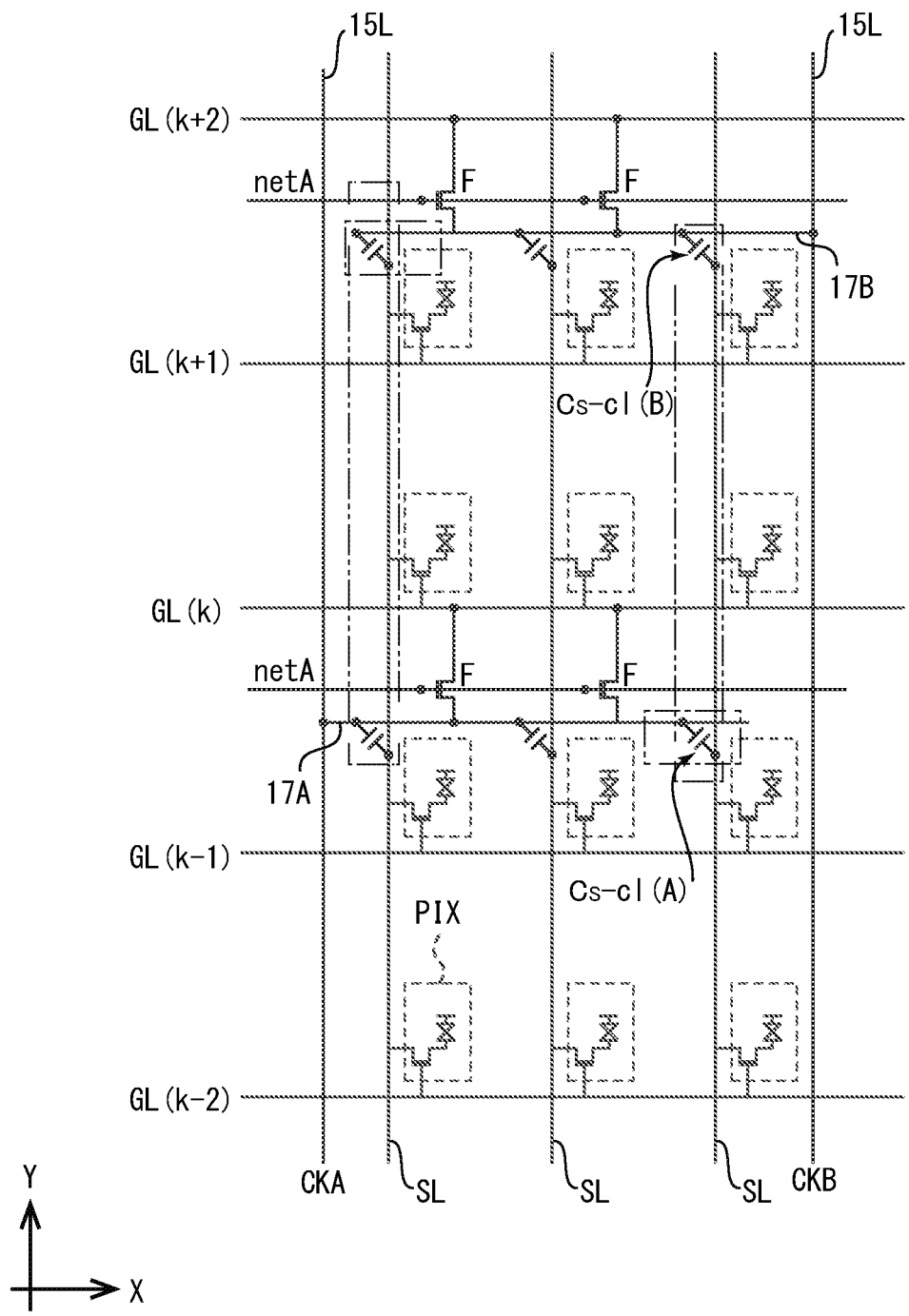
FIG. 18A is an enlarged schematic diagram of a first portion in FIG. 17A.
Figure 18B:
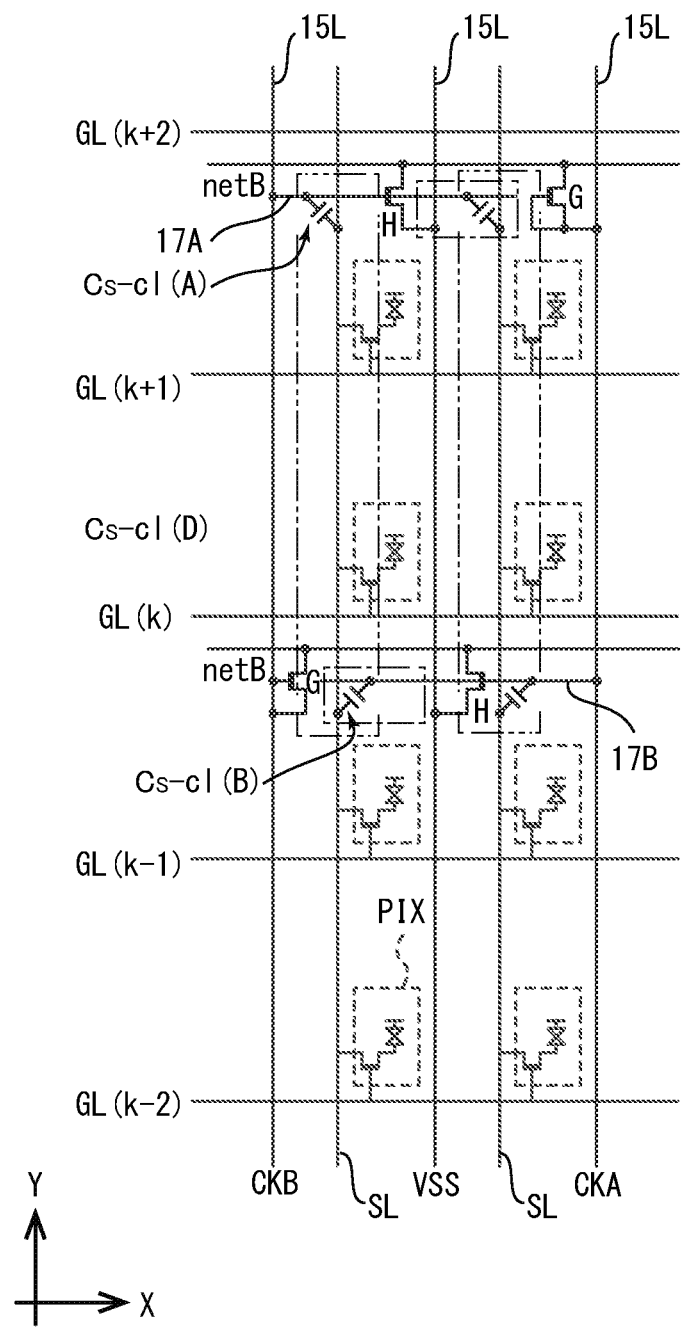
FIG. 18B is an enlarged schematic diagram of a second portion in FIG. 17A different from the first portion in FIG. 18A.
Figure 18C:
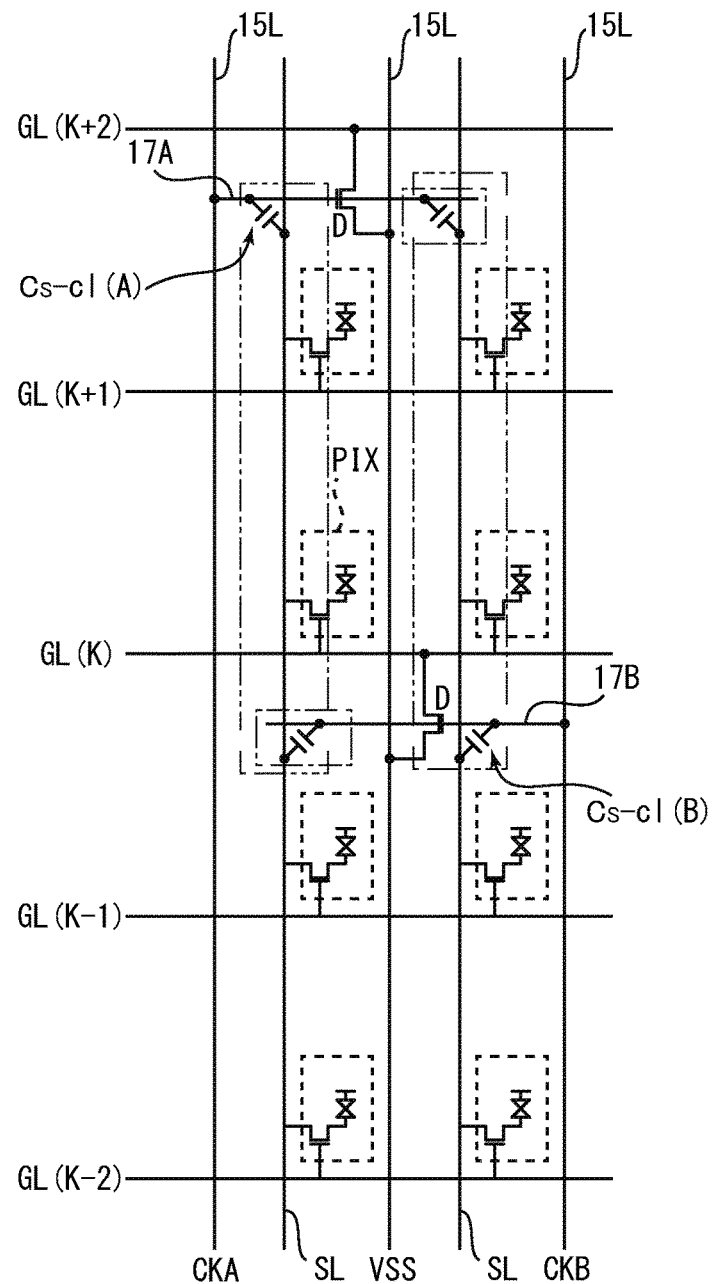
FIG. 18C is an enlarged schematic diagram of a third portion in FIG. 17A different from the first portion in FIG. 18A and the second portion in FIG. 18B.
Figure 19A:
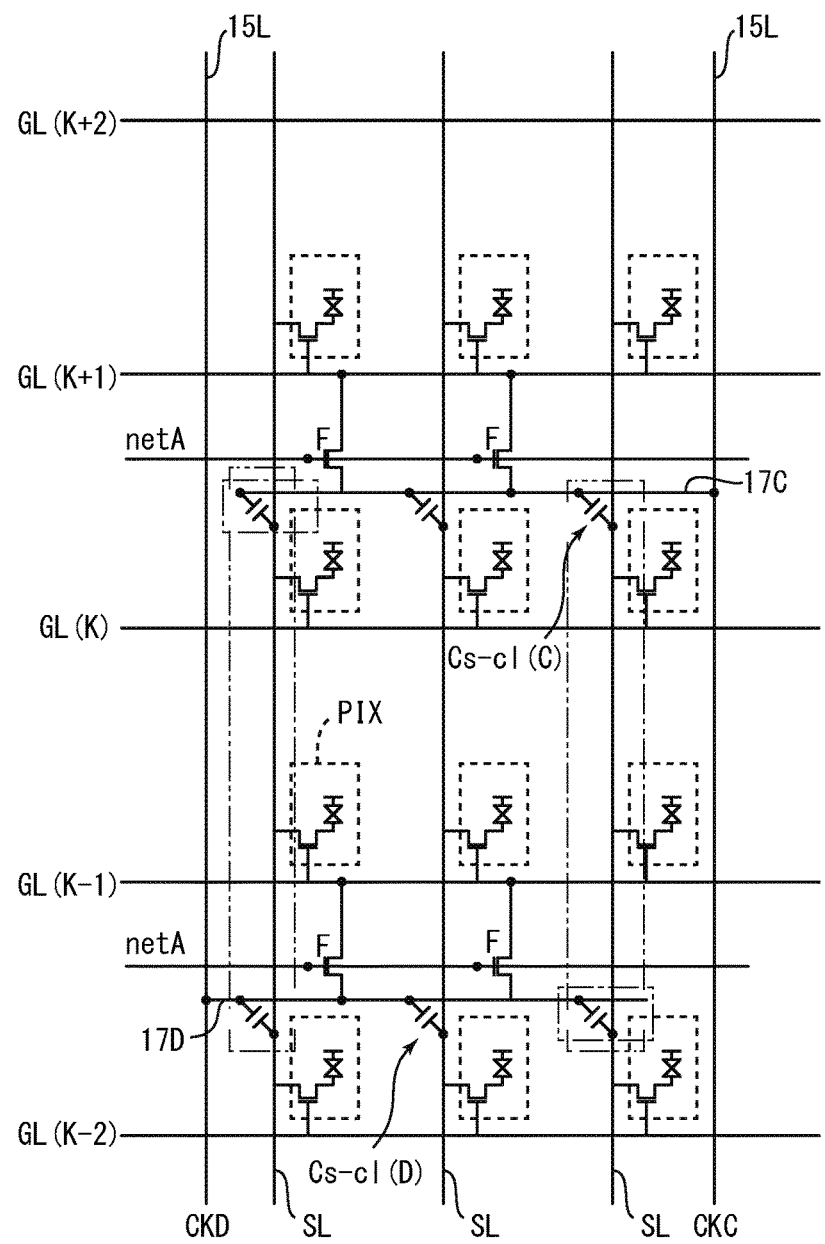
FIG. 19A is an enlarged schematic diagram of a first portion in FIG. 17B.
Figure 19B:
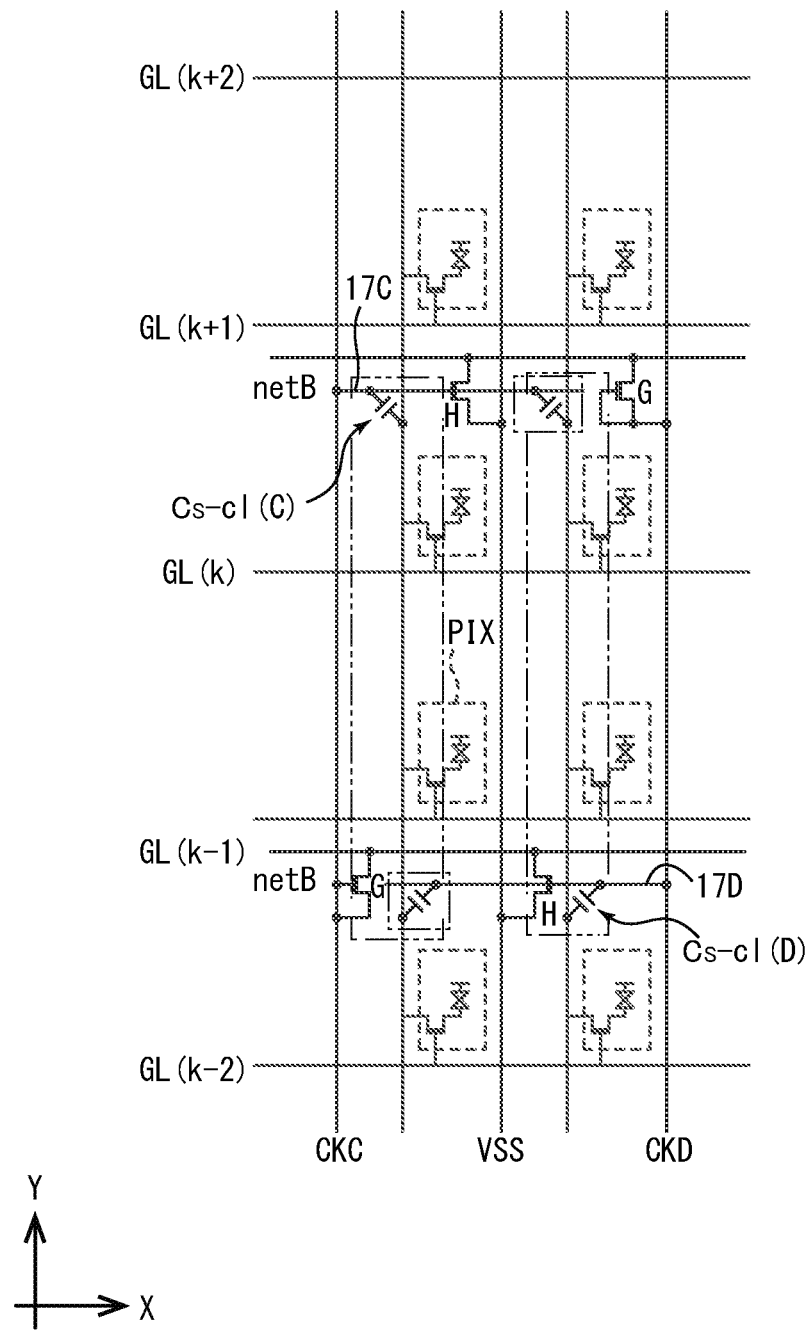
FIG. 19B is an enlarged schematic diagram of a second portion in FIG. 17B different from the first portion in FIG. 19A.
Figure 19C:
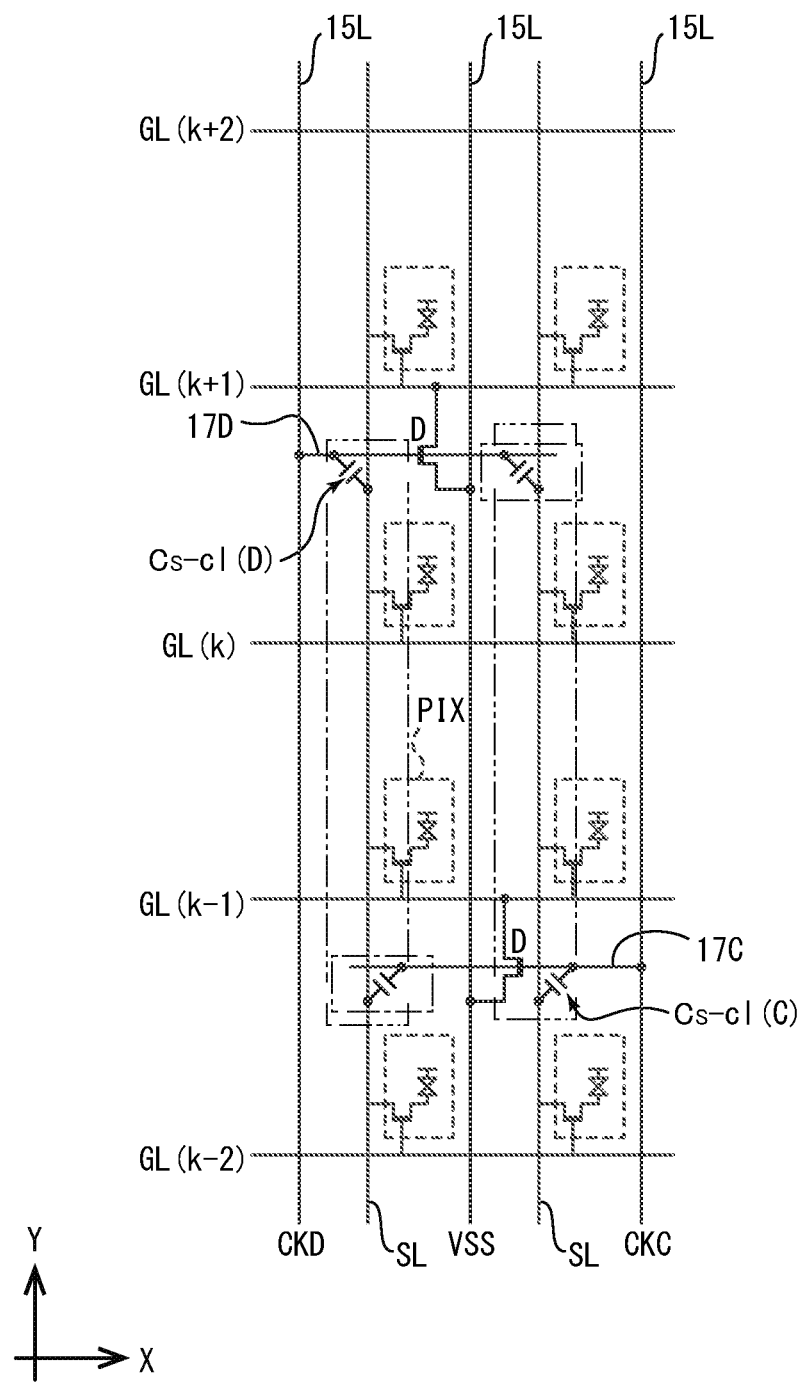
FIG. 19C is an enlarged schematic diagram of a third portion in FIG. 17B different from the first portion in FIG. 19A and the second portion in FIG. 19B.

FIG. 18A is an enlarged schematic diagram of a first portion in FIG. 17A. FIG. 18B is an enlarged schematic diagram of a second portion in FIG. 17A different from the first portion in FIG. 18A. FIG. 18C is an enlarged schematic diagram of a third portion in FIG. 17A different from the first portion in FIG. 18A and the second portion in FIG. 18B. FIG. 19A is an enlarged schematic diagram of a first portion in FIG. 17B. FIG. 19B is an enlarged schematic diagram of a second portion in FIG. 17B different from the first portion in FIG. 19A. FIG. 19C is an enlarged schematic diagram of a third portion in FIG. 17B different from the first portion in FIG. 19A and the second portion in FIG. 19B.

As depicted in portions surrounded with dashed lines in FIGS. 18A, 18B, and 18C, the lines 17A are extended to cross the source lines SL and the lines 17B are extended to cross the source lines SL in the present application example. As depicted in portions surrounded with two-dot chain lines in FIGS. 18A, 18B, and 18C, the number of nodes on one of the source lines SL with the lines 17A can thus be equalized to the number of nodes on the source line SL with the lines 17B. In other words, the number of the parasitic capacitances $C_{s\text{-}cl(A)}$ can be equalized to the number of the parasitic capacitances $C_{s\text{-}cl(B)}$ on the single source line SL. When the amplitude of the clock signal CKA, i.e. the potential variation amount $\Delta V_{(A)}$ of the clock signal CKA, the amplitude of the clock signal CKB, i.e. the potential variation amount $\Delta V_{(B)}$ of the clock signal CKB, the parasitic capacitance $C_{s\text{-}cl}(A)$, and the parasitic capacitance $C_{s\text{-}cl(B)}$ are set to satisfy the above formula (1), noise caused by the parasitic capacitances $C_{s\text{-}cl(A)}$ and noise caused by the parasitic capacitances $C_{s\text{-}cl(B)}$ cancel each other. Noise is then unlikely to be superimposed on a data signal transmitted on one of the source lines SL crossing the lines 17A and the lines 17B.

As depicted in portions surrounded with dashed lines in FIGS. 19A, 19B, and 19C, lines 170 are extended to cross the source lines SL and lines 17D are extended to cross the source lines SL in the present application example. The lines 170 extend in the X direction from the line 15L for transmission of the clock signal CKC. The lines 17D extend in the X direction from the line 15L for transmission of the clock signal CKD. A parasitic capacitance $C_{s\text{-}cl(C)}$ is provided at each of nodes between the lines 170 and the source lines SL. A parasitic capacitance $C_{s\text{-}cl(D)}$ is provided at each of nodes between the lines 17D and the source lines SL. When the lines 170 are extended to cross the source lines SL and the lines 17D are extended to cross the source lines SL, the number of nodes on one of the source lines SL with the lines 170 can be equalized to the number of nodes on the source line SL with the lines 17D as depicted in portions surrounded with two-dot chain lines in FIGS. 19A, 19B, and 19C. In other words, the number of the parasitic capacitances $C_{s\text{-}cl(C)}$ can be equalized to the number of the parasitic capacitances $C_{s\text{-}cl(C)}$ on the single source line SL.

According to the present application example, amplitude of the clock signal CKC, i.e. a potential variation amount $\Delta V_{(C)}$ of the lines 170, amplitude of the clock signal CKD, i.e. a potential variation amount $\Delta V_{(D)}$ of the lines 17D, the parasitic capacitance $C_{s\text{-}cl(C)}$, and the parasitic capacitance $C_{s\text{-}cl(C)}$ are set for each of the source lines SL to satisfy the following formula (12).

[Formula 12]

$$\Sigma C_{s\text{-}cl(C)} \Delta V_{(C)} + \Sigma C_{s\text{-}cl(D)} \Delta V_{(D)} = 0 \quad (12)$$

The amount $\Delta V_{(C)}$ is equal to the amount $\Delta V_{(D)}$ in the present application example. The parasitic capacitance $C_{s\text{-}cl(C)}$ is equal to the parasitic capacitance $C_{s\text{-}cl(D)}$. The number of the parasitic capacitances $C_{s\text{-}cl(C)}$ and the number of the parasitic capacitances $C_{s\text{-}cl(C)}$, i.e. the number of nodes on one of the source lines SL with the lines 170 and the number of nodes on the source line SL with the lines 17D are equal to each other. Noise caused by the parasitic capacitances $C_{s\text{-}cl(C)}$ and noise caused by the parasitic capacitances $C_{s\text{-}cl(D)}$ thus cancel each other. Noise is then unlikely to be superimposed on a data signal transmitted on the source line SL crossing the lines 170 and the lines 17D.

Second Embodiment

The first embodiment refers to the case where the lines 17A and 17B extending from the lines 15L for transmission of the clock signals CKA and CKB cross the source lines SL. The second embodiment will refer to a measure against noise in a case where the netAs cross the source lines SL.
<Disposition of Gate Drivers>

Figure 20:
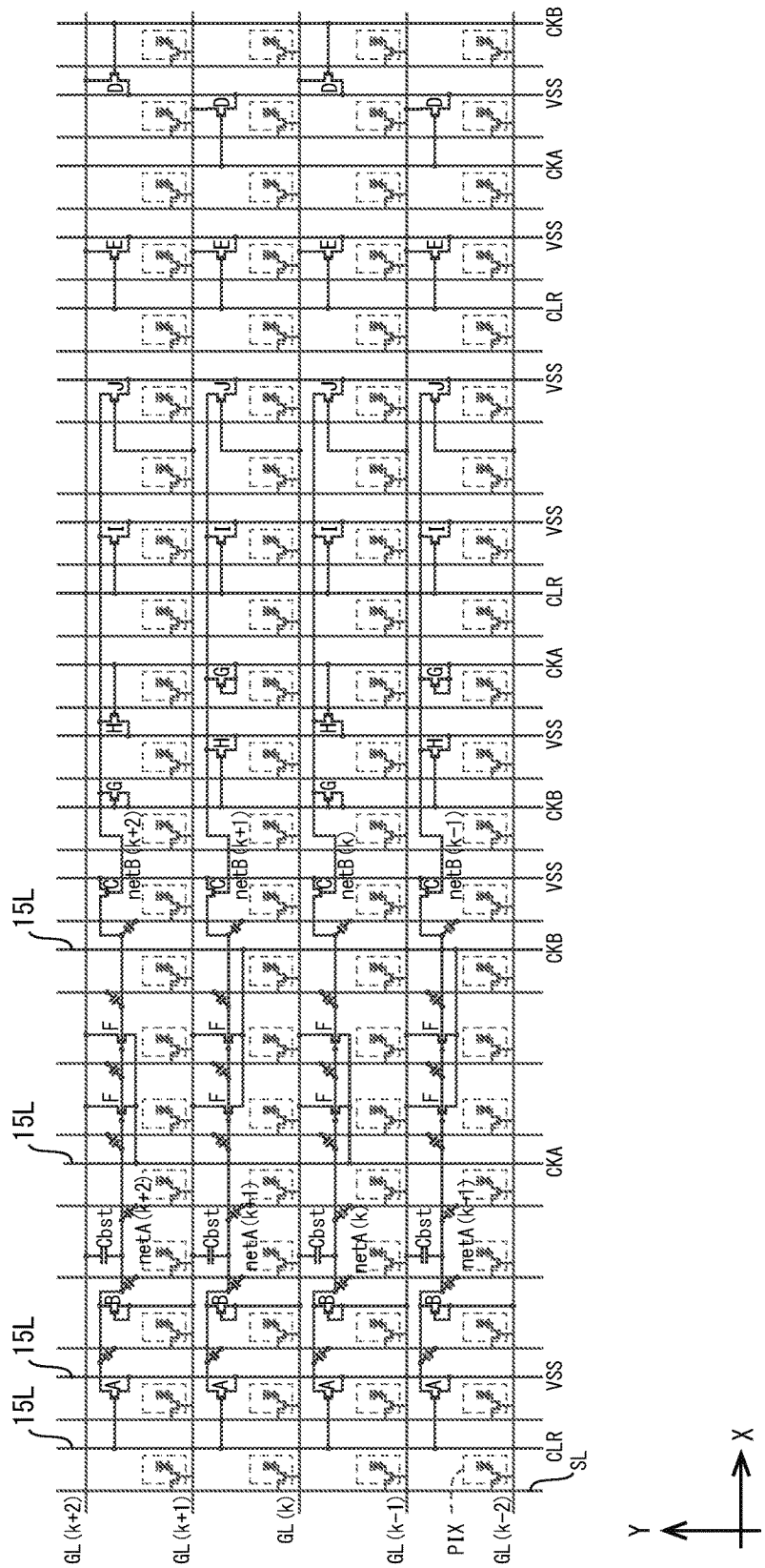
FIG. 20 is a schematic diagram depicting disposition in the display region of the gate driver in FIG. 4.

The gate drivers 11 will be described in terms of their disposition in the display region with reference to FIG. 20. FIG. 20 is a schematic diagram depicting disposition of the gate drivers 11 in the display region. FIG. 20 includes alphabets A to J corresponding to the TFT-A to the TFT-J depicted in FIG. 4.

The elements of the gate drivers 11 disperse between adjacent two of the gate lines GL. FIG. 20 exemplifies a case where the elements of the gate driver 11(*k*−1), the elements of the gate driver 11(*k*), the elements of the gate driver 11(*k*+1), and the elements of the gate driver 11(*k*+2) are disposed in the pixels PIX in a same column. The TFT-A to the TFT-J of the gate driver 11(*k*−1) are connected, via the lines 15L, with the TFT-A to the TFT-J of the gate driver 11(*k*), the TFT-A to the TFT-J of the gate driver 11(*k*+1), and the TFT-A to the TFT-J of the gate driver 11(*k*+2).

Figure 20A:
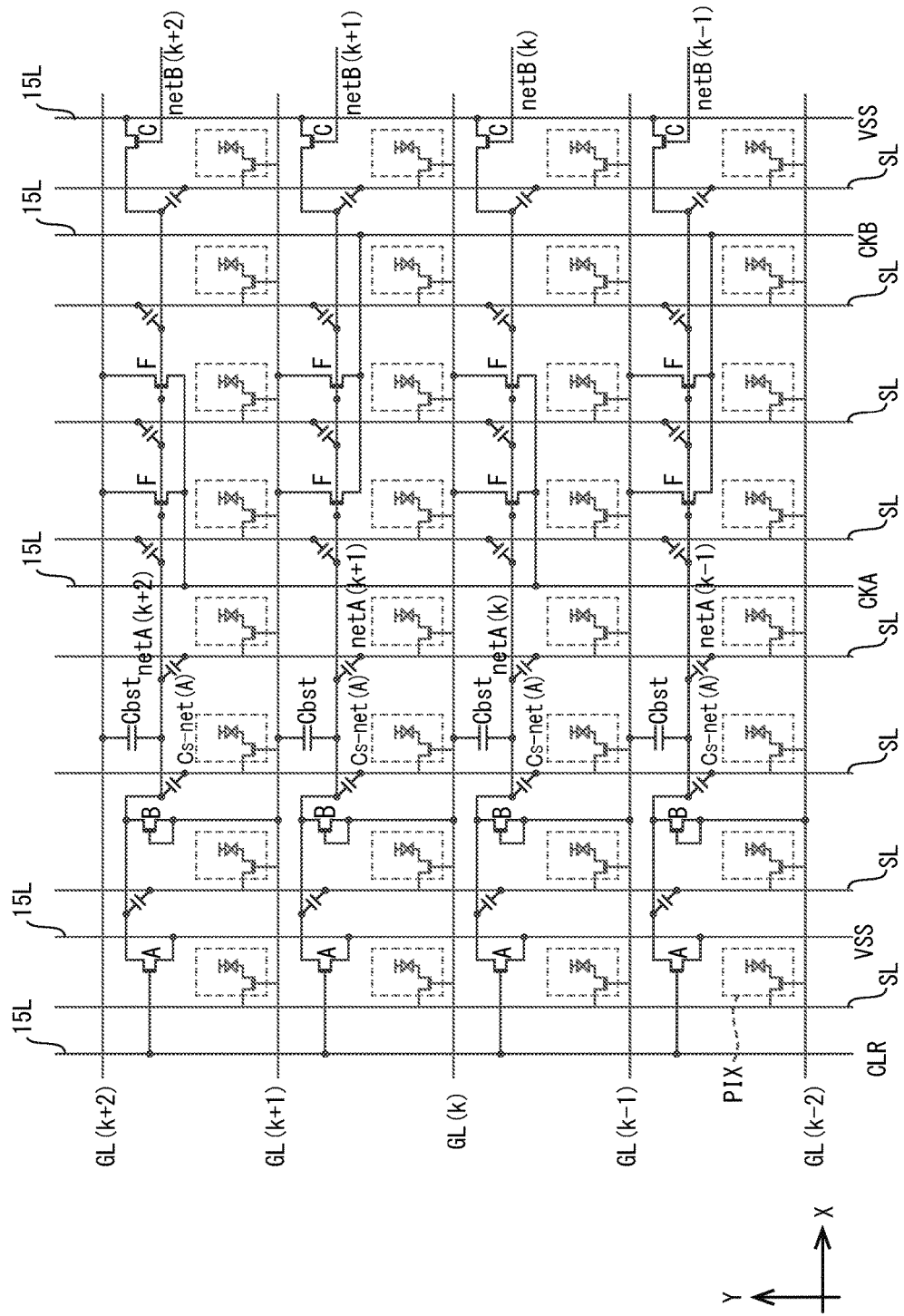
FIG. 20A is an enlarged schematic diagram of a portion in FIG. 20.
Figure 21:
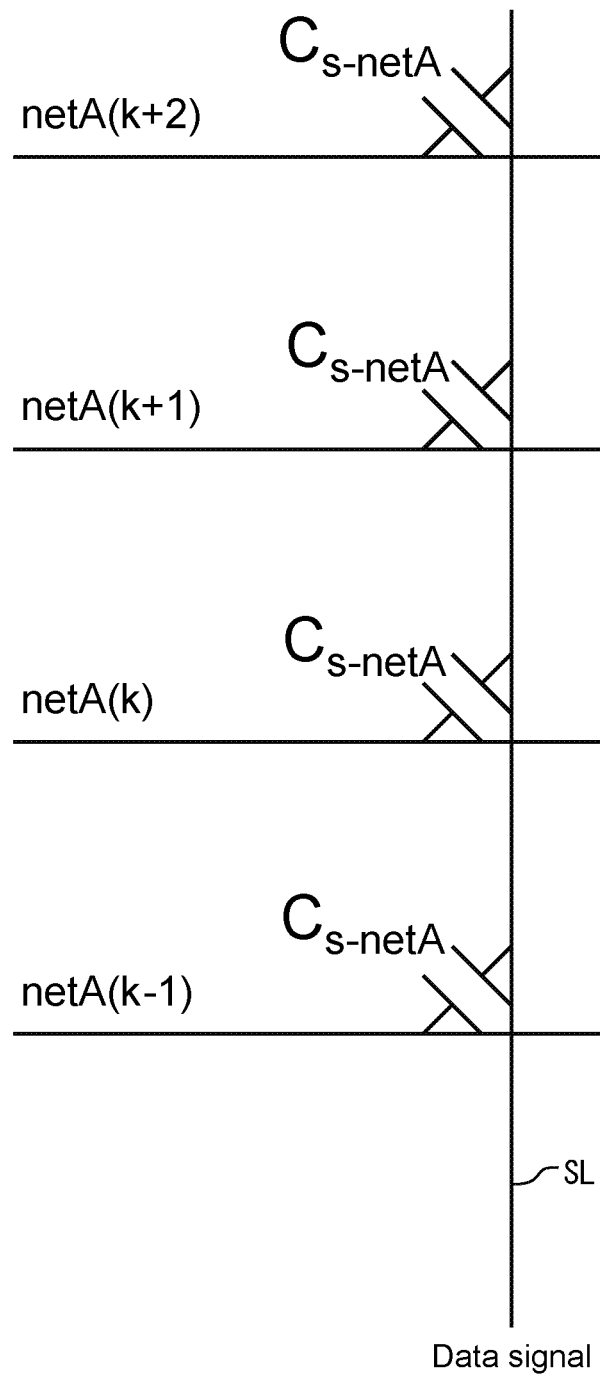
FIG. 21 is a schematic diagram in a state where a plurality of netAs crosses the source line.

As depicted in FIG. 20A, the netA of the gate driver 11(*k*−1) (hereinafter, referred to as a netA(k−1)) crosses the source lines SL. The netA of the gate driver 11(*k*) (hereinafter, referred to as a netA(k)) crosses the source lines SL. The netA of the gate driver 11(*k*+1) (hereinafter, referred to as a netA(k+1)) crosses the source lines SL. The netA of the gate driver 11(*k*+2) (hereinafter, referred to as a netA(k+2)) crosses the source lines SL. As depicted in FIG. 21, a parasitic capacitance $C_{s\text{-}netA}$ is provided at each of nodes between the netAs of the gate drivers 11 and the source line SL.
<Measure Against Data Signal Noise>

As described above, the parasitic capacitance $C_{s\text{-}netA}$ is provided at each of the nodes between the netAs of the gate drivers 11 and the source line SL in the present embodiment. Noise caused by the parasitic capacitances $C_{s\text{-}netA}$ will then be superimposed on a data signal transmitted on the source line SL in this state.

In view of this, in three of the netAs crossing one of the source lines SL, two of the netAs are increased in potential when the remaining one of the netAs is decreased in potential in the present embodiment. Specifically, as exemplarily depicted in a portion surrounded with a broken line in FIG. 22, the netA(k) and the netA(k+1) are increased in potential when the netA(k−1) is decreased in potential (at time t2 in FIG. 22). In this case, a sum of a potential variation amount of the netA(k−1), a potential variation amount of the netA(k), and a potential variation amount of the netA(k+1) is set to zero. In other words, the sum of the potential variation amount of the netA decreased in potential and the potential variation amounts of the netAs increased in potential is set to zero.

The parasitic capacitances $C_{s\text{-}netA}$, which are provided at the nodes between the three netAs and the source line SL, are equalized to one another. Specifically, the parasitic capacitance $C_{s\text{-}netA}$ provided at the node between the netA (k−1) and the source line SL (hereinafter, referred to as a parasitic capacitance $C_{s\text{-}netA(k-1)}$), the parasitic capacitance $C_{s\text{-}netA}$ provided at the node between the netA(k) and the source line SL (hereinafter, referred to as a parasitic capacitance $C_{s\text{-}netA(k)}$), and the parasitic capacitance $C_{s\text{-}netA}$ provided at the node between the netA(k+1) and the source line SL (hereinafter, referred to as a parasitic capacitance $C_{s\text{-}netA(k+1)}$) are equalized to one another in the above case.

Figure 22:
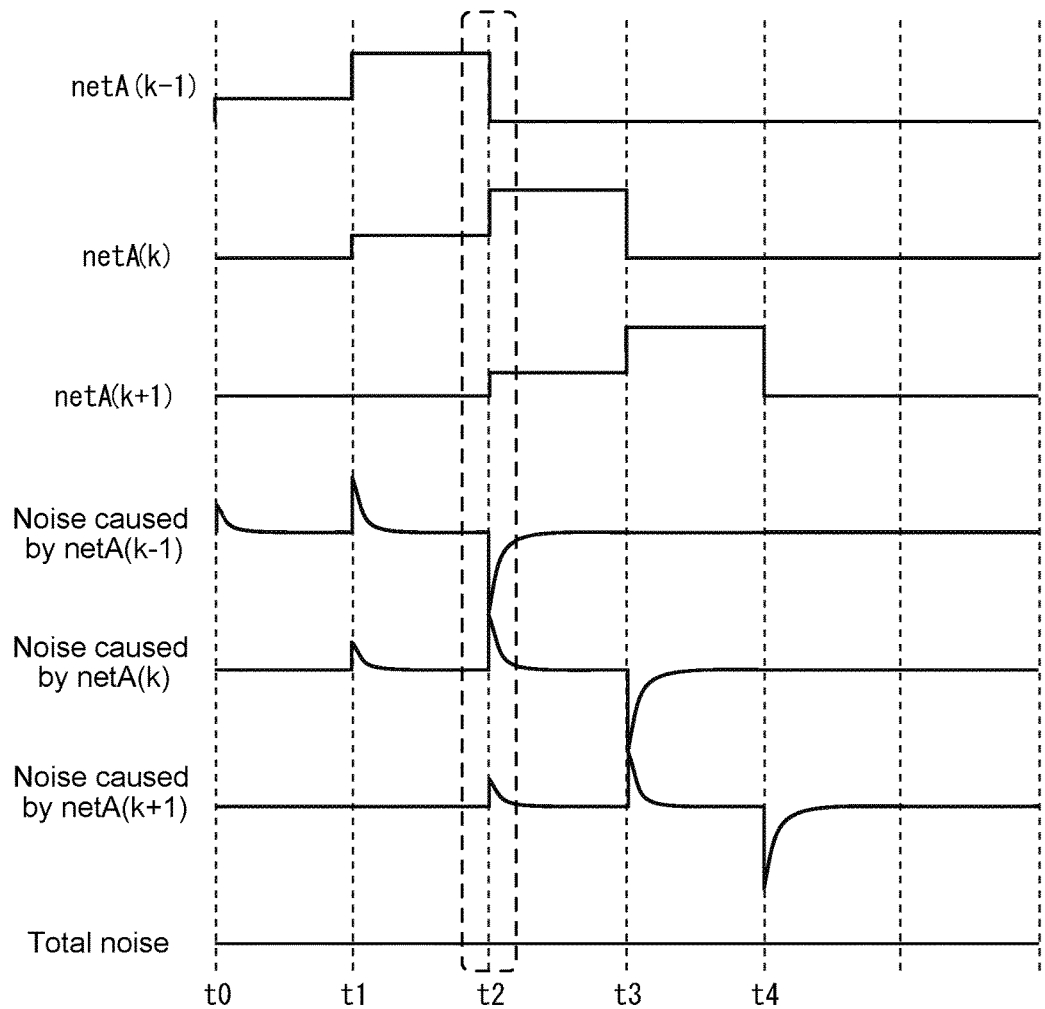
FIG. 22 is a timing chart indicating a relationship among potentials of a netA(k−1), a netA(k), and a netA(k+1) and noise in the state depicted in FIG. 21.

At the time t2 in FIG. 22, noise caused by the parasitic capacitance $C_{s\text{-}netA\ (k-1)}$ thus cancel noise caused by the parasitic capacitance $C_{s\text{-}netA(k)}$ and noise caused by the parasitic capacitance $C_{s\text{-}netA(k+1)}$. Noise caused by the parasitic capacitances $C_{s\text{-}netA}$ will similarly cancel each other at different time. Even in the case where the netAs cross the source lines SL, noise is unlikely to be superimposed on a data signal transmitted on each of the source lines SL in the present embodiment.

Third Embodiment

The first embodiment refers to the case where the lines 17A and 17B extending from the lines 15L for transmission of the clock signals CKA and CKB cross the source lines SL. The third embodiment will refer to a measure against noise in a case where the netBs cross the source lines SL.
<Disposition of Gate Drivers>

Figure 23:
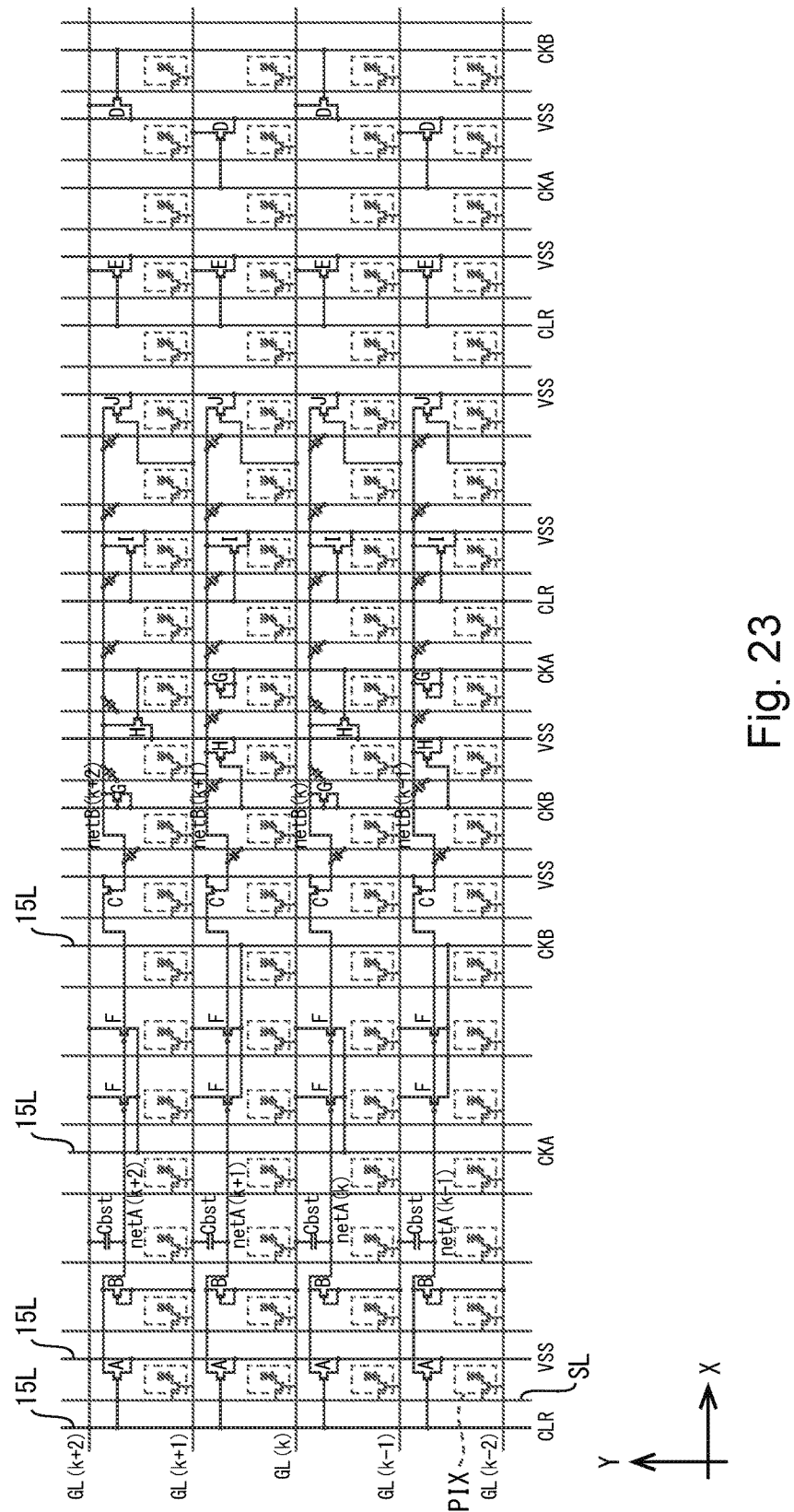
FIG. 23 is a schematic diagram depicting disposition in the display region of the gate driver in FIG. 4.

The gate drivers 11 will be described in terms of their disposition in the display region with reference to FIG. 23. FIG. 23 is a schematic diagram depicting disposition of the gate drivers 11 in the display region. FIG. 23 includes alphabets A to J corresponding to the TFT-A to the TFT-J depicted in FIG. 4.

The elements of the gate drivers 11 disperse between adjacent two of the gate lines GL. FIG. 23 exemplifies a case where the elements of the gate driver 11(*k*−1), the elements of the gate driver 11(*k*), the elements of the gate driver 11(*k*+1), and the elements of the gate driver 11(*k*+2) are disposed in the pixels PIX in a same column. The TFT-A to the TFT-J of the gate driver 11(*k*−1) are connected, via the lines 15L, with the TFT-A to the TFT-J of the gate driver 11(*k*), the TFT-A to the TFT-J of the gate driver 11(*k*+1), and the TFT-A to the TFT-J of the gate driver 11(*k*+2).

Figure 23A:
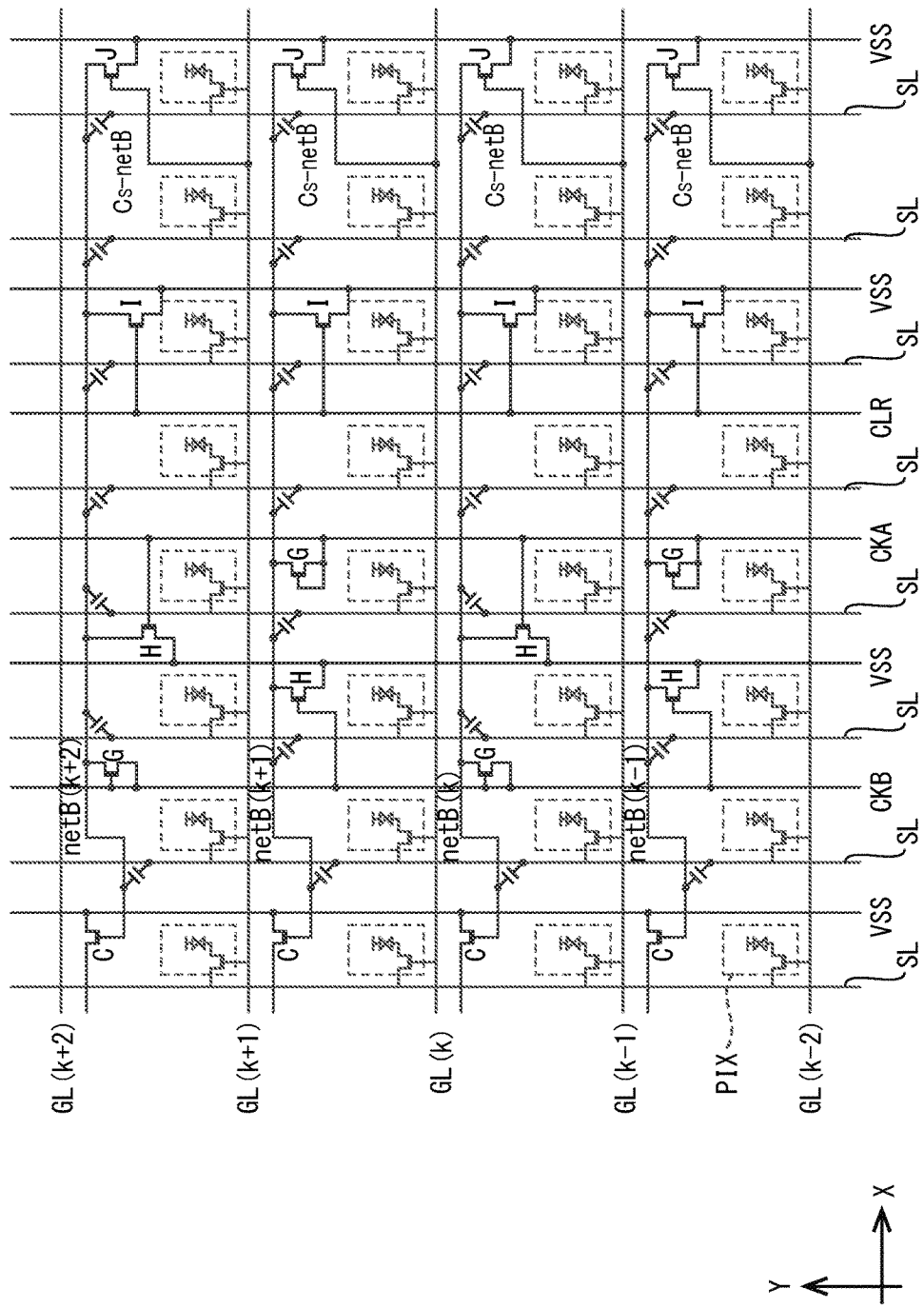
FIG. 23A is an enlarged schematic diagram of a portion in FIG. 23.
Figure 24:
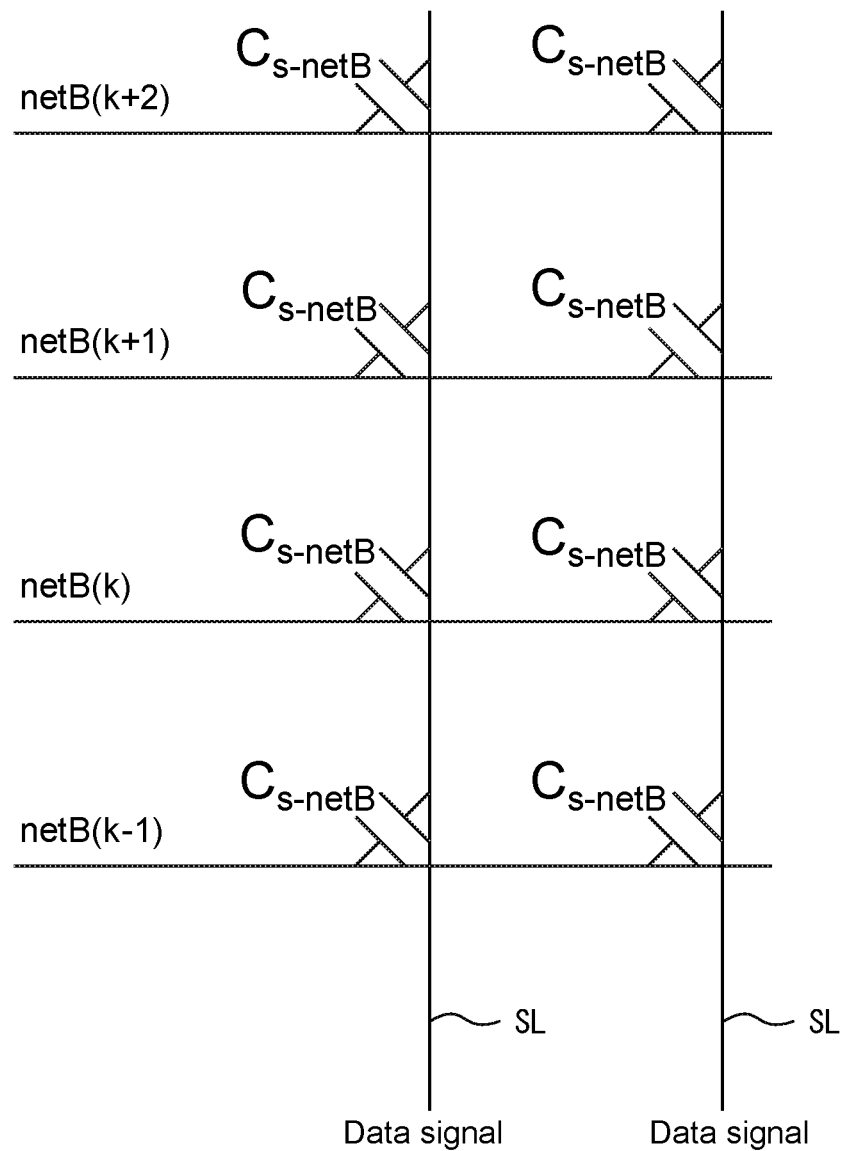
FIG. 24 is a schematic diagram in a state where a plurality of netBs crosses the source lines.

As depicted in FIG. 23A, the netB of the gate driver 11(*k*−1) (hereinafter, referred to as a netB(k−1)) crosses the source lines SL. The netB of the gate driver 11(*k*) (hereinafter, referred to as a netB(k)) crosses the source lines SL. The netB of the gate driver 11(*k*+1) (hereinafter, referred to as a netB(k+1)) crosses the source lines SL. The netB of the gate driver 11(*k*+2) (hereinafter, referred to as a netB(k+2)) crosses the source lines SL. As depicted in FIG. 24, a parasitic capacitance $C_{s\text{-}netB}$ is provided at each of nodes between the netBs of the gate drivers 11 and the source lines SL.
<Measure Against Data Signal Noise>

As described above, the parasitic capacitance $C_{s\text{-}netB}$ is provided at each of the nodes between the netBs of the gate drivers 11 and the source lines SL in the present embodiment. Noise caused by the parasitic capacitances $C_{s\text{-}netB}$ will then be superimposed on a data signal transmitted on each of the source lines SL in this state.

Figure 25:
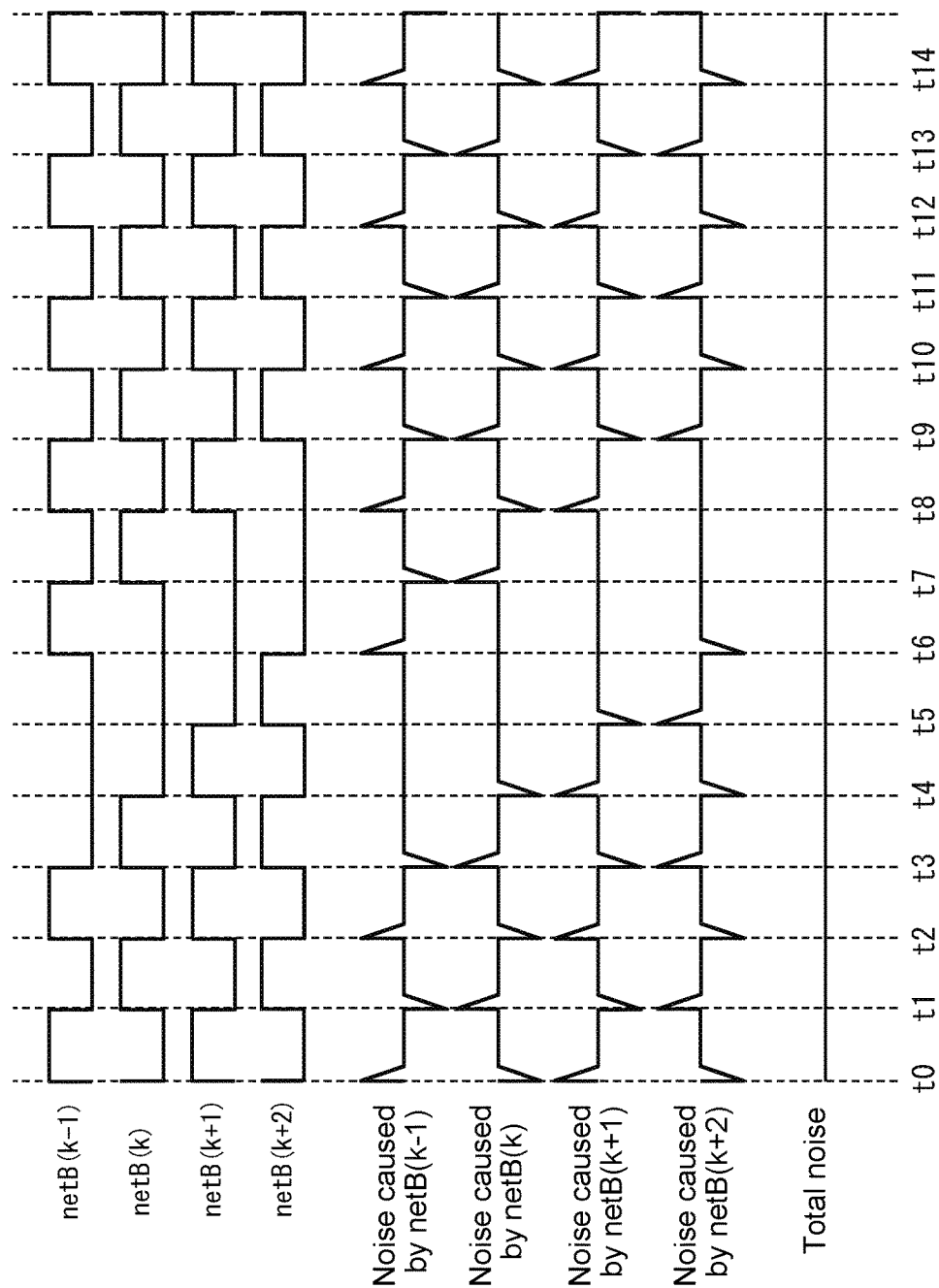
FIG. 25 is a timing chart indicating a relationship among potentials of a netB(k−1), a netB(k), a netB(k+1), and a netB(k+2), and noise in the state depicted in FIG. 24.

In view of this, in two of the netB(k−1), the netB(k), the netB(k+1), and the netB(k+2), a first one is decreased in potential when a second one is increased in potential as indicated in FIG. 25 in the present embodiment. At time t1 in FIG. 25, the netB(k−1) and the netB(k+1) are decreased in potential whereas the netB(k) and the netB(k+2) are increased in potential. At time t6 in FIG. 25, the netB(k−1) is increased in potential whereas the netB(k+2) is decreased in potential.

In two of the netB(k−1), the netB(k), the netB(k+1), and the netB(k+2), a sum of a potential variation amount of a first one and a potential variation amount of a second one is set to zero in the present embodiment. The parasitic capacitance $C_{s\text{-}netB}$ provided at the node between the netB(k−1) and each of the source lines SL (hereinafter, referred to as a parasitic capacitance $C_{s\text{-}netB(k-1)}$), the parasitic capacitance $C_{s\text{-}netB}$ provided at the node between the netB(k) and the source line SL (hereinafter, referred to as a parasitic capacitance $C_{s\text{-}netB(k)}$), the parasitic capacitance $C_{s\text{-}netB}$ provided at the node between the netB(k+1) and the source line SL (hereinafter, referred to as a parasitic capacitance $C_{s\text{-}netB(k+1)}$), and the parasitic capacitance $C_{s\text{-}netB}$ provided at the node between the netB(k+2) and the source line SL (hereinafter, referred to as a parasitic capacitance $C_{s\text{-}netB(k+2)}$) are equalized to one another.

In two of the parasitic capacitance $C_{s\text{-}netB(k-1)}$, the parasitic capacitance $C_{s\text{-}netB(k)}$, the parasitic capacitance $C_{s\text{-}netB(k+1)}$, and the parasitic capacitance $C_{s\text{-}netB(k+2)}$, noise caused by a first one of the parasitic capacitances $C_{s\text{-}netB}$ and noise cause by a second one of the parasitic capacitances $C_{s\text{-}netB}$ cancel each other. At the time t1 in FIG. 25, noise caused by the parasitic capacitance $C_{s\text{-}netB(k-1)}$ and noise caused by the parasitic capacitance $C_{s\text{-}netB(k)}$ cancel each other whereas noise caused by the parasitic capacitance $C_{s\text{-}netB(k+1)}$ and noise caused by the parasitic capacitance $C_{s\text{-}netB(k+2)}$ cancel each other. Even in the case where the netBs cross the data lines SL, noise is unlikely to be superimposed on a data signal transmitted on each of the data lines SL in the present embodiment.

Application Example 1 of Third Embodiment

Figure 26:
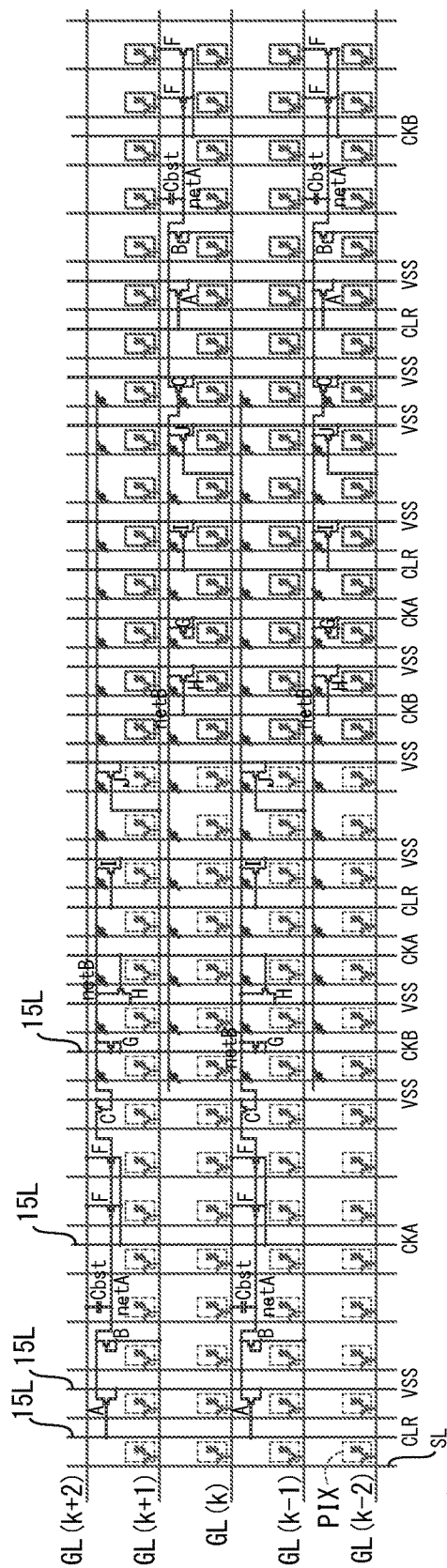
FIG. 26 is a schematic diagram depicting disposition in the display region of the gate driver in FIG. 4.

As depicted in FIG. 26, the elements of the gate drivers 11(k) disperse between the two adjacent gate lines GL(k) and GL(k−1) in the present application example. The elements of the gate driver 11(k+2) disperse between the two adjacent gate lines GL(k+2) and GL(k+1). FIG. 26 includes alphabets A to C and F to J corresponding to the TFT-A to the TFT-C and the TFT-F to the TFT-J depicted in FIG. 4. FIG. 26 does not depict the TFT-D or the TFT-E.

The elements of the gate driver 11(k) and the elements of the gate driver 11(k+2) are disposed in the pixels PIX in a same column. The TFT-A to the TFT-J of the gate driver 11(k) are connected, via the lines 15L, with the TFT-A to the TFT-J of the gate driver 11(k+2).

The elements of the gate driver 11(k−1) disperse between the two adjacent gate lines GL(k−1) and GL(k−2) in the present application example. The elements of the gate driver 11(k+1) disperse between the two adjacent gate lines GL(k+1) and GL(k).

The elements of the gate driver 11(k−1) and the elements of the gate driver 11(k+1) are disposed in the pixels PIX in a same column. The TFT-A to the TFT-J of the gate driver 11(k−1) are connected, via the lines 15L, with the TFT-A to the TFT-J of the gate driver 11(k+1).

The elements of the gate drivers 11(k) and 11(k+2) are disposed in the pixels PIX in a first column whereas the elements of the gate drivers 11(k−1) and 11(k+1) are disposed in the pixels PIX in a second column different from the first column.

FIG. 25 indicates the potentials of the netB(k−1), the netB(k), the netB(k+1), and the netB(k+2) according to the present application example. In this state, noise caused by the parasitic capacitance $C_{s\text{-}netB}$ provided at the node between the netB(k+2) and each of the source lines SL and noise caused by the parasitic capacitance $C_{s\text{-}netB}$ provided at the node between the netB(k) and the source line SL will synergistically be superimposed on a data signal transmitted on the source line SL crossing the netB(k+2) and the netB(k). Noise caused by the parasitic capacitance $C_{s\text{-}netB}$ provided at the node between the netB(k+1) and the source line SL and noise caused by the parasitic capacitance $C_{s\text{-}netB}$ provided at the node between the netB(k−1) and the source line SL will synergistically be superimposed on a data signal transmitted on the source line SL crossing the netB(k+1) and the netB(k−1).

Figure 26A:
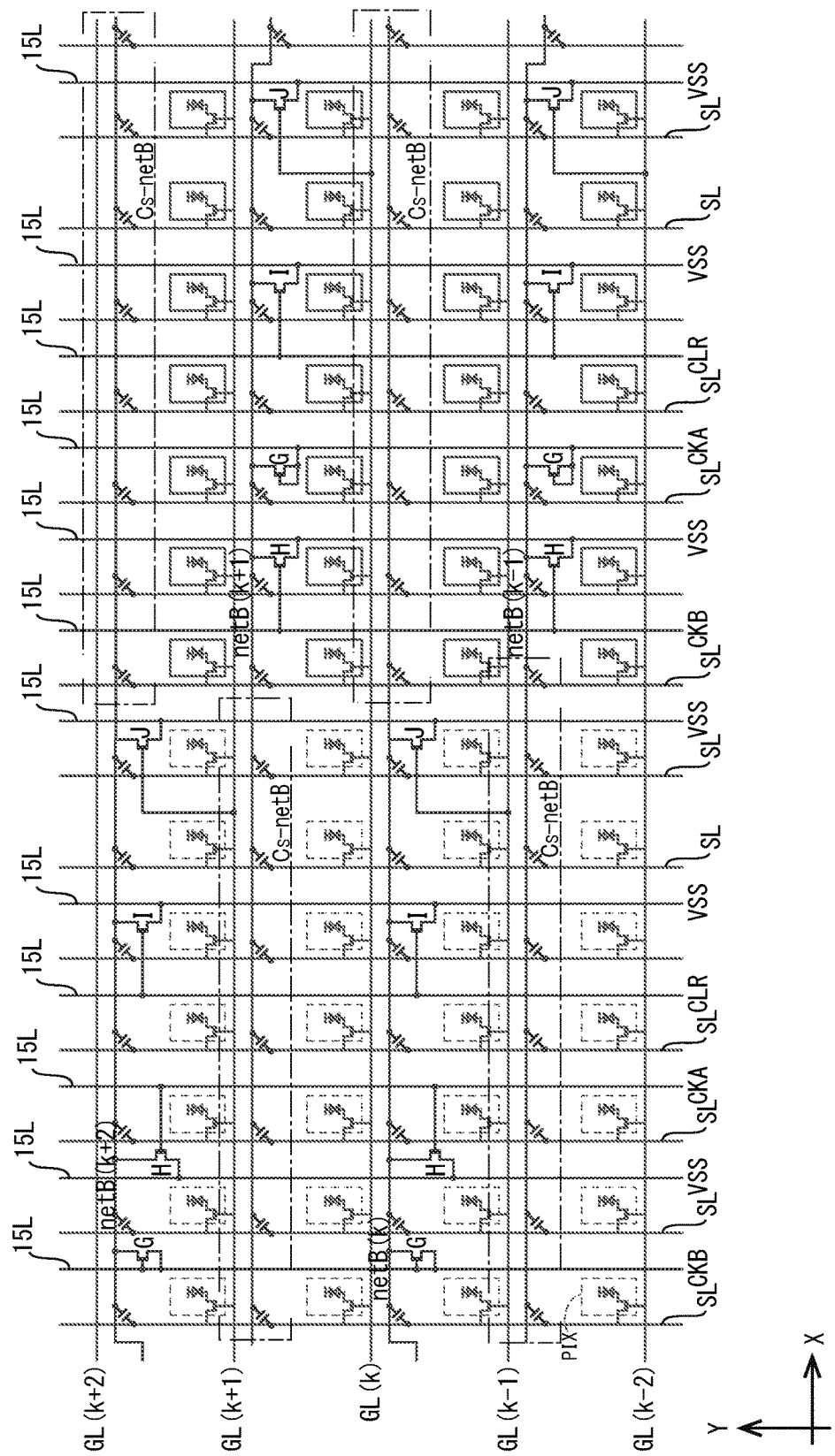
FIG. 26A is an enlarged schematic diagram of a portion in FIG. 26.

In view of this, the netB(k−1) and the netB(k+1) are extended to cross the source lines SL that cross the netB(k) and the netB(k+2) as depicted in portions surrounded with dashed lines in FIG. 26A in the present application example. The netB(k) and the netB(k+2) are extended to cross the source lines SL that cross the netB(k−1) and the netB(k+1) as depicted in portions surrounded with dashed lines. In other words, the netB(k−1), the netB(k), the netB(k+1), and the netB(k+2) cross one of the source lines SL as depicted in FIG. 24. Similarly to the third embodiment, noise is then unlikely to be superimposed on a data signal transmitted on each of the data lines SL even in the case where the netBs cross the data lines SL.

Fourth Embodiment

The first embodiment refers to the case where the lines 17A and 17B extending from the lines 15L for transmission of the clock signals CKA and CKB cross the source lines SL. The fourth embodiment will refer to a measure against noise in a case where the netBs cross the source lines SL.
<Disposition of Gate Drivers>

Figure 27:
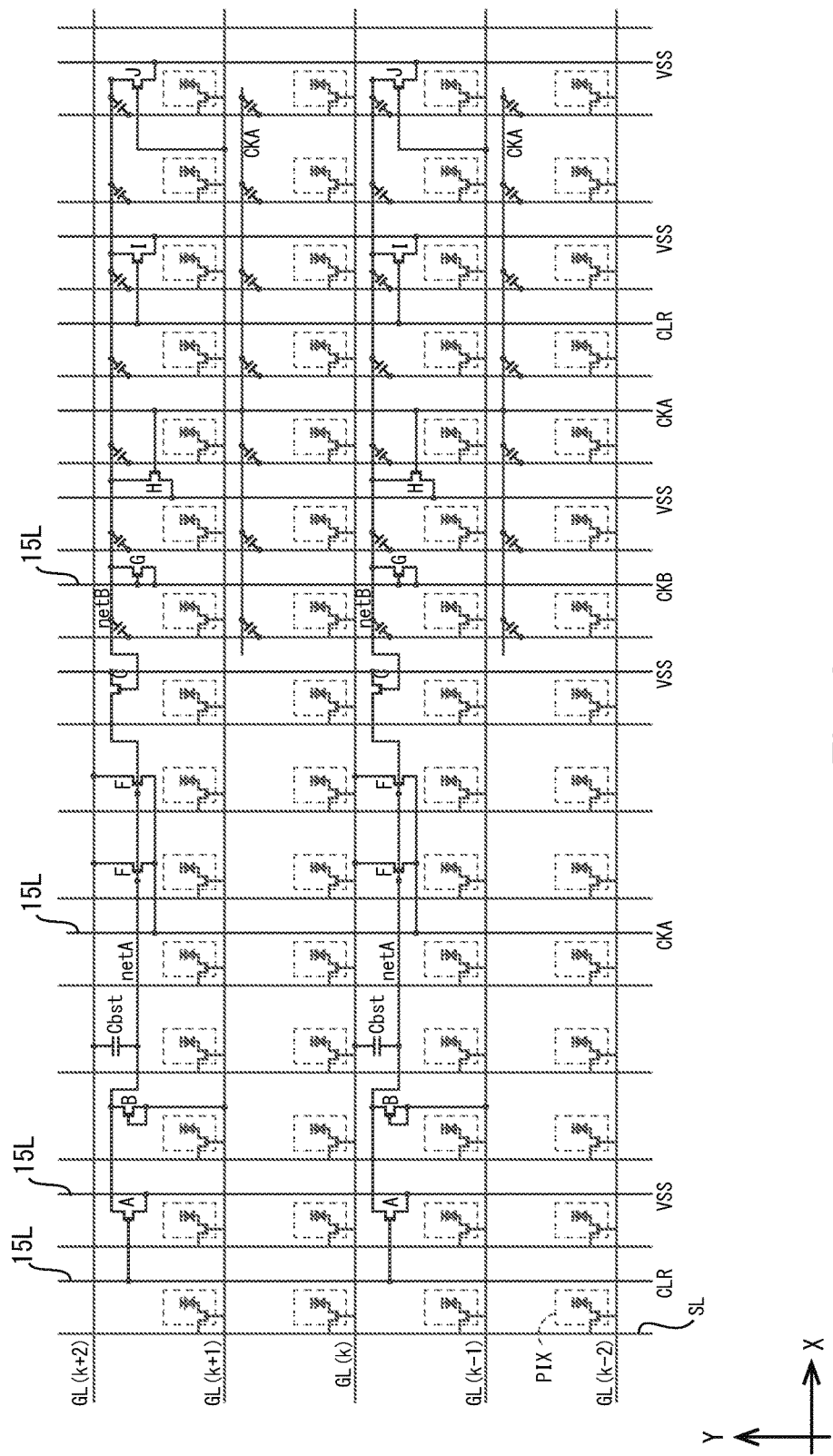
FIG. 27 is a schematic diagram depicting disposition in the display region of the gate driver in FIG. 4.

The gate drivers 11 will be described in terms of their disposition in the display region with reference to FIG. 27. FIG. 27 is a schematic diagram depicting disposition of the gate drivers 11 in the display region. FIG. 27 includes alphabets A to C and F to J corresponding to the TFT-A to the TFT-C and the TFT-F to the TFT-J depicted in FIG. 4. FIG. 27 does not depict the TFT-D or the TFT-E.

The elements of the gate driver 11(k) disperse between the two adjacent gate lines GL(k) and GL(k−1). The elements of the gate driver 11(k+2) disperse between the two adjacent gate lines GL(k+2) and GL(k+1).

The elements of the gate driver 11(k) and the elements of the gate driver 11(k+2) are disposed in the pixels PIX in a same column. The TFT-A to the TFT-J of the gate driver 11(k) are connected, via the lines 15L, with the TFT-A to the TFT-J of the gate driver 11(k+2).

Though not depicted, the elements of the gate driver 11(k−1) disperse between the two adjacent gate lines GL(k−1) and GL(k−2). The elements of the gate driver 11(k+1) disperse between the two adjacent gate lines GL(k+1) and GL(k).

Though not depicted, the elements of the gate driver 11(k−1) and the elements of the gate driver 11(k+1) are disposed in the pixels PIX in a same column. The TFT-A to the TFT-J of the gate driver 11(k−1) are connected, via the lines 15L, with the TFT-A to the TFT-J of the gate driver 11(k+1).

The elements of the gate drivers 11(k) and 11(k+2) are disposed in the pixels PIX in a first column whereas the elements of the gate drivers 11(k−1) and 11(k+1) are disposed in the pixels PIX in a second column different from the first column.

Figure 27A:
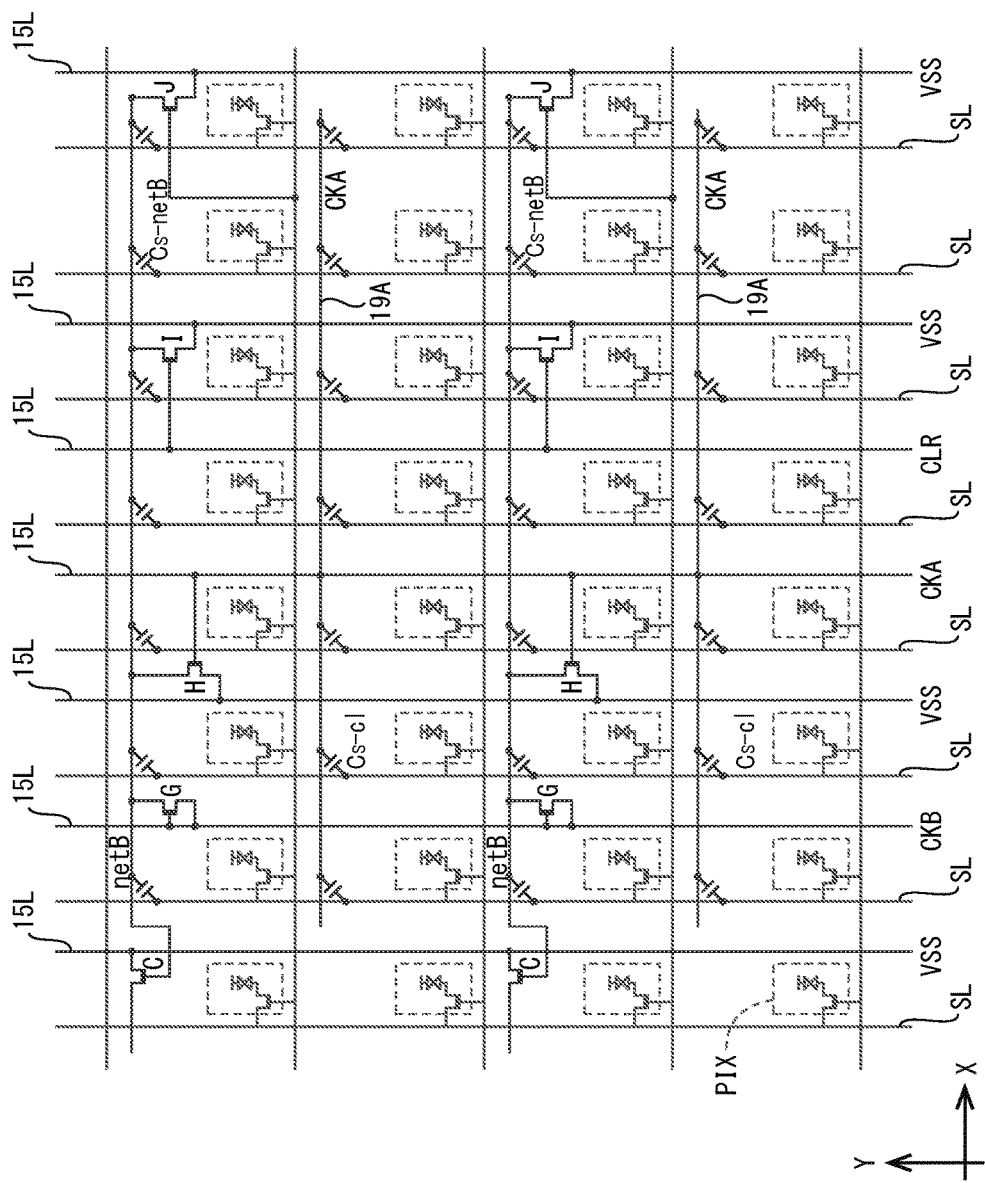
FIG. 27A is an enlarged schematic diagram of a portion in FIG. 27.
Figure 28:
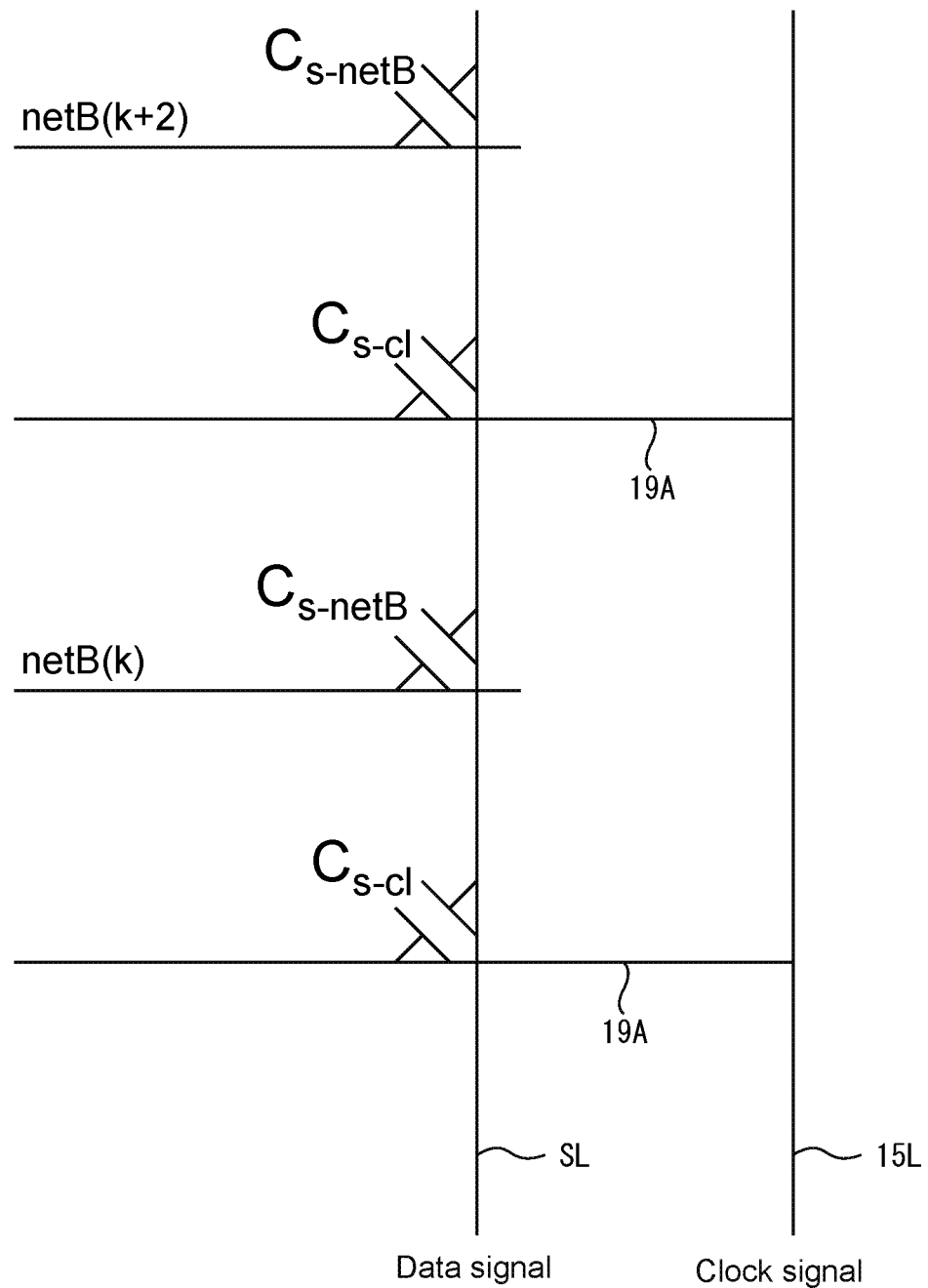
FIG. 28 is a schematic diagram in a state where the netB(k) and the netB(k+2) cross the source line and the lines extending from the line for transmission of the clock signal cross the source line.

As depicted in FIG. 27A, the netB of the gate driver 11(k) (hereinafter, referred to as a netB(k)) crosses the source lines SL. The netB of the gate driver 11(k+2) (hereinafter, referred to as a netB(k+2)) crosses the source lines SL. As depicted in FIG. 28, the parasitic capacitance $C_{s\text{-}netB}$ is provided at each of the node between the netB(k) and the source line SL and the node between the netB(k+2) and the source line SL in the present embodiment.

Though not depicted, the netB of the gate driver 11(k−1) (hereinafter, referred to as a netB(k−1)) crosses the source lines SL. The netB of the gate driver 11(k+1) (hereinafter, referred to as a netB(k+1)) crosses the source lines SL. The parasitic capacitance $C_{s\text{-}netB}$ is provided at each of the nodes between the netB(k−1) and the source lines SL and the nodes between the netB(k+1) and the source lines SL in the present embodiment.

Figure 29:
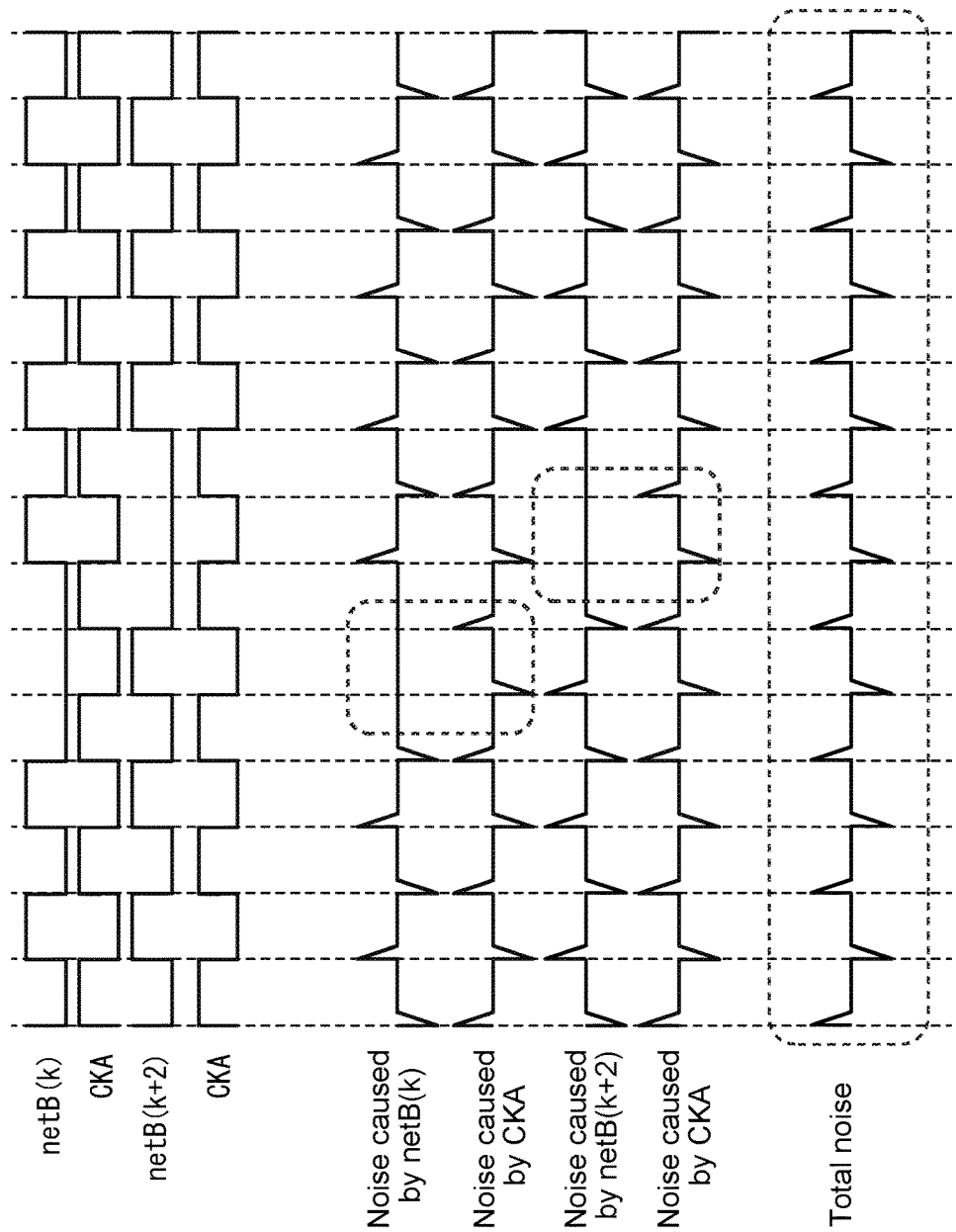
FIG. 29 is a timing chart indicating a relationship among the potentials of the netB(k+2) and the netB(k), the clock signals, and noise in the state depicted in FIG. 28.

FIG. 29 indicates the potentials of the netB(k) and the netB(k+2) according to the present embodiment. In this state, noise caused by the parasitic capacitance $C_{s\text{-}netB}$ provided at the node between the netB(k+2) and each of the source lines SL and noise caused by the parasitic capacitance $C_{s\text{-}netB}$ provided at the node between the netB(k) and the source line SL will synergistically be superimposed on a data signal transmitted on the source line SL crossing the netB(k+2) and the netB(k). Similarly, noise caused by the parasitic capacitance $C_{s\text{-}netB}$ provided at the node between the netB(k+1) and the source line SL and noise caused by the parasitic capacitance $C_{s\text{-}netB}$ provided at the node between the netB(k−1) and the source line SL will synergistically be superimposed on a data signal transmitted on the source line SL crossing the netB(k+1) and the netB(k−1).

In view of this, lines 19A are provided between the two adjacent gate lines GL(k) and GL(k+1) as well as between the two adjacent gate lines GL(k−1) and GL(k−2) as depicted in FIG. 27A in the present embodiment. The lines 19A extend from the line 15L for transmission of the clock signal CKA. The lines 19A cross the source line SL crossing the netB(k+2) and the netB(k). As depicted in portions surrounded with broken lines in FIG. 29, only noise caused by one of the lines 19A is superimposed on a data signal transmitted on the source line SL crossing the netB(k+2) and the netB(k). Even in the case where the netBs cross the data lines SL, noise is unlikely to be superimposed on a data signal transmitted on each of the data lines SL in the present embodiment.

Application Example of Fourth Embodiment

Figure 30A:
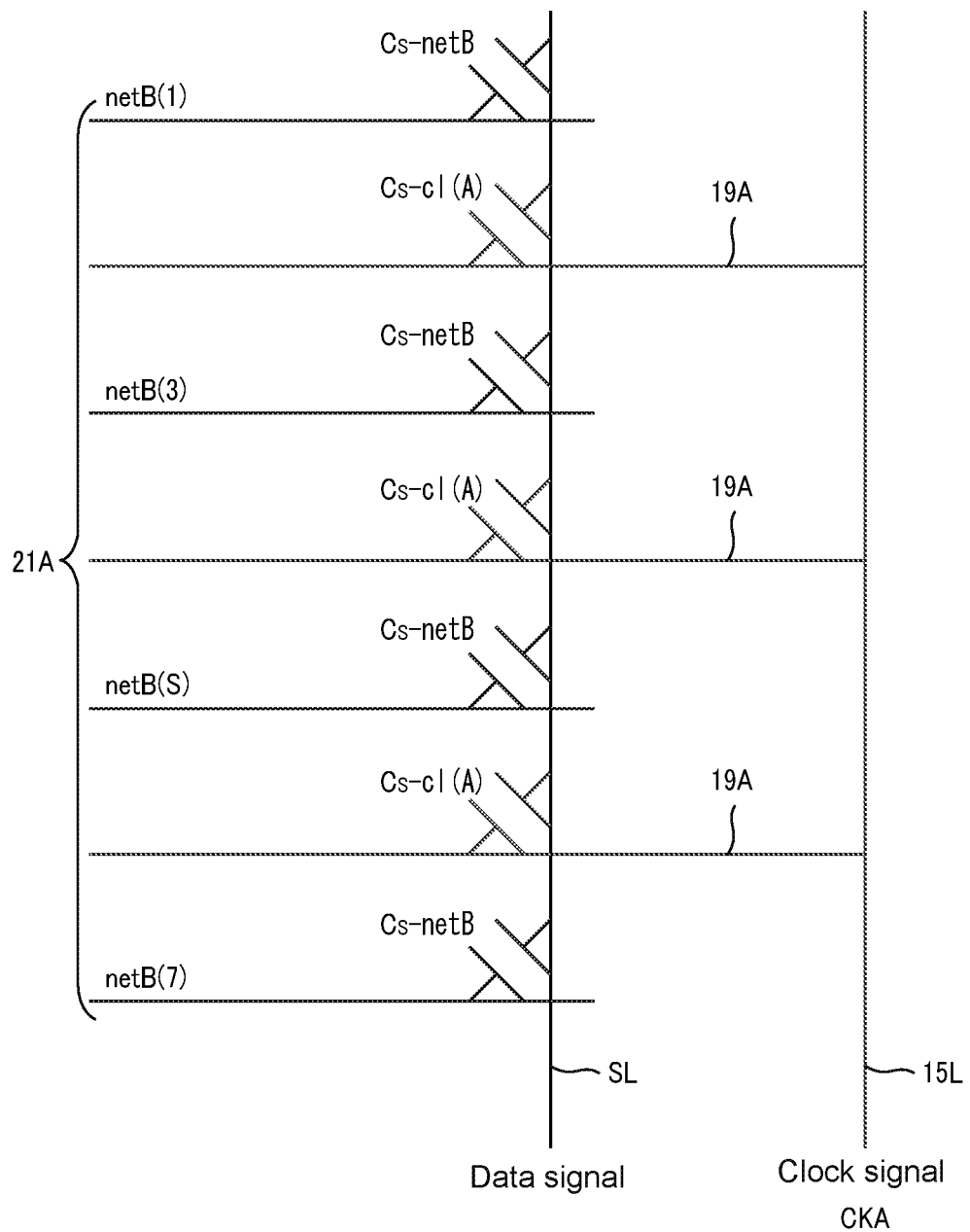
FIG. 30A is a schematic diagram in a state where the plurality of netBs crosses the source line and the lines extending from the line for transmission of the clock signal CKA cross the source line.

As depicted in FIG. 30A, the lines 19A are provided between a netB(1) and a netB(3), between the netB(3) and a netB(5), as well as between the netB(5) and a netB(7) in the present application example. The lines 19A extend from the line 15L for transmission of the clock signal CKA and cross the source line SL for transmission of a data signal. The netB(1), the netB(3), the netB(5), the netB(7), and the three lines 19A configure a single line group 21A.

Figure 30B:
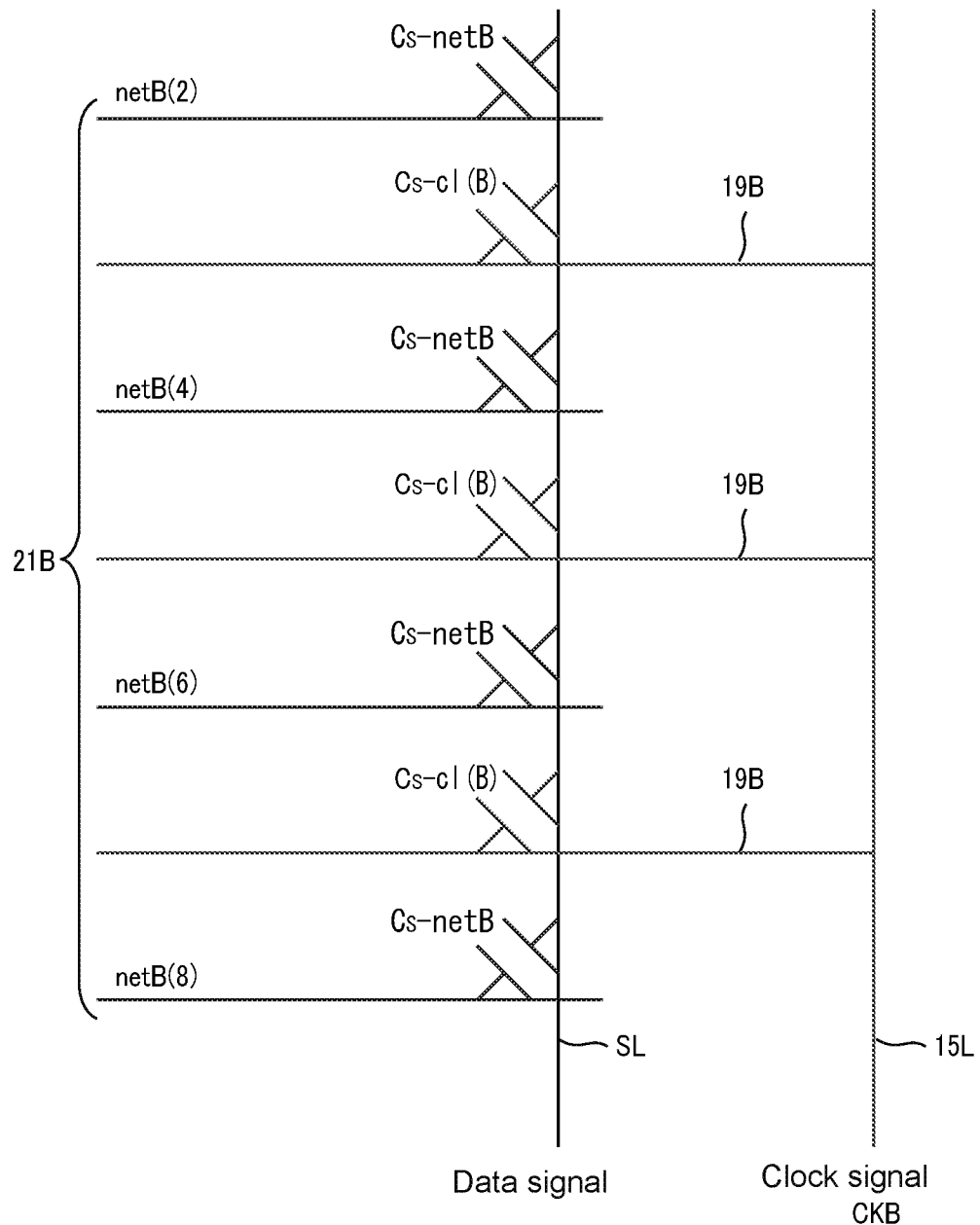
FIG. 30B is a schematic diagram in a state where the plurality of netBs crosses the source line and the lines extending from the line for transmission of the clock signal CKB cross the source line.

As depicted in FIG. 30B, lines 19B are provided between a netB(2) and a netB(4), between the netB(4) and a netB(6), as well as between the netB(6) and the netB(8) in the present application example. The lines 19B extend from the line 15L for transmission of the clock signal CKB and cross the source line SL for transmission of a data signal. The netB(1), the netB(3), the netB(5), the netB(7), and the three lines 19B configure a single line group 21B.

FIGS. 30A and 30B depict identical one of the source lines SL. The eight netBs, the three lines 19A, and the three lines 19B cross one of the source lines SL in the present application example.

Figure 31:
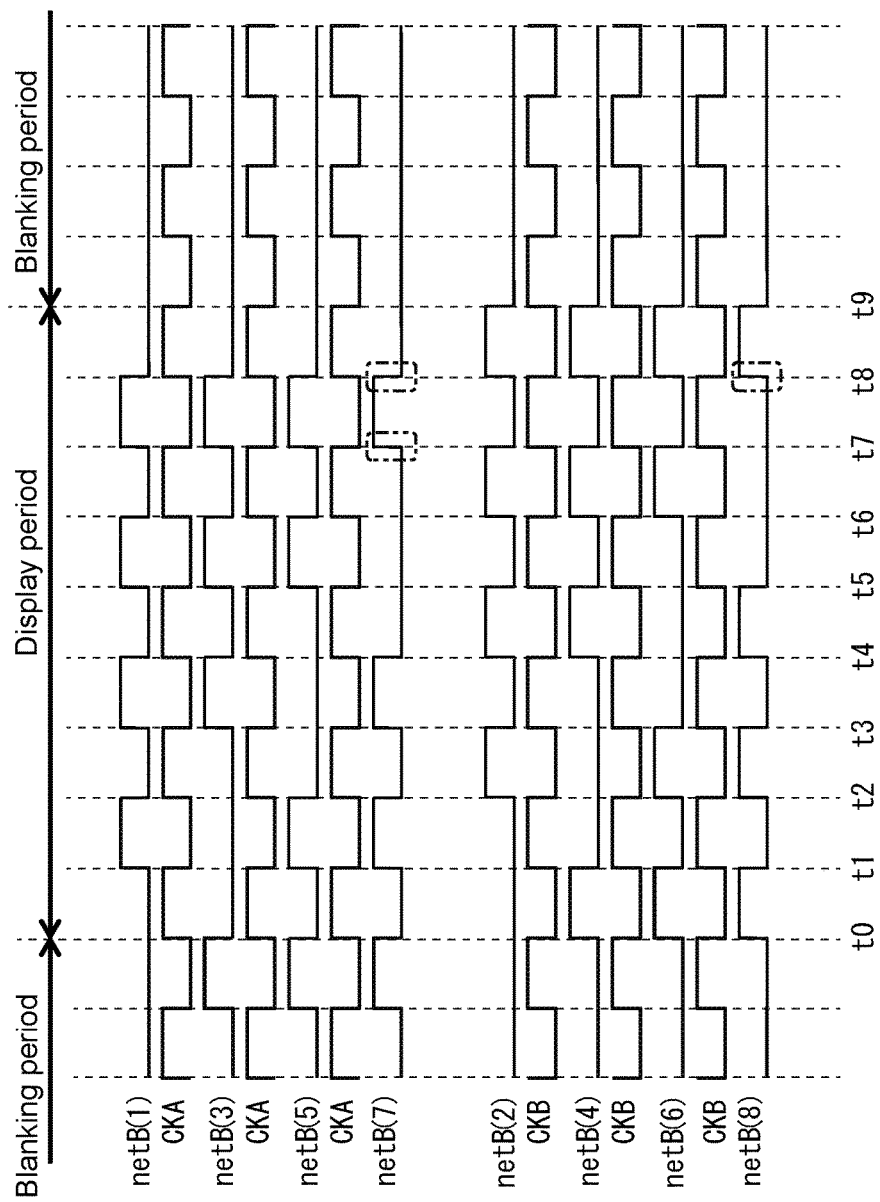
FIG. 31 is a timing chart indicating a relationship among potentials of a netB(1) to a netB(8), the clock signals, and noise.

FIG. 31 is a timing chart indicating a relationship among the potentials of the netBs and the clock signals CKA and CKB. FIG. 31 has an upper portion indicating a relationship among the potentials of the netBs in the line group 21A and the clock signal CKA. FIG. 31 has a lower portion indicating a relationship among the potentials of the netBs in the line group 21B and the clock signal CKB.

As indicated in FIG. 31, the netB(3) in the line group 21A has no potential variation at time t1 and time t2 in a display period. Noise is thus offset at the time t1 and the time t2. The netB(5) has no potential variation at time t3 and time t4. Noise is thus offset at the time t3 and the time t4. The netB(7) has no potential variation at time t5 and time t6. Noise is thus offset at the time t5 and the time t6. As indicated in portions surrounded with broken lines, only noise caused by potential variation of the netB(7) is superimposed on a data signal transmitted on the source line SL at time t7 and time t8.

As indicated in FIG. 31, the netB(2) in the line group 21B has no potential variation at the time t1 in the display period. Noise is thus offset at the time t1. The netB(4) has no potential variation at the time t2 and the time t3. Noise is thus offset at the time t2 and the time t3. The netB(6) has no potential variation at the time t4 and the time t5. Noise is thus offset at the time t4 and the time t5. The netB(8) has no potential variation at the time t6 and the time t7. Noise is thus offset. As indicated in a portion surrounded with a broken line, only noise caused by potential variation of the netB(8) is superimposed on a data signal transmitted on the source line SL at the time t8.

Similarly to the fourth embodiment, noise is thus unlikely to be superimposed on a data signal transmitted on the data line SL even in the case where the netBs cross the data line SL in the present application example.

Fifth Embodiment

The first embodiment refers to the case where the lines 17A and 17B extending from the lines 15L for transmission of the clock signals CKA and CKB cross the source lines SL. The fifth embodiment will refer to a measure against noise caused by parasitic capacitances provided between the source lines SL and the line 15L.

Figure 32:
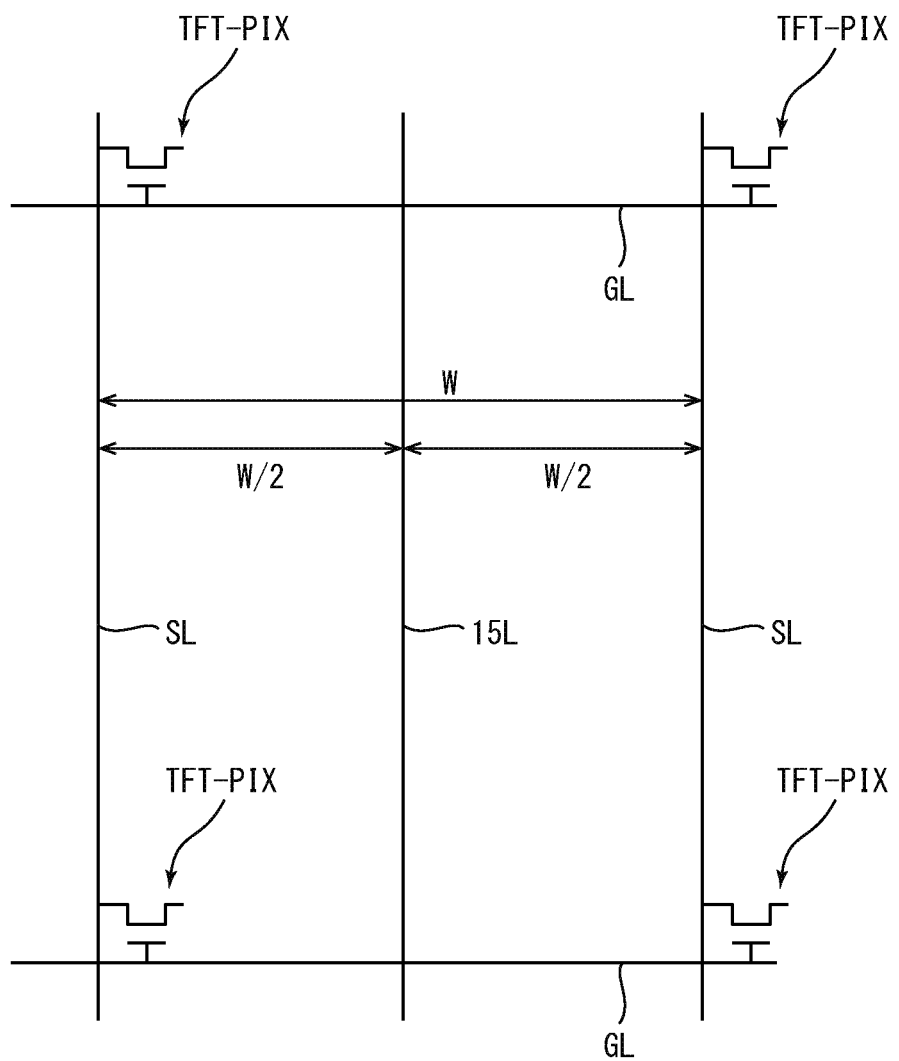
FIG. 32 is a schematic diagram depicting exemplary disposition of the line in a pixel.
Figure 33:
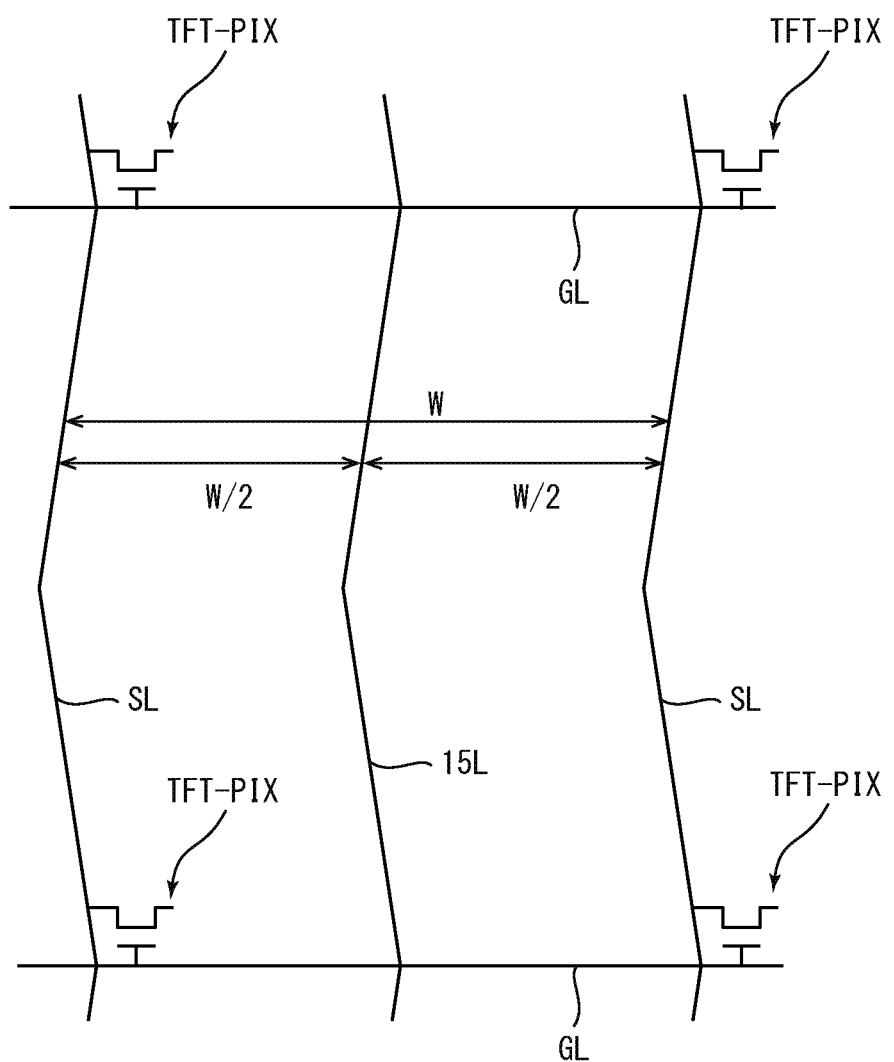
FIG. 33 is a schematic diagram depicting different exemplary disposition of the line in the pixel.

FIG. 32 is a schematic diagram of exemplary disposition of the line 15L. The line 15L is disposed to be substantially equally distant from the two adjacent source lines SL. In this case, a parasitic capacitance provided between a first one of the two source lines SL and the line 15L can be equalized to a parasitic capacitance provided between a second one of the two source lines SL and the line 15L. This reduces noise caused by these parasitic capacitances. The source lines SL and the line 15L can be bent as depicted in FIG. 33.

Sixth Embodiment

The first embodiment refers to the case where the lines 17A and 17B extending from the lines 15L for transmission of the clock signals CKA and CKB cross the source lines SL.

The sixth embodiment will refer to a case where the lines 15L for transmission of the clock signals CKA and CKB cross an auxiliary capacitance line.

Figure 34:
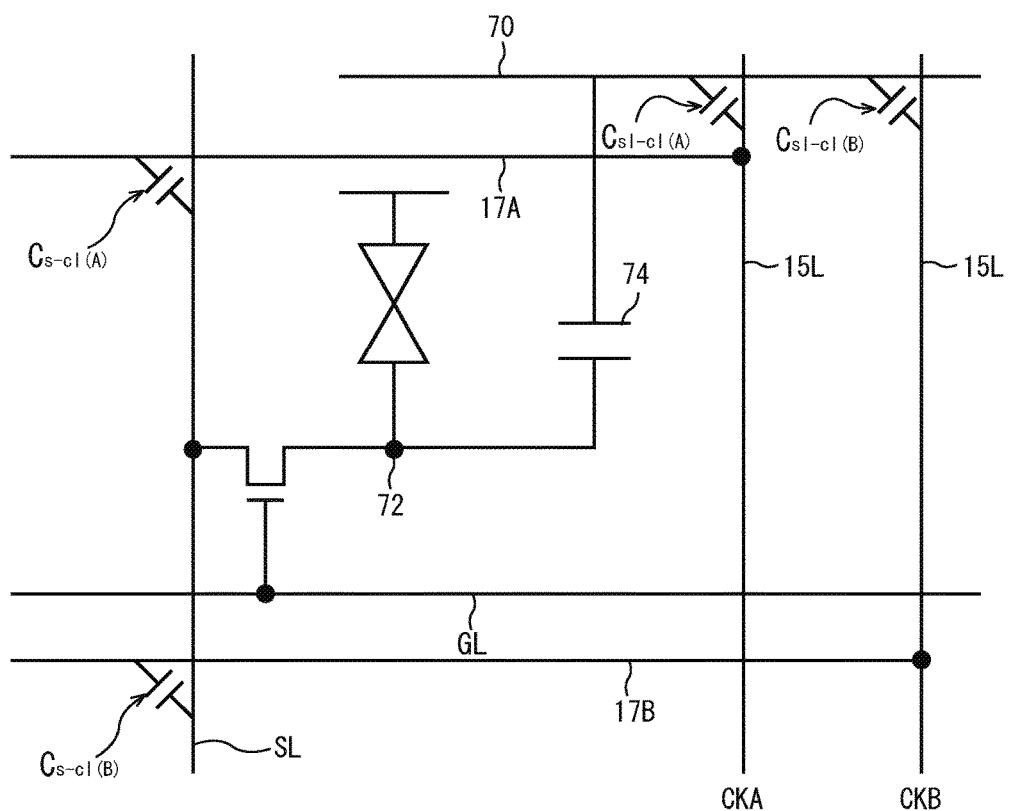
FIG. 34 is a diagram of an equivalent circuit of a pixel in a case where a liquid crystal operation mode is according to a VA system.

FIG. 34 depicts an equivalent circuit of a pixel in a case where a liquid crystal operation mode is according to a VA system. There is provided an auxiliary capacitance line 70 in the VA system as depicted in FIG. 34.

An auxiliary capacitance 74 is provided between the auxiliary capacitance line 70 and a pixel electrode 72. The auxiliary capacitance 74 stores charge for keeping a potential of the pixel electrode 72 at a desired level during image display. The auxiliary capacitance line 70 is provided with a potential for charge storage at the auxiliary capacitance 74.

The auxiliary capacitance line 70 crosses the line 15L for transmission of the clock signal CKA and the line 15L for transmission of the clock signal CKB. A parasitic capacitance $C_{sl\text{-}cl(A)}$ is provided at a node between the line 15L for transmission of the clock signal CKA and the auxiliary capacitance line 70. A parasitic capacitance $C_{sl\text{-}cl(B)}$ is provided at a node between the line 15L for transmission of the clock signal CKB and the auxiliary capacitance line 70.

According to the present embodiment, the amplitude of the clock signal CKA, i.e. the potential variation amount $\Delta V_{(A)}$ of the line 15L for transmission of the clock signal CKA, the amplitude of the clock signal CKB, i.e. the potential variation amount $\Delta V_{(B)}$ of a line 15B for transmission of the clock signal CKB, the parasitic capacitance $C_{sl\text{-}cl(A)}$, and the parasitic capacitance $C_{sl\text{-}cl(B)}$ are set for the auxiliary capacitance line 70 to satisfy the following formula (13).

[Formula 13]

$$\Sigma C_{sl\text{-}cl(A)} \Delta V_{(A)} + \Sigma C_{sl\text{-}cl(B)} \Delta V_{(B)} = 0 \tag{13}$$

The amount $\Delta V_{(A)}$ is equal to the amount $\Delta V_{(B)}$ in the present embodiment. The parasitic capacitance $C_{sl\text{-}cl(A)}$ is equal to the parasitic capacitance $C_{sl\text{-}cl(B)}$. Equalizing the number of the parasitic capacitances $C_{sl\text{-}cl(A)}$ and the number of the parasitic capacitances $C_{sl\text{-}cl(B)}$, in other words, the number of nodes on one of the auxiliary capacitance lines 70 with the lines 15L for transmission of the clock signal CKA and the number of nodes on the auxiliary capacitance line 70 with the lines 15L for transmission of the clock signal CKB, thus allows noise caused by the parasitic capacitances $C_{sl\text{-}cl(A)}$ and noise caused by the parasitic capacitances $C_{sl\text{-}cl(B)}$ to cancel each other. Noise is then unlikely to be superimposed on a potential applied to the auxiliary capacitance line 70, which crosses the lines 15L for transmission of the clock signal CKA and the lines 15L for transmission of the clock signal CKB.

The potential of the auxiliary capacitance line 70 affects the potential of the pixel electrode 72 via the auxiliary capacitance 74. When noise is unlikely to be superimposed on the potential of the auxiliary capacitance line 70, noise is unlikely to affect the potential of the pixel electrode 72. In other words, noise is unlikely to affect voltage applied to the liquid crystal layer.

Seventh Embodiment

The first embodiment refers to the case where the lines 17A and 17B extending from the lines 15L for transmission of the clock signals CKA and CKB cross the source lines SL. The seventh embodiment will refer to a case where the lines 15L for transmission of the clock signals CKA and CKB cross the common line.

Figure 35:
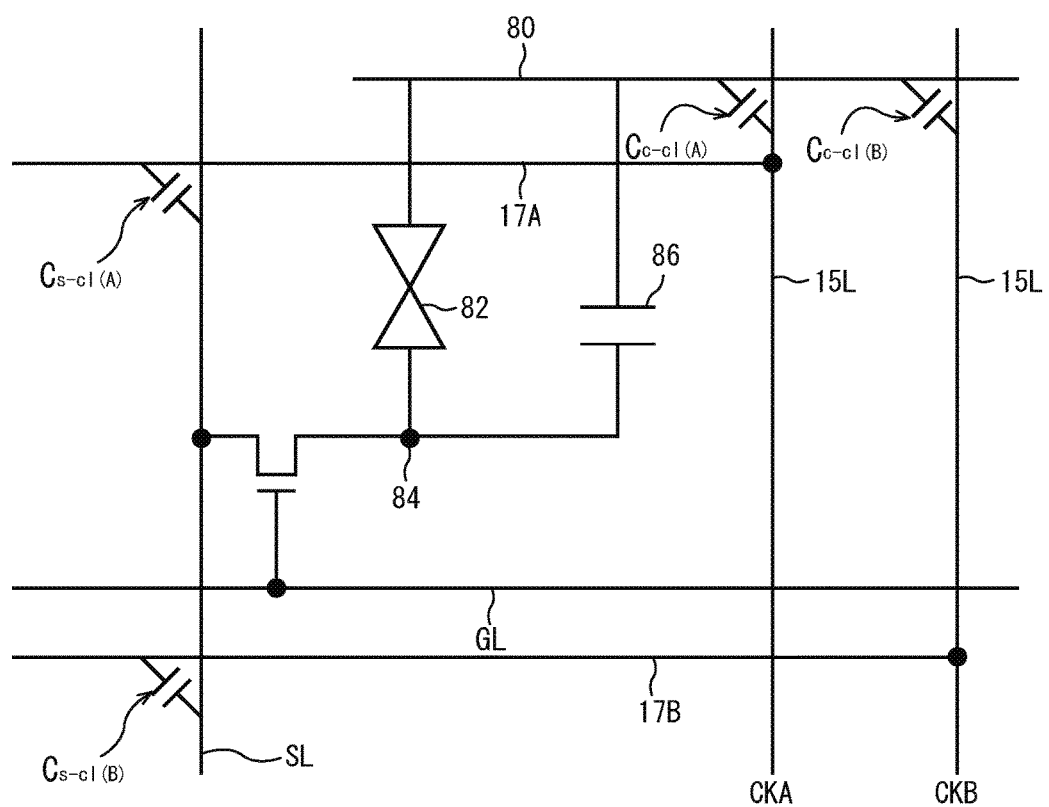
FIG. 35 is a diagram of an equivalent circuit of the pixel in a case where the liquid crystal operation mode is according to an IPS system or an FFS system.

FIG. 35 depicts an equivalent circuit of a pixel in a case where the liquid crystal operation mode is according to an IPS system or an FFS system. There is provided a common line 80 in these systems as depicted in FIG. 35.

The common line 80 is provided on the active-matrix substrate 20a. The common line 80 is electrically connected with a common electrode. A horizontal electric field is provided between the common electrode and a pixel electrode 84. A pixel capacitance 86 is provided between the common line 80 and the pixel electrode 84. The pixel capacitance 86 stores charge for keeping a potential of the pixel electrode 84 at a desired level during image display. The common line 80 is provided with a potential for charge storage at the pixel capacitance 86.

The common line 80 crosses the line 15L for transmission of the clock signal CKA and the line 15L for transmission of the clock signal CKB. A parasitic capacitance $C_{c\text{-}cl(A)}$ is provided at a node between the common line 80 and the line 15L for transmission of the clock signal CKA. A parasitic capacitance $C_{c\text{-}cl(B)}$ is provided at a node between the common line 80 and the line 15L for transmission of the clock signal CKB.

According to the present embodiment, the amplitude of the clock signal CKA, i.e. the potential variation amount $\Delta V_{(A)}$ of the line 15L for transmission of the clock signal CKA, the amplitude of the clock signal CKB, i.e. the potential variation amount $\Delta V_{(B)}$ of the line 15B for transmission of the clock signal CKB, the parasitic capacitance $C_{c\text{-}cl(A)}$, and the parasitic capacitance $C_{c\text{-}cl(B)}$ are set for the common line 80 to satisfy the following formula (14).

[Formula 14]

$$\Sigma C_{c\text{-}cl(A)} \Delta V_{(A)} + \Sigma C_{c\text{-}cl(B)} \Delta V_{(B)} = 0 \tag{14}$$

The amount $\Delta V_{(A)}$ is equal to the amount $\Delta V_{(B)}$ in the present embodiment. The parasitic capacitance $C_{c\text{-}cl(A)}$ is equal to the parasitic capacitance $C_{c\text{-}cl(B)}$. Equalizing the number of the parasitic capacitances $C_{c\text{-}cl(A)}$ and the number of the parasitic capacitances $C_{c\text{-}cl(B)}$, in other words, the number of nodes on one of the common lines 80 with the lines 15L for transmission of the clock signal CKA and the number of nodes on the common line 80 with the lines 15L for transmission of the clock signal CKB, thus allows noise caused by the parasitic capacitances $C_{c\text{-}cl(A)}$ and noise caused by the parasitic capacitances $C_{c\text{-}cl(B)}$ to cancel each other. Noise is then unlikely to be superimposed on a potential applied to the common line 80, which crosses the lines 15L for transmission of the clock signal CKA and the lines 15L for transmission of the clock signal CKB.

The potential of the common line 80 affects the potential of the pixel electrode 84 via a liquid crystal layer 82 and the pixel capacitance 86. When noise is unlikely to be superimposed on the potential of the common line 80, noise is unlikely to affect the potential of the pixel electrode 84. In other words, noise is unlikely to affect voltage applied to the liquid crystal layer 82.

Application Example of Seventh Embodiment

As depicted in FIG. 35, the common line 80 is provided on the active-matrix substrate 20a, and the pixel capacitance 86 is provided between the common line 80 and the pixel electrode 84. The common line 80 is thus made of a transparent conductive film.

Figure 36A:
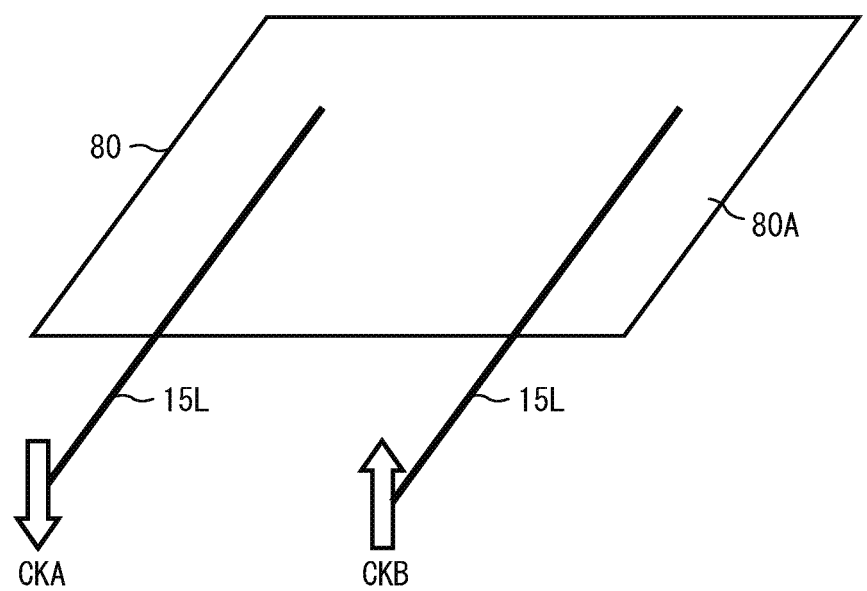
FIG. 36A is an explanatory view in a case where a common line is made of only a transparent conductive layer.
Figure 36B:
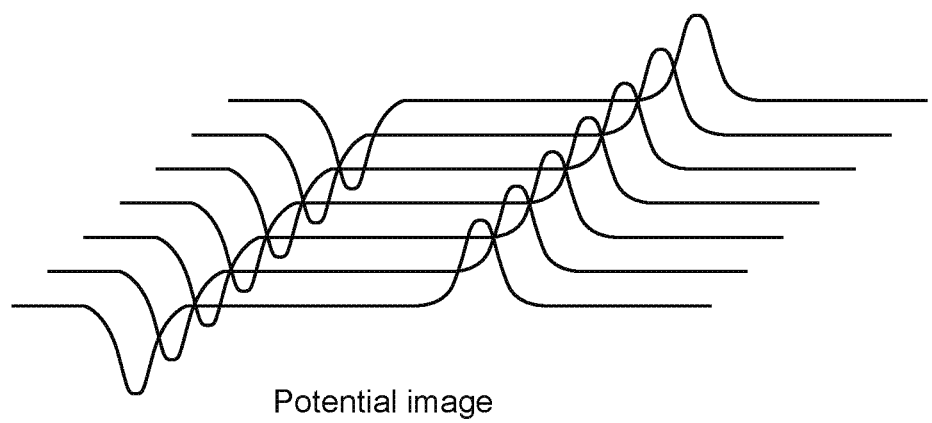
FIG. 36B is an explanatory view in a case where potentials vary only locally on the common line to fail to offset noise having opposite phases.

As depicted in FIG. 36A, the common line 80 including only a transparent conductive layer 80A has a high sheet resistance. As indicated in FIG. 36B, potentials vary only locally to fail to offset noise having opposite phases in some cases.

Figure 37A:
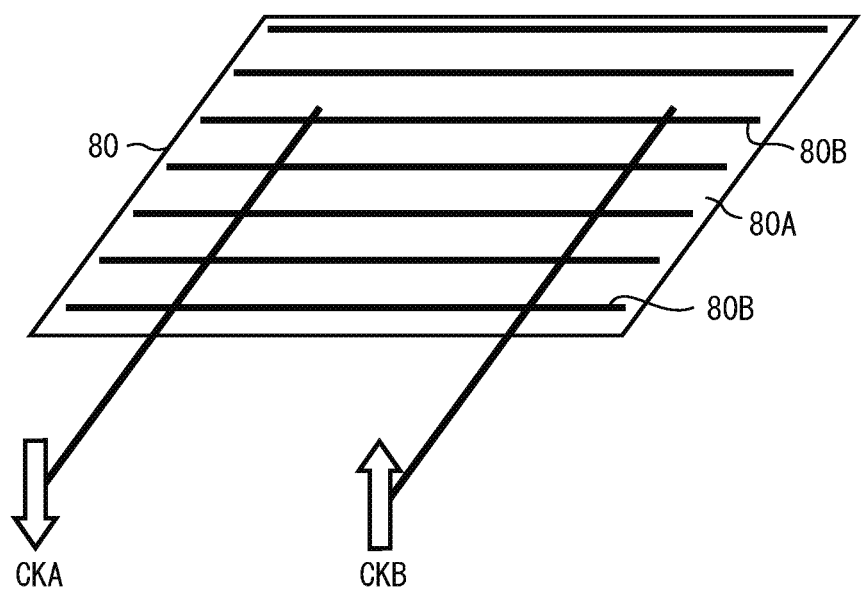
FIG. 37A is an explanatory view in a case where the common line is made of the transparent conductive layer and metal lines.
Figure 37B:
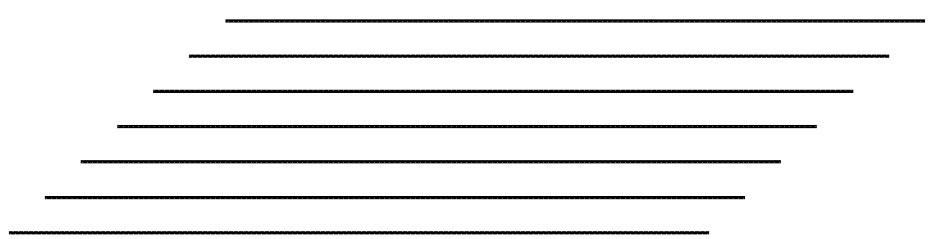
FIG. 37B is an explanatory view in a case where the common line is configured to offset noise having opposite phases.

In view of this, the common line 80 according to the present application example includes the transparent conductive layer 80A and a plurality of metal lines 80B as depicted in FIG. 37A. Examples of the conductive layer 80A include an indium-tin oxide film. The metal lines 80B are provided in contact with the conductive layer 80A. The metal lines 80B have conductivity higher than that of the conductive layer 80A and are made of metal such as aluminum. The metal lines 80B extend along the common line 80. In other words, the metal lines 80B extend along the conductive layer 80A. The plurality of metal lines 80B is aligned in the width direction of the conductive layer 80A (the width direction of the common line 80) at predetermined intervals.

The sheet resistance of the common line 80 can be decreased in the present application example. This prevents the potentials of the common line 80 from varying only locally and achieves offset of noise having opposite phases.

Eighth Embodiment

Figure 38:
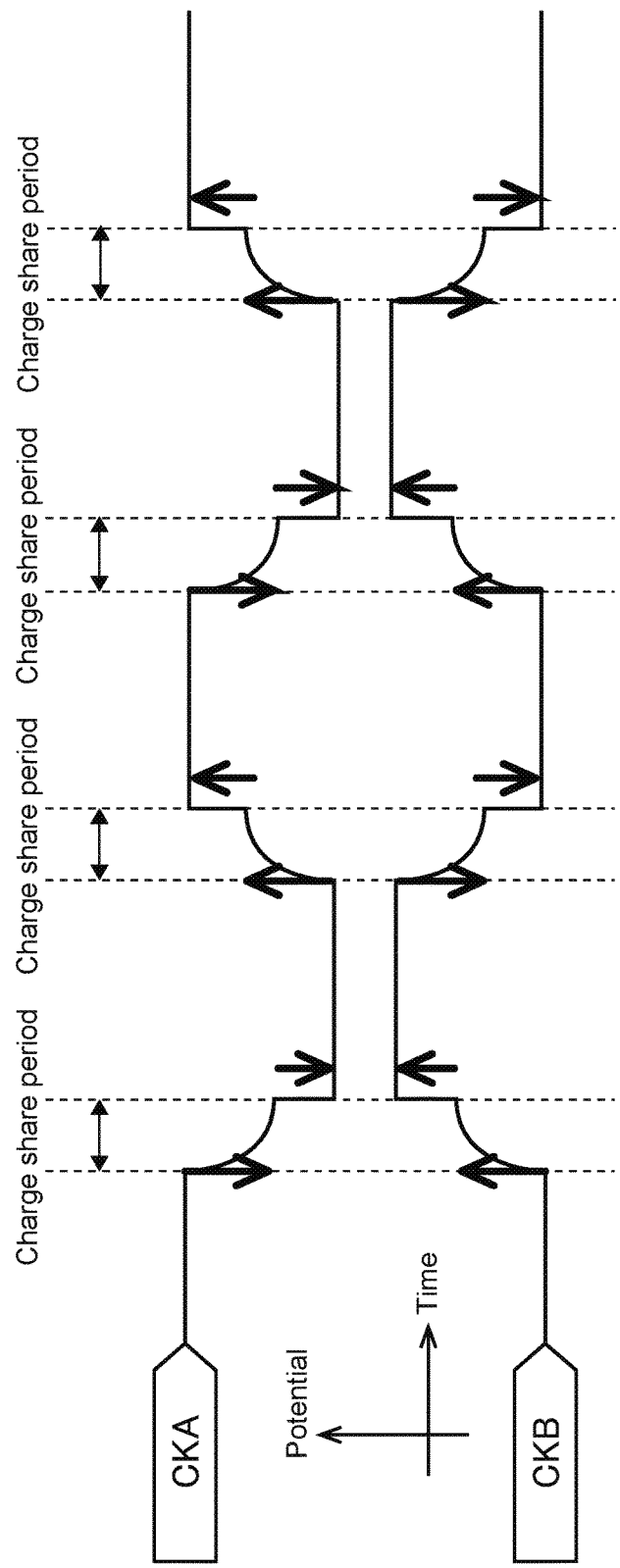
FIG. 38 is a timing chart indicating switching phases of the clock signals according to an eighth embodiment of the present invention.
Figure 39:
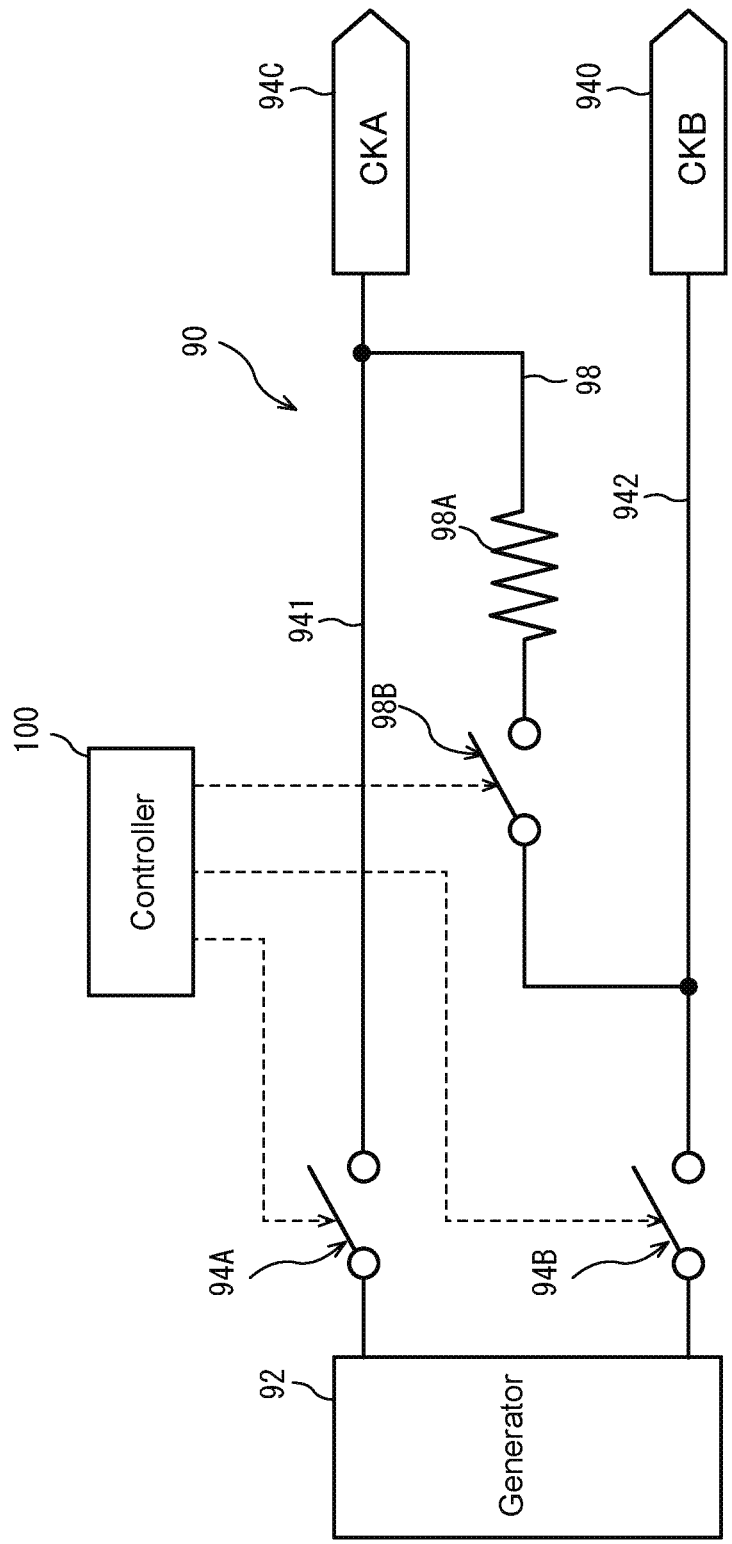
FIG. 39 is a diagram of an exemplary circuit configured to switch the phases of the clock signals indicated in FIG. 38.

The eighth embodiment of the present invention will be described with reference to FIGS. 38 and 39. The switched clock signals CKA and CKB can have waveforms as indicated in FIG. 38. Such waveforms can be achieved by a circuit 90 exemplified in FIG. 39.

The circuit 90 is provided in the display control circuit 4 (see FIG. 3). The circuit 90 includes a generator 92, a signal supply line 941, a signal supply line 942, a switch 94A, a switch 94B, a terminal 940, a terminal 94D, a connecting line 98, a resistance 98A, a switch 98B, and a controller 100.

The generator 92 generates the clock signals CKA and CKB. The generator 92 is connected with the signal supply line 941 and the signal supply line 942.

The signal supply line 941 is connected with the terminal 940. The terminal 940 is connected with the line 15L for transmission of the clock signal CKA. The signal supply line 941 is provided with the switch 94A. The switch 94A switches between a state where the line 15L for transmission of the clock signal CKA and the generator 92 are electrically connected and a state where the line 15L and the generator 92 are not electrically connected.

The signal supply line 942 is connected with the terminal 94D. The terminal 94D is connected with the line 15L for transmission of the clock signal CKB. The signal supply line 942 is provided with the switch 94B. The switch 94B switches between a state where the line 15L for transmission of the clock signal CKB and the generator 92 are electrically connected and a state where the line 15L and the generator 92 are not electrically connected.

The connecting line 98 connects the signal supply line 941 with the signal supply line 942. The connecting line 98 is provided with the resistance 98A and the switch 98B. The switch 98B switches between a state where the signal supply lines 941 and 942 are electrically connected and a state where the signal supply lines 941 and 942 are not electrically connected.

The controller 100 controls to operate the switches 94A, 94B, and 98B. Such control will specifically be described below.

When the clock signals CKA and CKB are switched in phase, the line 15L for transmission of the clock signal CKA and the line 15L for transmission of the clock signal CKB are not electrically connected with the generator 92. Furthermore, the signal supply line 941 is electrically connected with the signal supply line 942.

While the clock signals CKA and CKB are not switched in phase, the line 15L for transmission of the clock signal CKA and the line 15L for transmission of the clock signal CKB are electrically connected with the generator 92. Furthermore, the signal supply line 941 is not electrically connected with the signal supply line 942.

According to the present embodiment, charge transfer between the signal supply lines 941 and 942 assists switching in phase of the clock signals CKA and CKB. This saves electric power consumption.

The embodiments of the present invention described above are merely exemplified to achieve the present invention. The present invention should not be limited to the above embodiments, and can be achieved with appropriate modifications to or combinations of the above embodiments without departing from the spirit of the present invention.

The invention claimed is:

1. A display device for displaying an image in a display region, comprising:
   a plurality of signal lines to be each provided with a potential to display an image;
   a plurality of gate lines provided separately from the plurality of signal lines; and
   a driving unit connected to the plurality of gate lines and configured to control a potential of each of the gate lines,
   the driving unit including
   a plurality of gate drivers disposed in the display region, at least one of the gate drivers being connected to each of the gate lines, and
   a plurality of lines to be each provided with a potential for operation of one of the gate drivers and each crossing one of the signal lines,
   the plurality of lines including
   at least one first line, and
   at least one second line crossing the signal line that crosses the first line, at a position different from a node with the first line; wherein
   the driving unit
   switches a potential of the first line at predetermined timing, and
   switches a potential of the second line into a direction opposite to a direction of the switched potential of the first line upon switching the potential of the first line.

2. The display device according to claim 1, wherein the signal line crossing the first line and the second line is a data line for transmission of a data signal used for image display.

3. The display device according to claim 1, the device further comprising:
   a plurality of pixels provided in the display region;
   a thin film transistor provided in each of the pixels;
   a pixel electrode connected to the thin film transistor, and
   an auxiliary capacitance line for provision of an auxiliary capacitance between the auxiliary capacitance line and the pixel electrode; wherein
   the signal line crossing the first line and the second line corresponds to the auxiliary capacitance line.

4. The display device according to claim 1, the device further comprising:
   a plurality of pixels provided in the display region;
   a thin film transistor provided in each of the pixels;
   a pixel electrode connected to the thin film transistor, and
   a common line for provision of a pixel capacitance between the common line and the pixel electrode, the common line being provided on a substrate including the pixel electrode; wherein the signal line crossing the first line and the second line corresponds to the common line.

5. The display device according to claim 4, wherein the common line includes
a transparent conductive layer, and
a plurality of metal lines provided on the transparent conductive layer, extending along the common line, and aligned in a width direction of the common line at predetermined intervals.

6. The display device according to claim 1, wherein
a first parasitic capacitance is provided at a node between the first line and the signal line crossing the first line,
a second parasitic capacitance is provided at a node between the second line and the signal line crossing the first line, and
an absolute value of a sum of a product of the first parasitic capacitance and a potential variation amount of the first line and a product of the second parasitic capacitance and a potential variation amount of the second line is less than an absolute value of the product of the first parasitic capacitance and the potential variation amount of the first line or an absolute value of the product of the second parasitic capacitance and the potential variation amount of the second line.

7. The display device according to claim 1, wherein
the plurality of lines includes the at least one second line equal in number to the at least one first line.

8. The display device according to claim 1, wherein
the driving unit further includes
a signal supplier configured to supply each of the gate drivers with a first clock signal and a second clock signal having a phase opposite to that of the first clock signal,
a plurality of first clock signal lines for transmission of the first clock signal, and
a plurality of second clock signal lines for transmission of the second clock signal,
each of the first clock signal lines connected to one of the gate drivers includes a first line portion crossing one of the signal lines,
each of the second clock signal lines connected to one of the gate drivers includes a second line portion that crosses the signal line crossing the first line portion, at a position different from a node with the first line portion,
the first line portion corresponds to the first line, and
the second line portion corresponds to the second line.

9. The display device according to claim 8, wherein
the signal supplier includes
a generator configured to generate the first and second clock signals,
a first signal supply line for transmission of the first clock signal, the first signal supply line connecting one of the first clock signal lines and the generator,
a first switch provided on the first signal supply line and configured to switch between a state where the first clock signal line and the generator are electrically connected and a state where the first clock signal line and the generator are not electrically connected,
a second signal supply line for transmission of the second clock signal, the second signal supply line connecting one of the second clock signal lines and the generator,
a second switch provided on the second signal supply line and configured to switch between a state where the second clock signal line and the generator are electrically connected and a state where the second clock signal line and the generator are not electrically connected,
a connecting line between the first signal supply line and the second signal supply line,
a resistance provided on the connecting line,
a third switch provided on the connecting line and configured to switch between a state where the first and second signal supply lines are electrically connected and a state where the first and second signal supply lines are not electrically connected, and
a controller configured to control to operate the first, second, and third switches, into a state where the first and second clock signal lines are not electrically connected with the generator and the first signal supply line is electrically connected with the second signal supply line when the first and second clock signals are switched in phase, and into a state where the first and second clock signal lines are electrically connected with the generator and the first signal supply line is not electrically connected with the second signal supply line while the first and second clock signals are not switched in phase.

10. The display device according to claim 1, wherein
the plurality of lines further includes
a third line crossing the signal line that crosses the first line and the second line,
at a position different from a node with the first line and a node with the second line,
a first parasitic capacitance is provided at a node between the first line and the signal line crossing the first line,
a second parasitic capacitance is provided at a node between the second line and the signal line crossing the first line,
a third parasitic capacitance is provided at a node between the third line and the signal line crossing the first line,
the plurality of gate drivers includes
a first gate driver connected to one of the gate lines and including the first line,
a second gate driver connected to one of the gate lines except the gate line connected with the first gate driver, and including the second line, and
a third gate driver connected to one of the gate lines except the gate line connected with the first gate driver and the gate line connected with the second gate driver, and including the third line,
the driving unit
decreases the potential of the first line,
increases the potential of the second line upon decreasing the potential of the first line, and
increases a potential of the third line upon decreasing the potential of the first line, and
an absolute value of a sum of a product of the first parasitic capacitance and a potential variation amount of the first line, a product of the second parasitic capacitance and a potential variation amount of the second line, and a product of the third parasitic capacitance and a potential variation amount of the third line is less than one of an absolute value of the product of the first parasitic capacitance and the potential variation amount of the first line, an absolute value of the product of the second parasitic capacitance and the potential variation amount of the second line, and an absolute value of the product of the third parasitic capacitance and the potential variation amount of the third line.

11. The display device according to claim 1, wherein
the plurality of lines includes
a line group including N of the first lines and (N−1) of the second lines, and
the driving unit
does not switch a potential of one of the N first lines upon switching the potentials of the remaining first lines and the second lines.

12. The display device according to claim 1, wherein
the driving unit further includes
a signal supplier configured to supply each of the gate drivers with a clock signal, and
a plurality of clock signal lines for transmission of the clock signal,
the plurality of signal lines is aligned in a predetermined direction,
each of the clock signal lines includes a signal line portion provided between adjacent two of the signal lines in the predetermined direction, and
the signal line portion is equally distant from a first one of the two adjacent signal lines and a second one of the two adjacent signal lines in the predetermined direction.

* * * * *